US006801665B1

(12) United States Patent
Atsumi et al.

(10) Patent No.: US 6,801,665 B1
(45) Date of Patent: Oct. 5, 2004

(54) METHOD AND APPARATUS FOR COMPRESSING AND DECOMPRESSING IMAGES

(75) Inventors: Eiji Atsumi, Kamakura (JP); Nariman Farvardin, Rockville, MD (US)

(73) Assignees: University of Maryland, College Park, MD (US); Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 09/623,473

(22) PCT Filed: Sep. 15, 1998

(86) PCT No.: PCT/US98/19065

§ 371 (c)(1),
(2), (4) Date: Nov. 17, 2000

(87) PCT Pub. No.: WO99/49412

PCT Pub. Date: Sep. 30, 1999

(51) Int. Cl.[7] .................................................. G06K 9/46
(52) U.S. Cl. ...................................... 382/239; 382/240
(58) Field of Search ................................. 382/232, 239, 382/240, 242, 243, 282; 358/539, 537, 538, 1.15

(56) References Cited

U.S. PATENT DOCUMENTS

| | | | |
|---|---|---|---|
| 4,811,210 A | 3/1989 | McAulay | 710/317 |
| 5,412,741 A | * 5/1995 | Shapiro | 382/232 |
| 5,598,216 A | 1/1997 | Lee | 382/241 |
| 5,729,648 A | 3/1998 | Boyce et al. | 386/68 |

OTHER PUBLICATIONS

Said et al. ("A new, Fast, and Efficient Image Codec Based on Set Partitioning in Hierarchical Trees", IEEE, Transactions on Circuits and Systems for Video Technology, vol. 6, No. 3, Jun. 1996).*

* cited by examiner

*Primary Examiner*—Leo Boudreau
*Assistant Examiner*—Duy M. Dang
(74) *Attorney, Agent, or Firm*—Squire, Sanders & Dempsey L.L.P.

(57) ABSTRACT

A method and apparatus for encoding (622) digital image data wherein a region of interest (606) can be specified either before the encoding process has begun or during the encoding process, such that the priority (616) of the encoder outputs are modified so as to place more emphasis on the region of interest, therefore increasing the speed and/or increasing the fidelity of the reconstructed region of interest. The system, therefore, enables more effective reconstruction of digital images over communication lines.

23 Claims, 34 Drawing Sheets

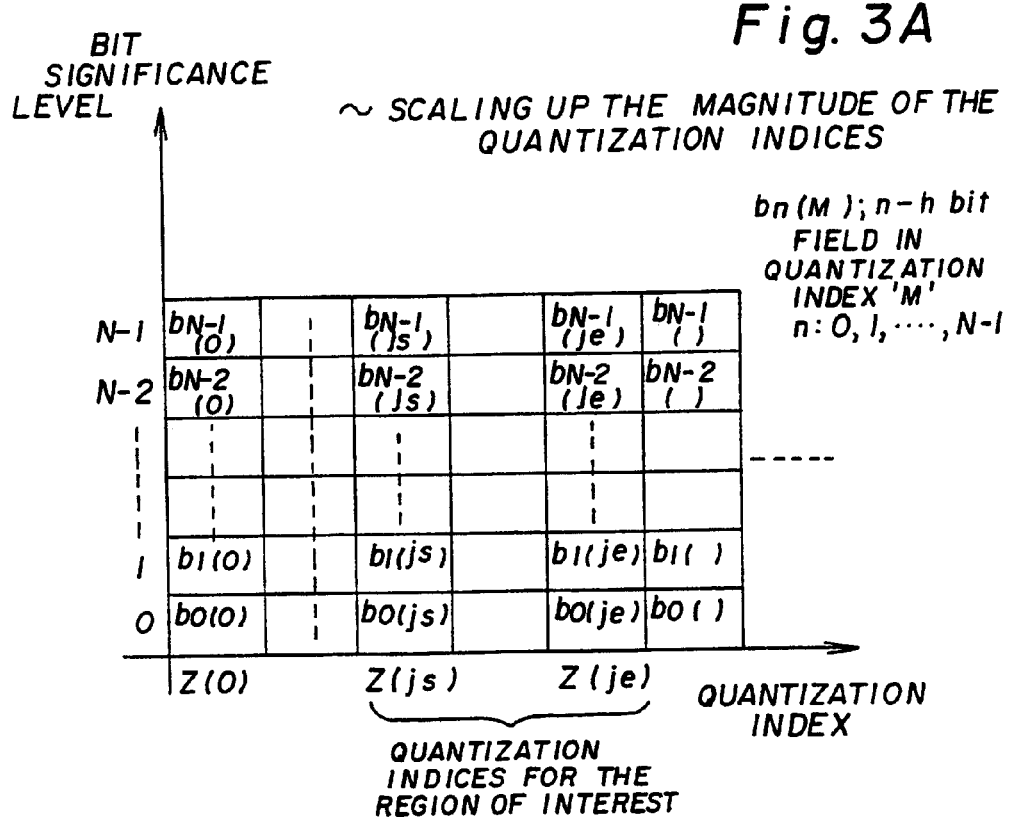
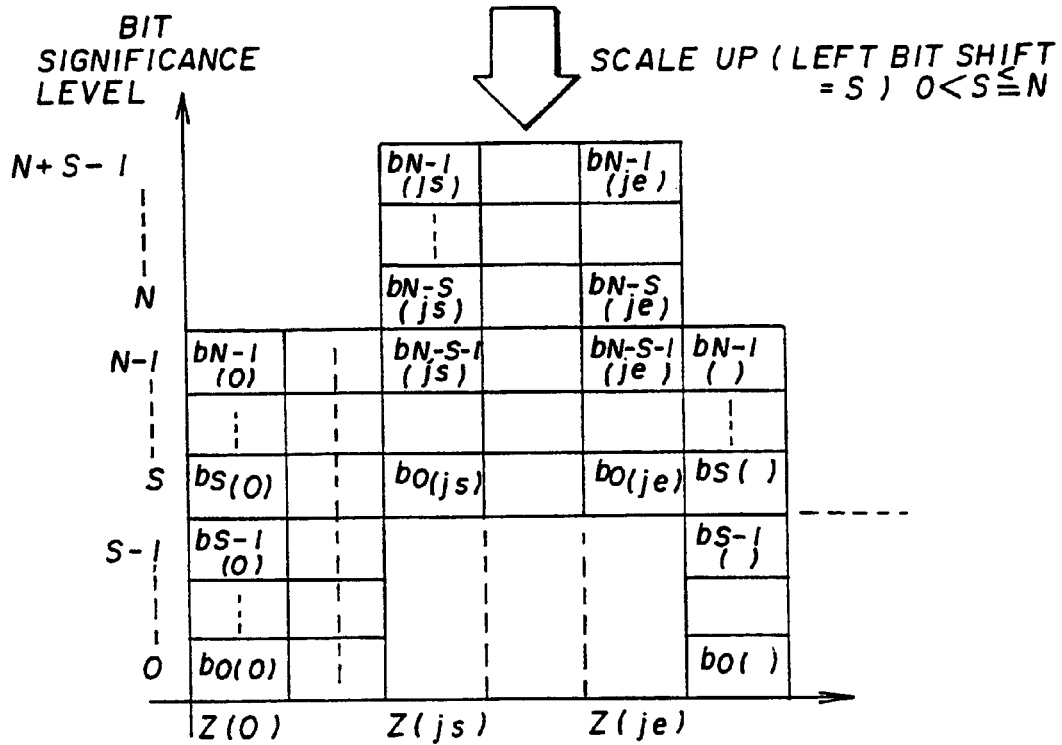
Fig. 3A

Fig. 3C

|  |  |  |  |  |  |  |
|---|---|---|---|---|---|---|
| $b_{N-1}$ | 0 | 0 | 0 | ⋮ | 0 | 0 |
| $b_{N-2}$ | 1 | 1 | 1 | ⋮ | 1 | 1 |
|  |  |  |  | ⋮ |  |  |
|  |  |  |  | ⋮ |  |  |
| $b_1$ |  |  |  | ⋮ |  |  |
| $b_0$ | N-1 |  | N-1 | ⋮ | N-1 | N-1 |

$Z(0)$     $Z(js)$ ----- $Z(je)$

QUANTIZATION INDICES
FOR THE REGION OF INTEREST

⬇ SCALE UP ( LEFT BUT SHIFT = S ) $0 < S \leq N$

|  |  |  |  |  |  |  |
|---|---|---|---|---|---|---|
| $b_{N-1}$ | S | S | 0 | 0 | 0 | S |
| $b_{N-2}$ | S+1 | S+1 | 1 | 1 | 1 | S+1 |
|  |  |  |  |  |  |  |
| $b_{N-S-1}$ | 2S | 2S | S | S | S | 2S |
|  |  |  |  |  |  |  |
| $b_0$ | N+S+1 | N+S+1 | N-1 | N-1 | N-1 | N+S+1 |

$Z(0)$     $Z(js)$ ----- $Z(je)$

QUANTIZATION INDICES
FOR THE REGION OF INTEREST

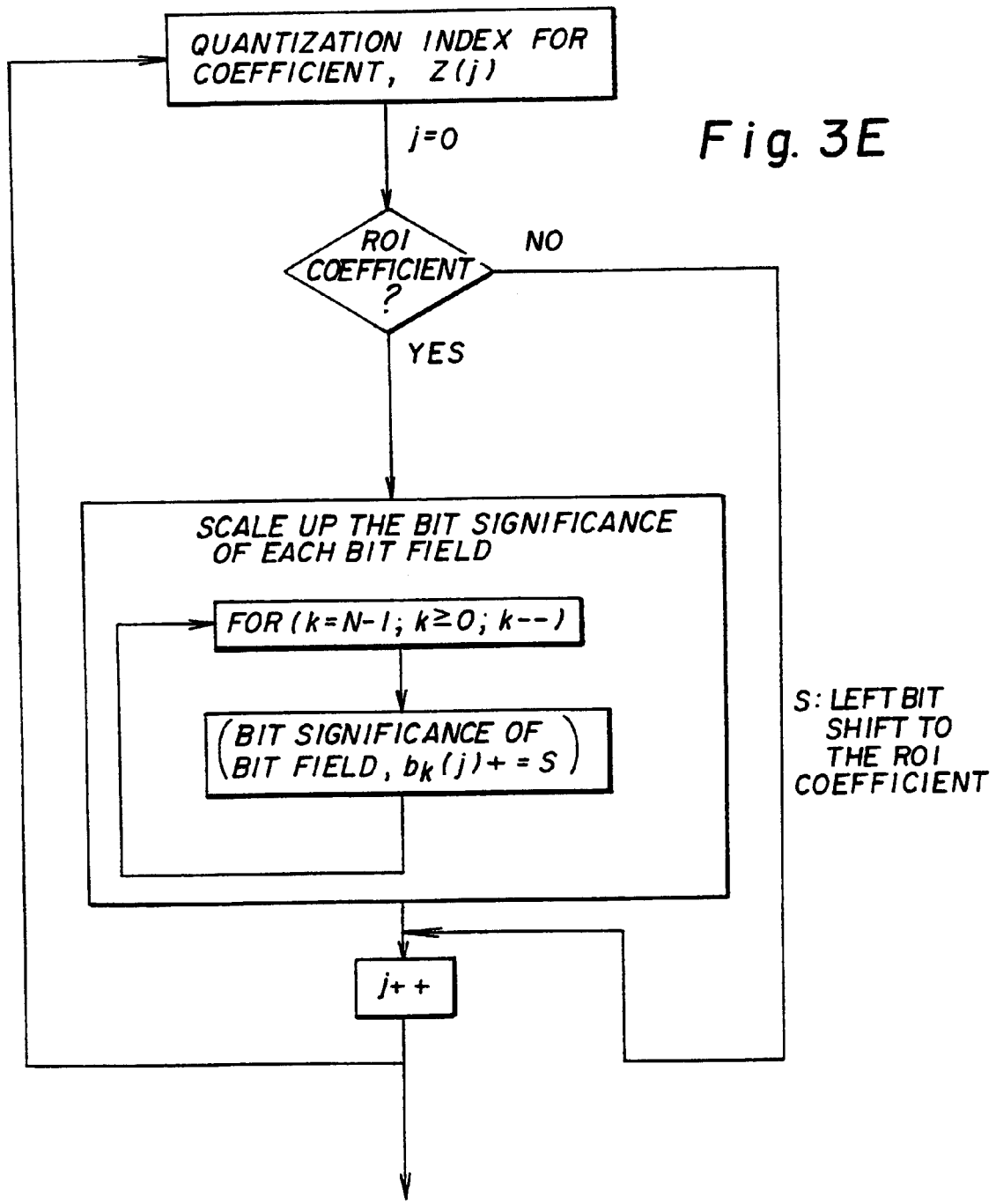

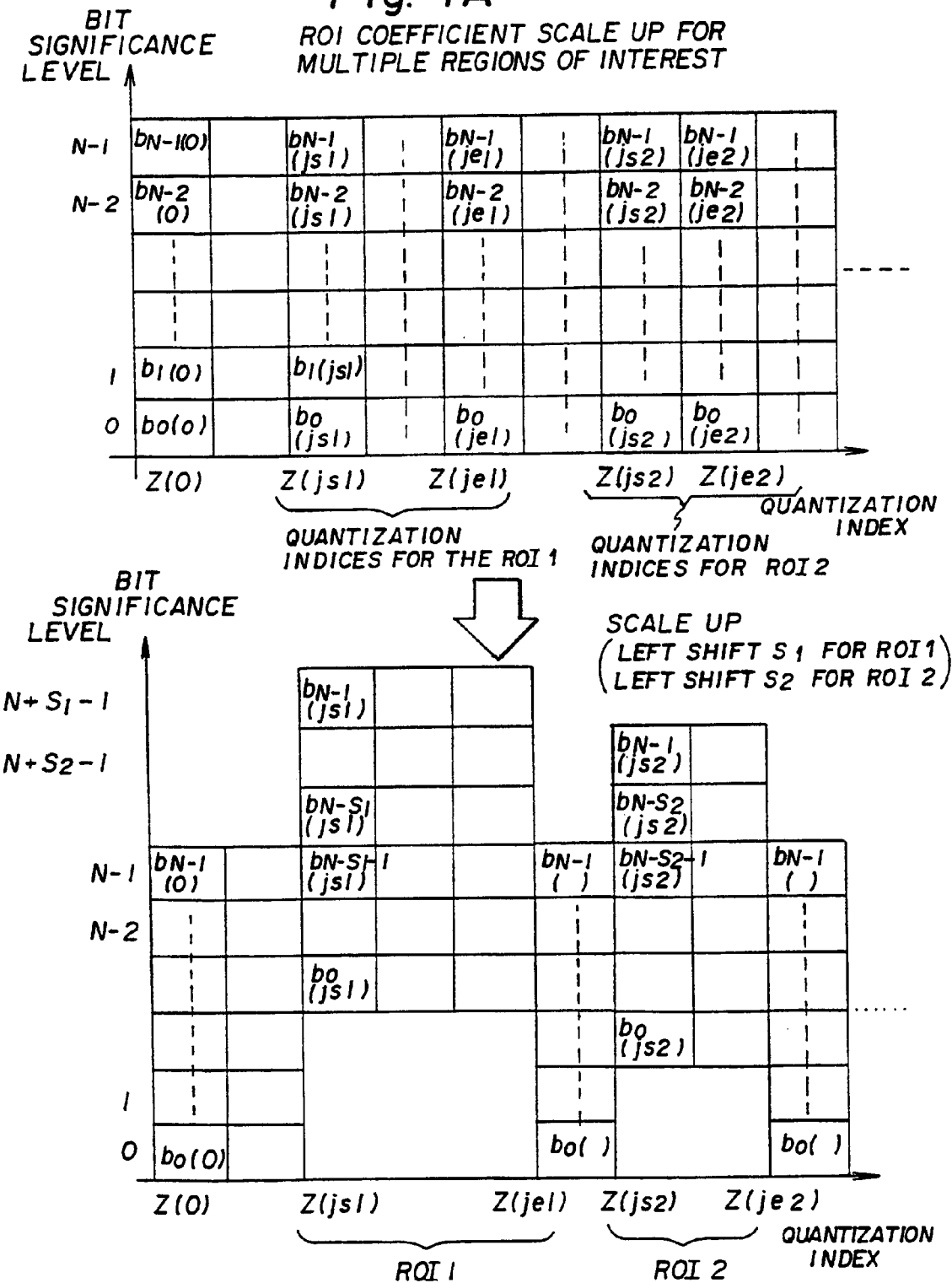

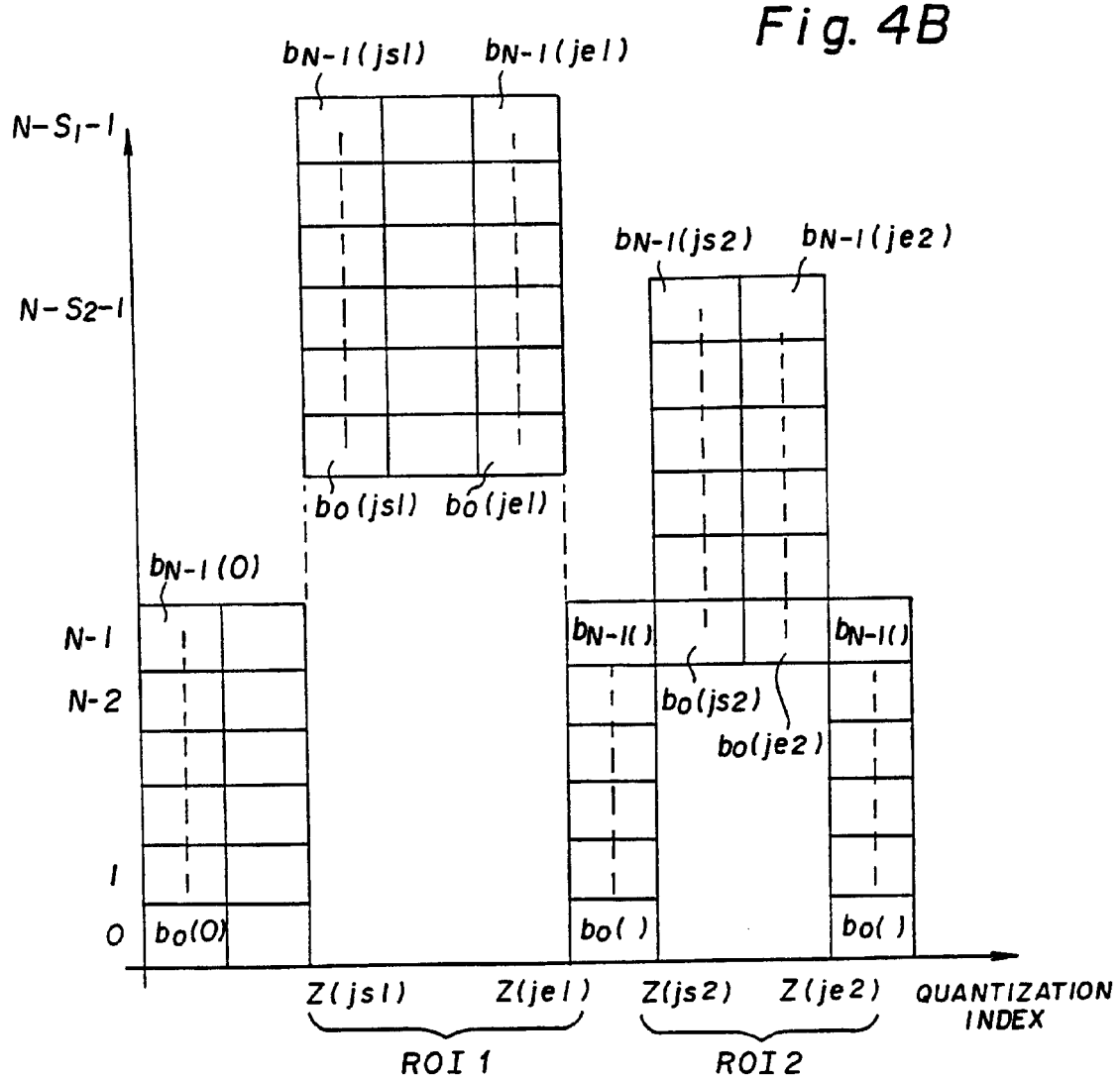

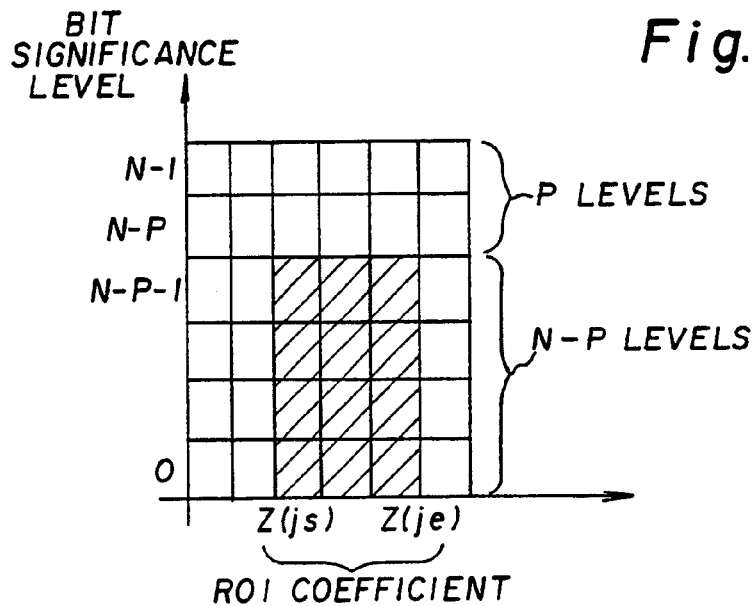
Fig. 5A
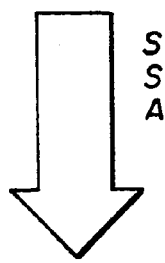
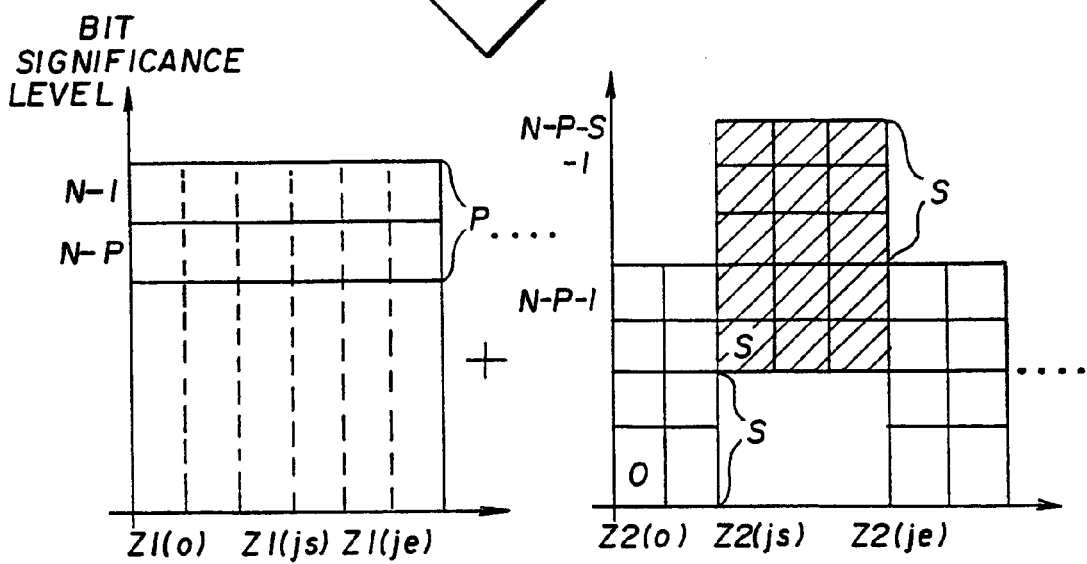

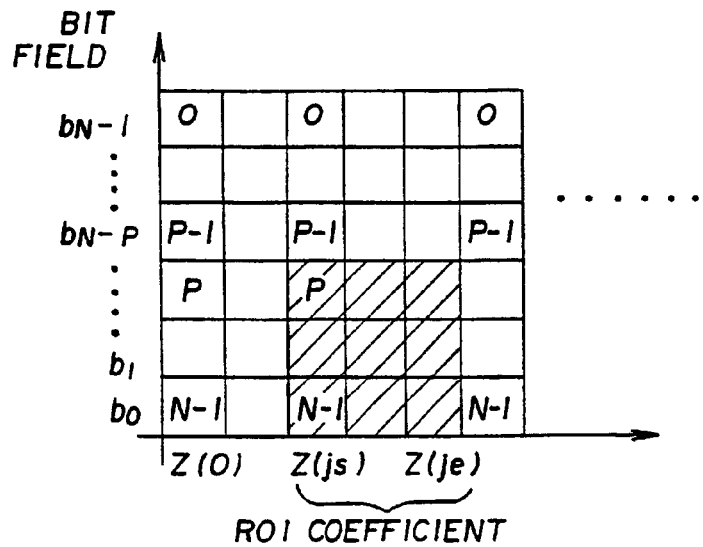
Fig. 5C
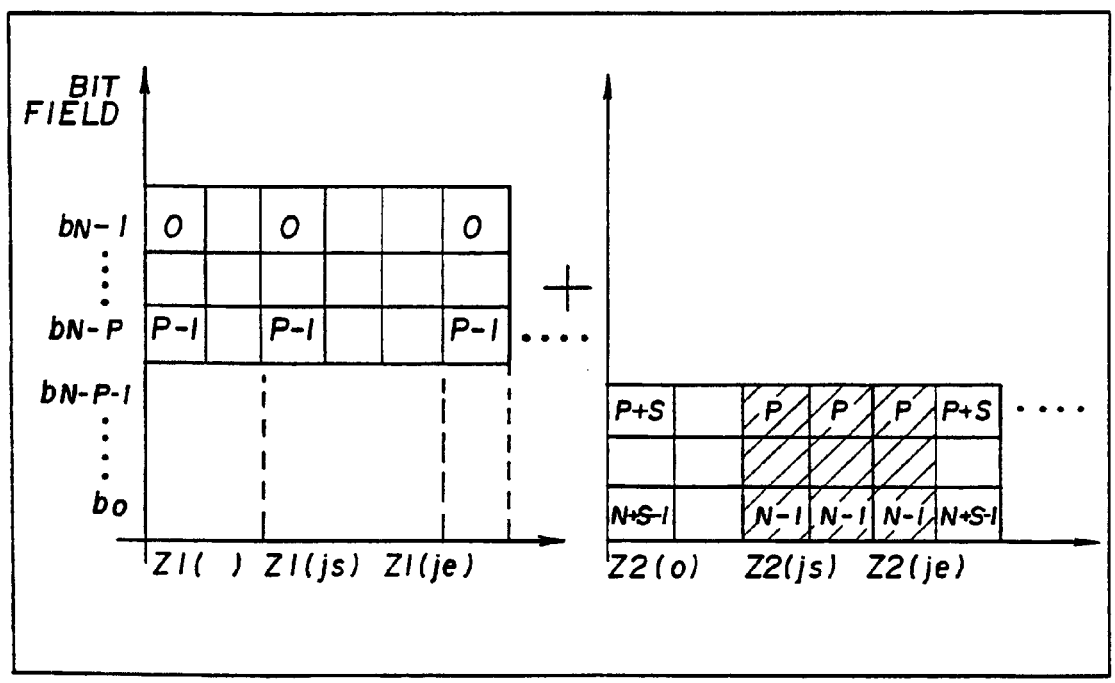

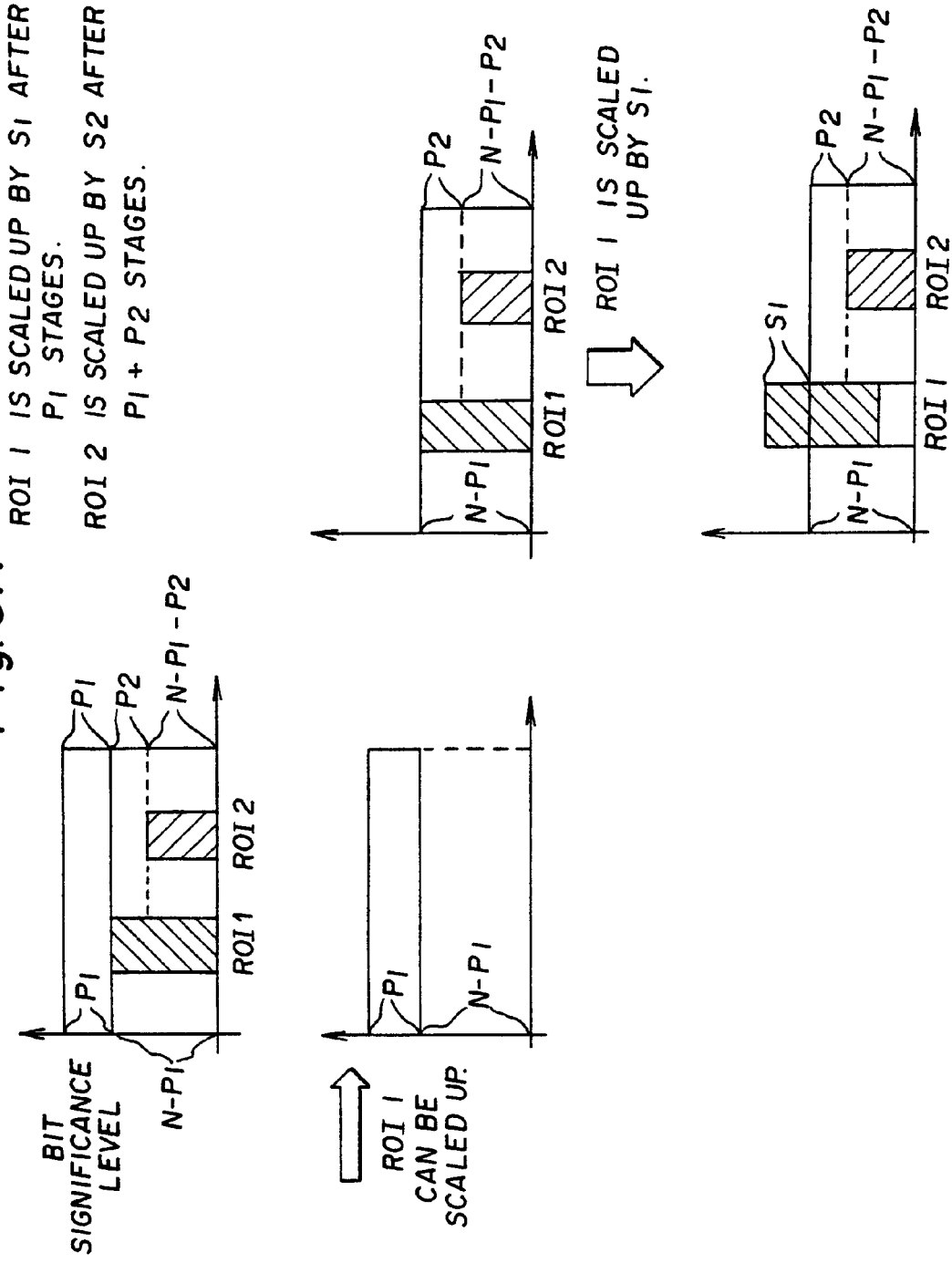

Fig. 6C (ROI 1 IS SCALED UP BY $S_1$ AFTER $P_1$ STAGES. ROI 2 IS SCALED UP BY $S_2$ AFTER $P_1+P_2$ STAGES)
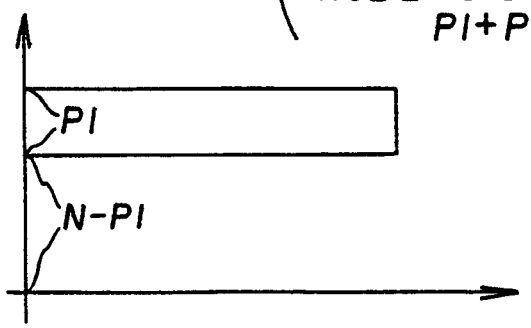
+
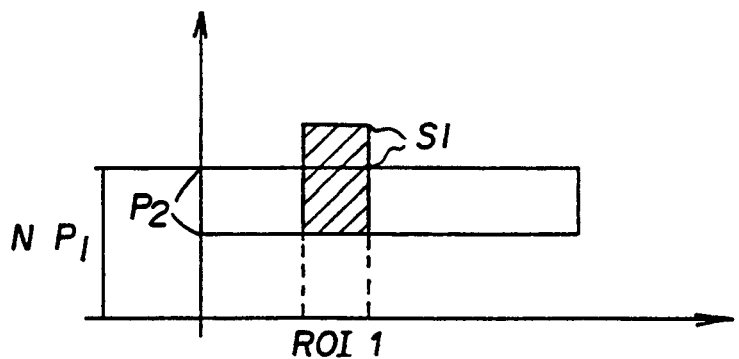
+
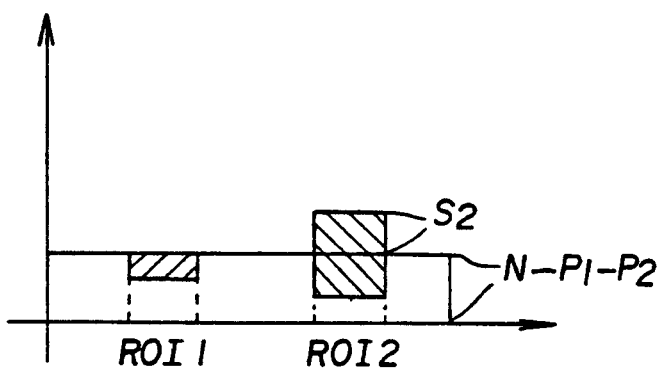

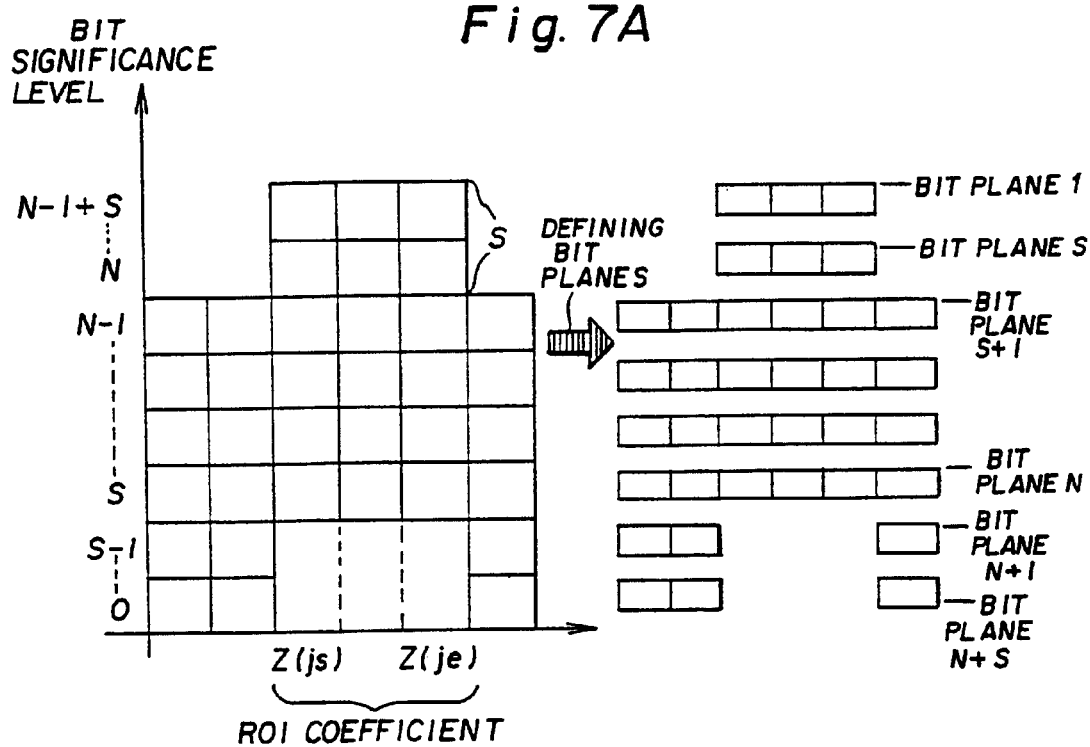
Fig. 7A
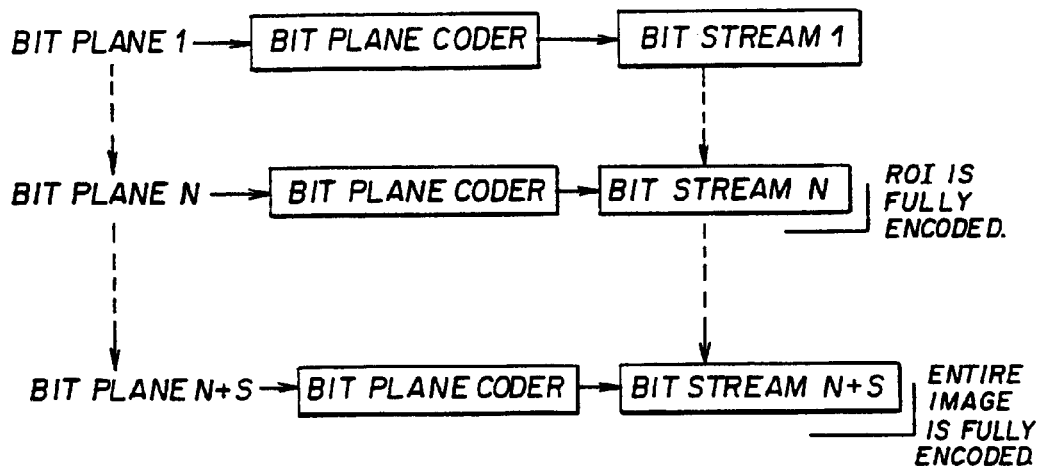

Fig. 7B
• BIT STREAM OF EACH SUBBAND
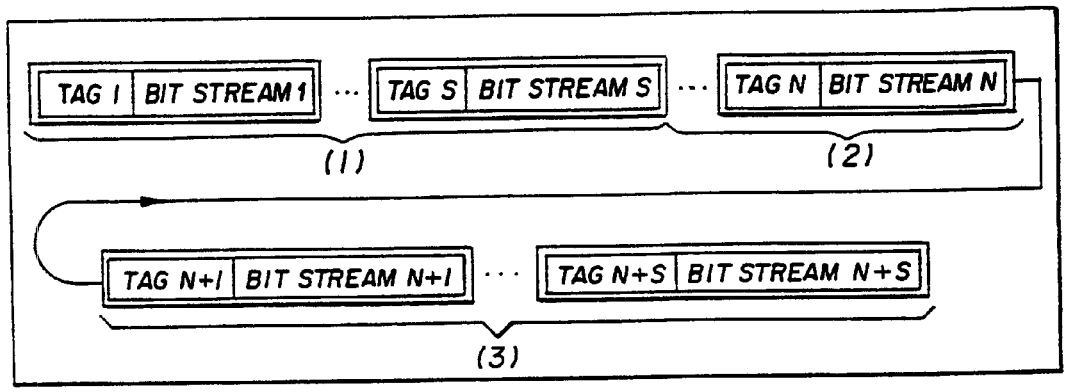
1) BIT STREAM 1 ~ BIT STREAM S : REPRESENTING ROI,
2) BIT STREAM S-1 ~ BIT STREAM N : REPRESENTING ROI – THE REST OF THE IMAGE,
3) BIT STREAM N-1 ~ BIT STREAM N-S : REPRESENTING THE REST OF THE IMAGE.
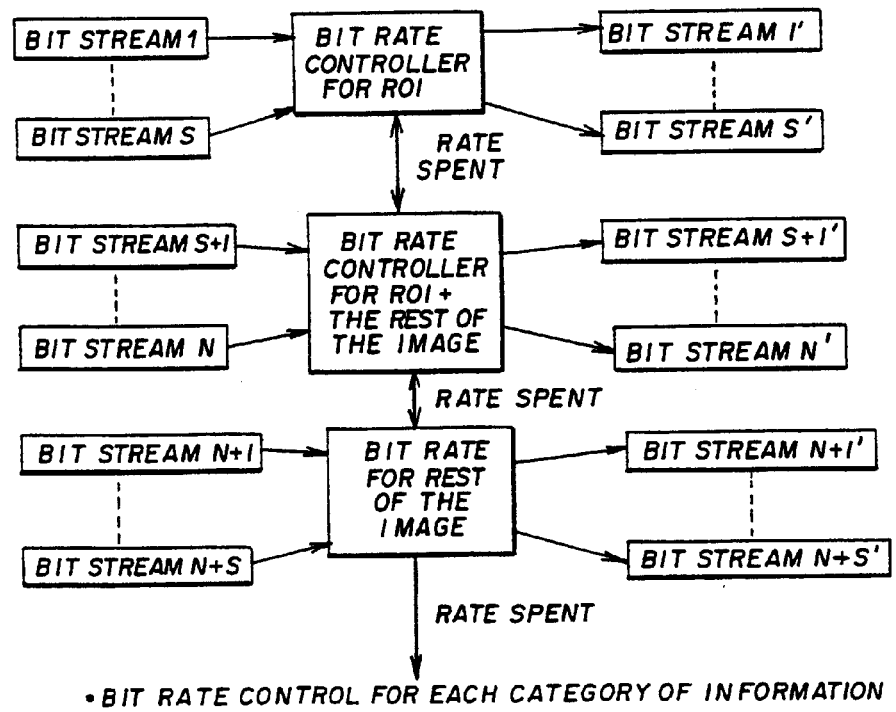
• BIT RATE CONTROL FOR EACH CATEGORY OF INFORMATION

• BIT STREAM OF EACH SUBBAND
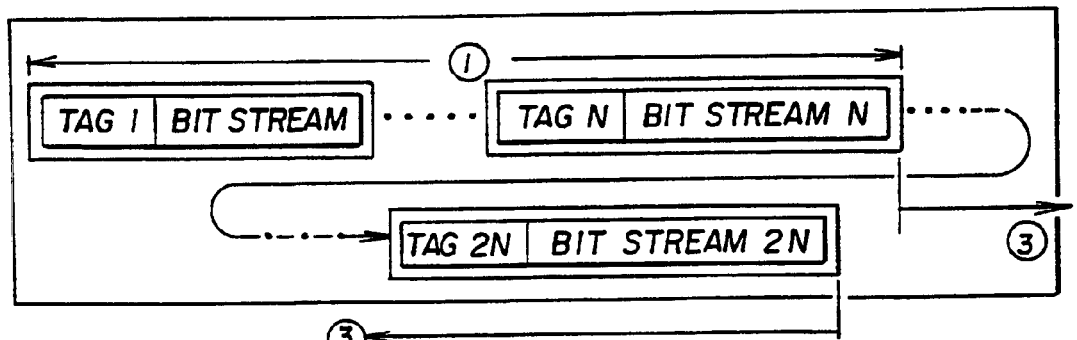
① BIT STREAM 1 ~ BIT STREAM N : REPRESENTING ROI
③ BIT STREAM N+1 ~ BIT STREAM 2N : REPRESENTING THE REST OF THE IMAGE
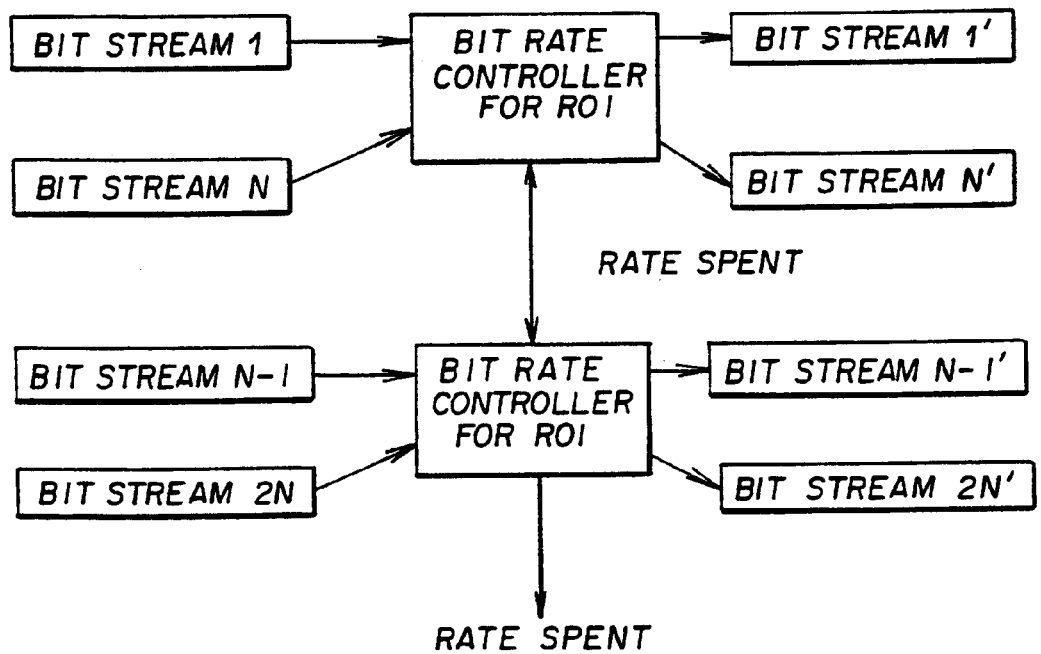
• BIT RATE CONTROL FOR EACH CATEGORY OF INFORMATION
Fig. 7D 1) BIT STREAM I~P : REPRESENTING THE ENTIRE IMAGE
   (BEFORE ROI CODING OCCURS),
2) BIT STREAM P+1~P+S : REPRESENTING ROI,
3) BIT STREAM P+S+1~N : REPRESENTING ROI + THE REST OF THE IMAGE
4) BIT STREAM N+1~N+S : REPRESENTING THE REST OF THE IMAGE

BIT RATE CONTROL FOR EACH CATEGORY OF
INFORMATION

Fig. 9
ROI COEFFICIENT IDENTIFICATION
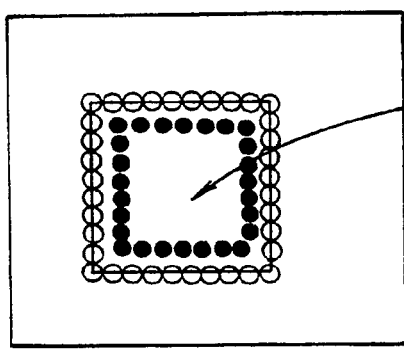
\# IMAGE AND SELECTED REGION OF INTEREST
O : PIXELS ON THE BOUNDARIES OF REGION OF INTEREST
● : PIXELS ON WITHIN 1 PIXEL INSIDE THE THE BOUNDARIES
TRANSFORM COEFFICIENTS CORRESPONDING TO THE SELECTED REGION OF INTEREST.
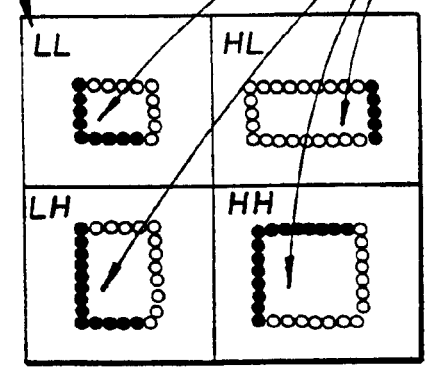
ROI COEFFICIENT IDENTIFICATION IN
1 LEVEL WAVELET DECOMPOSED SUBBANDS

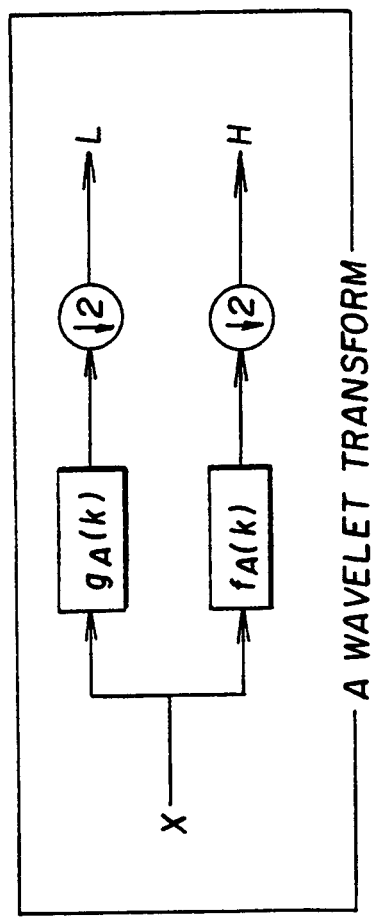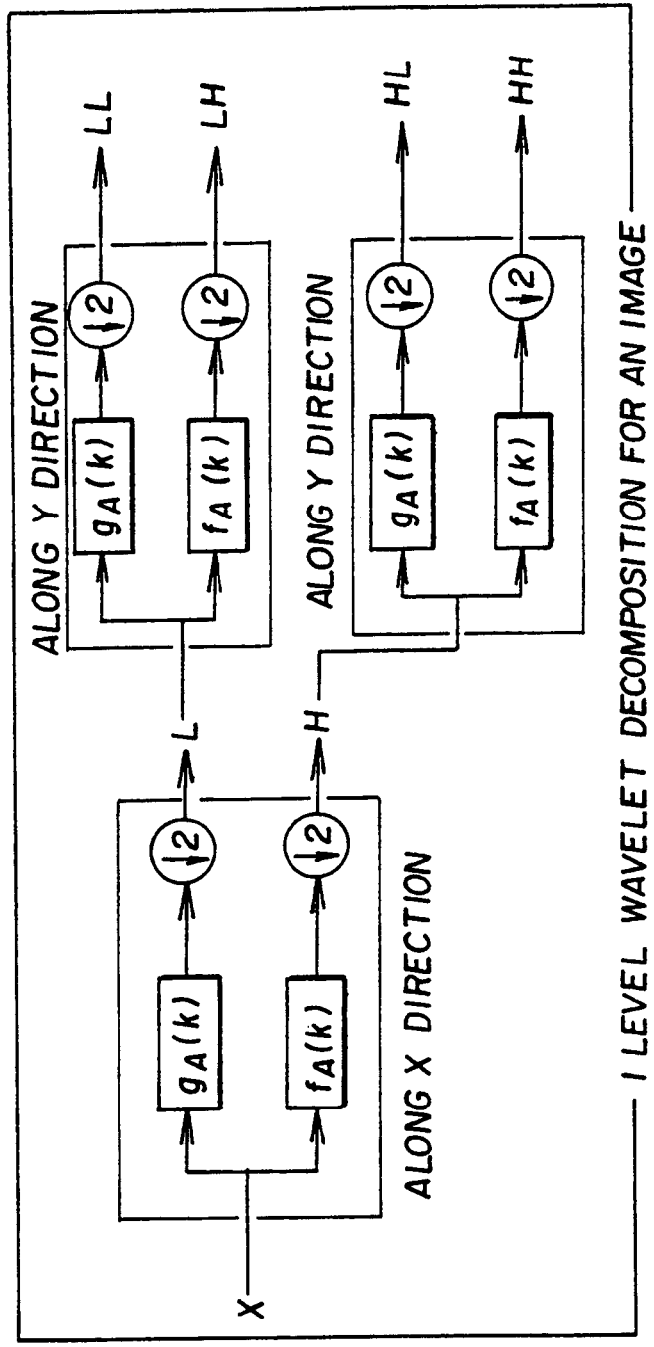
Fig. 10A

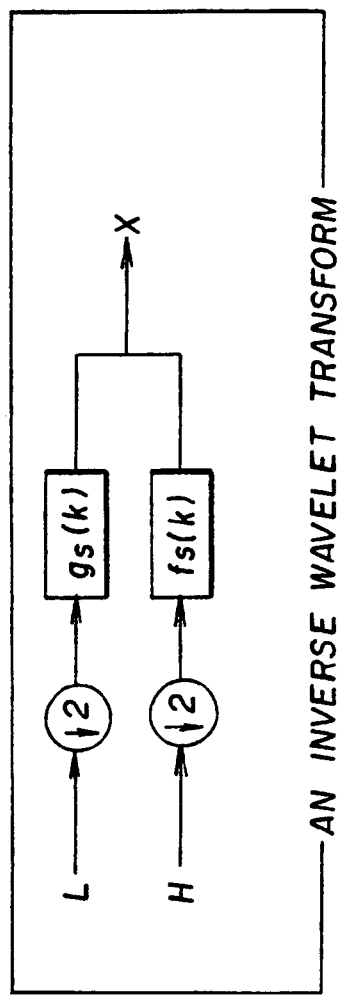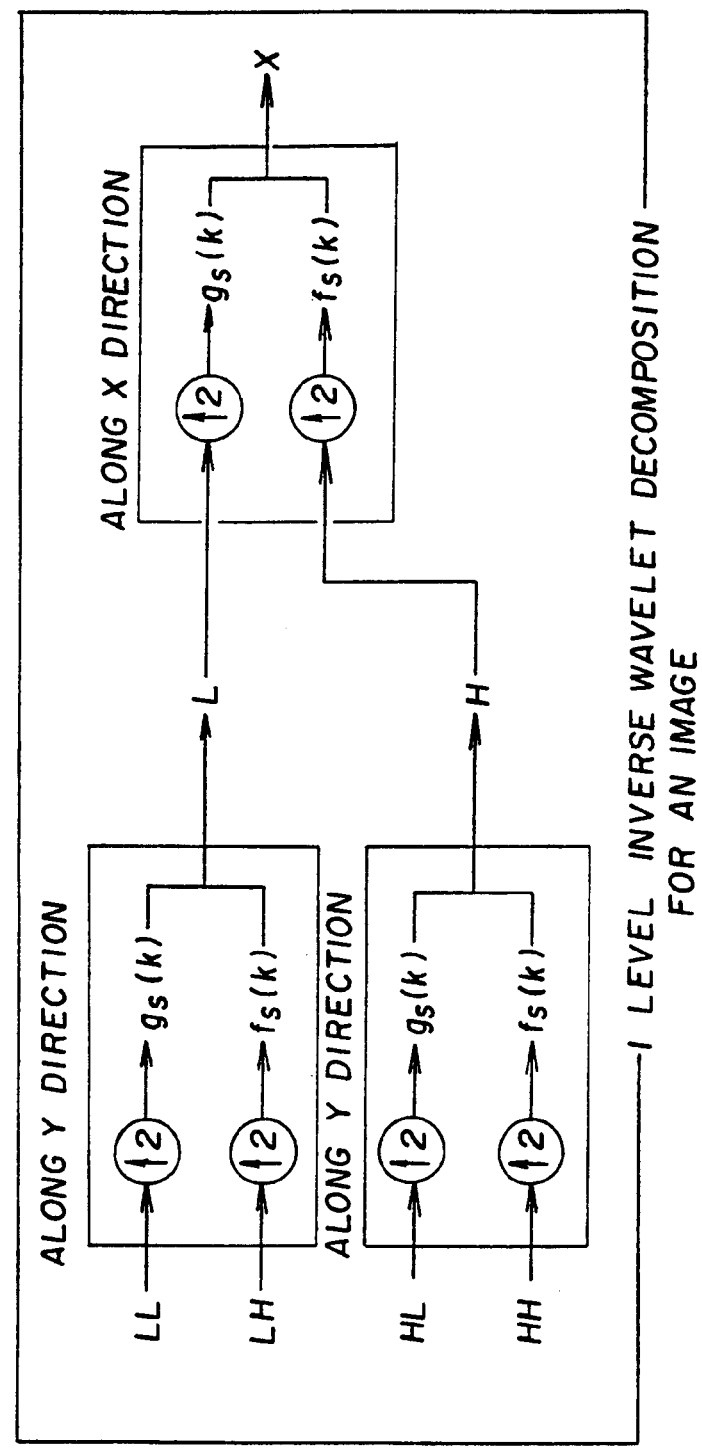
Fig. 10B

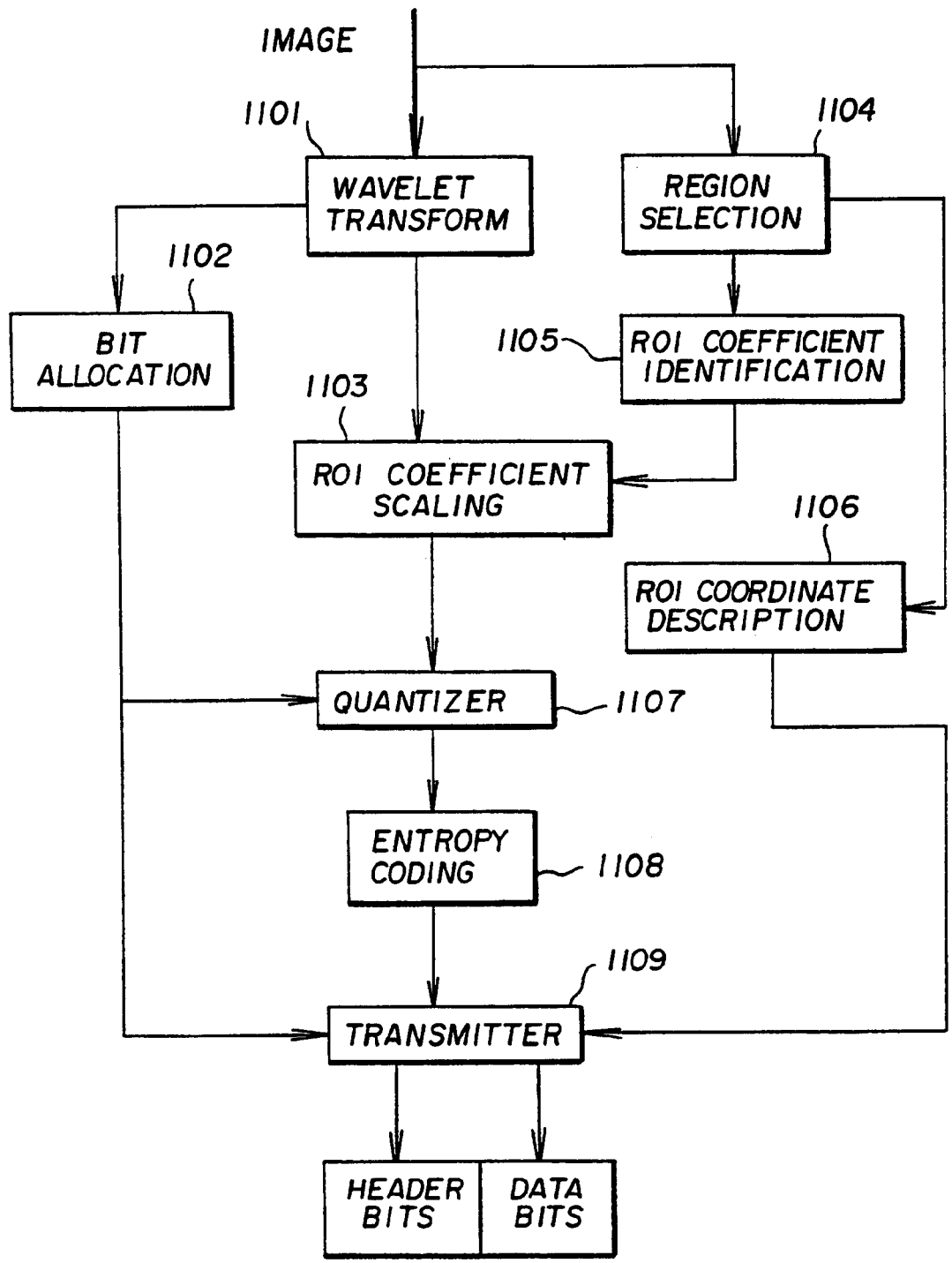

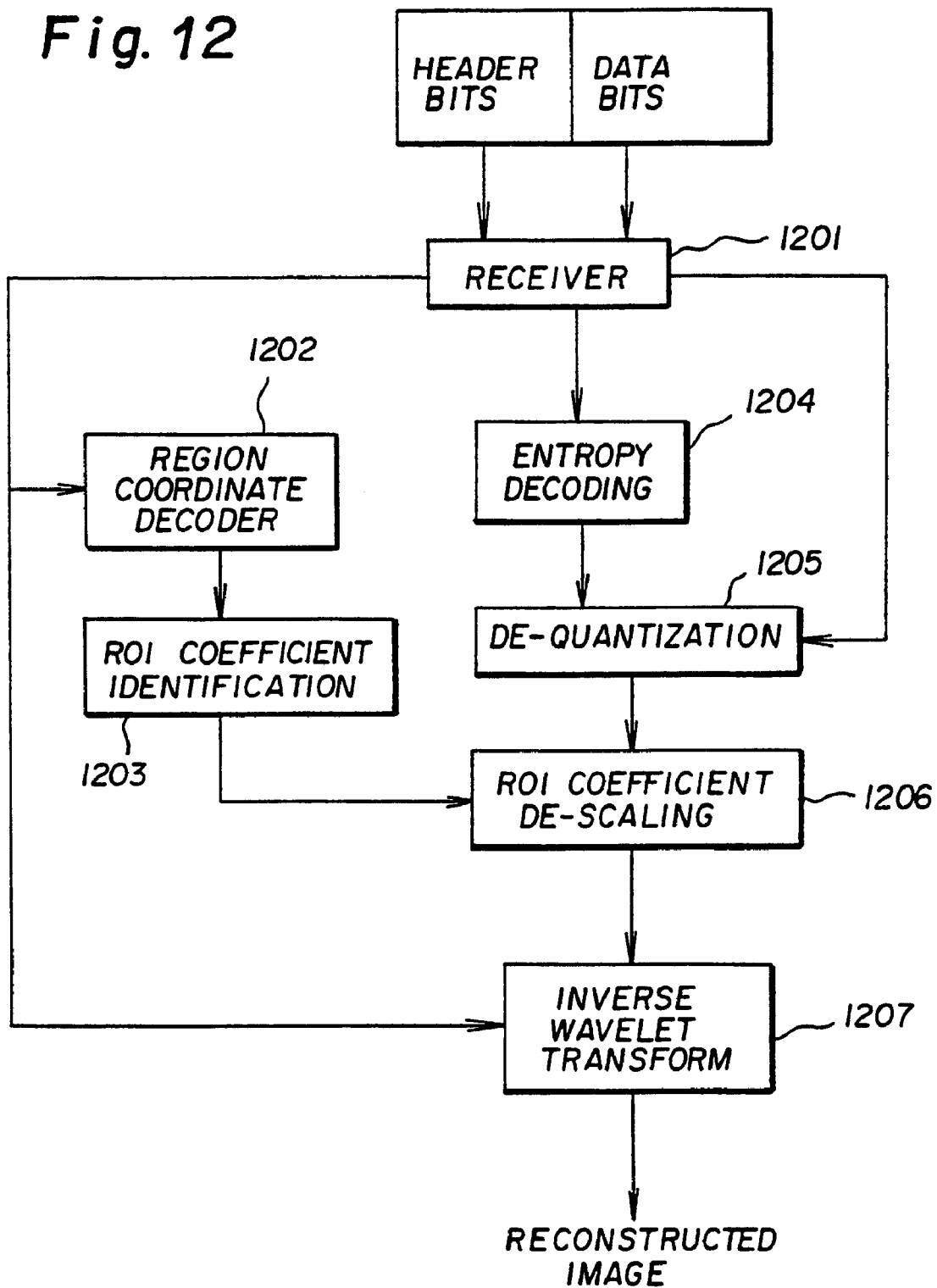

Fig. 13
• IMAGE IS DIVIDED INTO BLOCKS
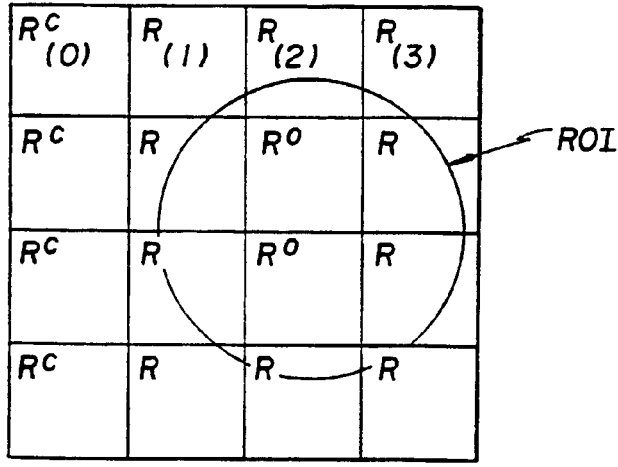
IMAGE
• EACH BLOCK IS ENCODED AS FOLLOWS:
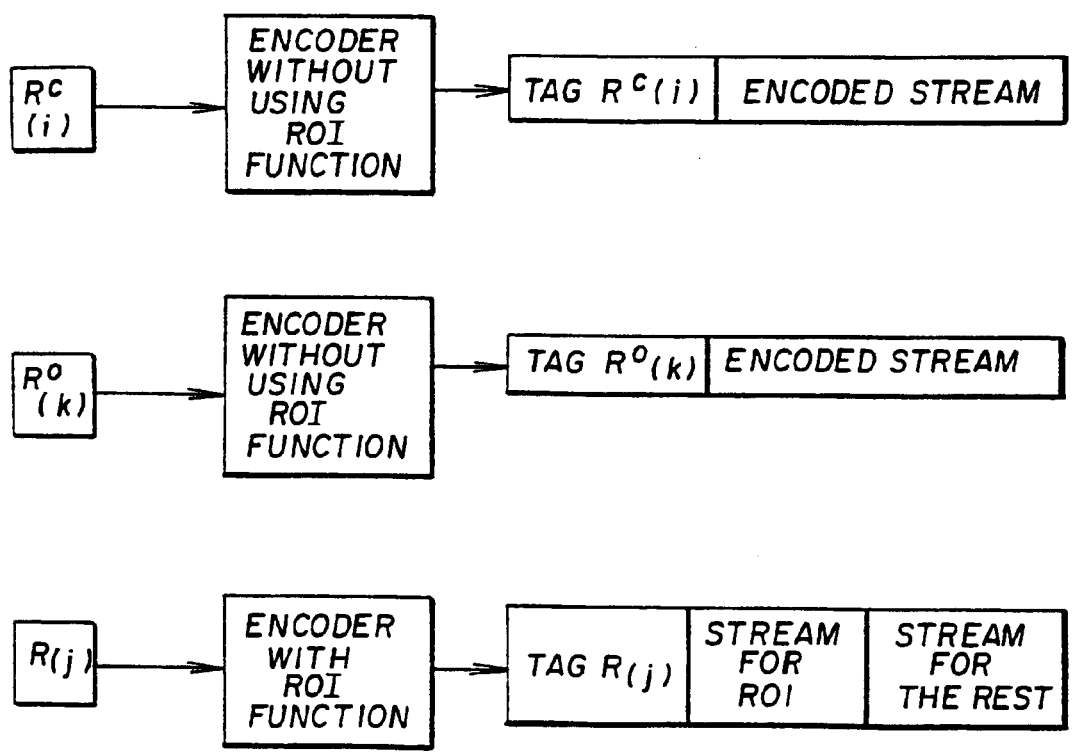

METHOD AND APPARATUS FOR COMPRESSING AND DECOMPRESSING IMAGES

BACKGROUND OF THE INVENTION:

1. Field of the Invention

Modern computers and modern computer networks enable the transfer of a significant amount of information between computers and between a computer and a storage device. When computers access local storage devices, such as a local hard drive or local floppy drive, significant amounts of information can be quickly accessed. However, when seeking to access data from a remote storage location such as over a wide area network (WAN), the internet, or a wireless communication channel (cellular phone network, etc), data transfer rates are significantly slower. Transferring large files, therefore, takes significant amounts of time. Additionally, storage of large files utilizes valuable and limited storage space. Photographic images and similar graphical images typically are considered to be large files, since an image conventionally requires information on each picture element or pixel in the image. Photographs and similar graphical images, therefore, typically require over one megabyte of storage space, and therefore require significant transmission times over slow network communications. In recent years, therefore, numerous protocols and standards have been developed for compressing photographic images to reduce the amount of storage space required to store photographic images, and to reduce transfer and rendering times. The compression methods essentially create mathematical or statistical approximations of the original image.

Compression methods can broadly be categorized into two separate categories: Lossy compression methods are methods wherein there is a certain amount of loss of fidelity of the image; in other words, close inspection of the reproduced image would show a loss of fidelity of the image. Lossless compression methods are ones where the original image is reproduced exactly after decoding. The present invention is directed to an efficient image compression method and apparatus wherein a part, or parts, of an image can be compressed with a higher level of fidelity in the reproduced image than other parts of the image, based on a selection of region-of-interests by the user or the system which is initially encoding or compressing the image, or the user or the system which receives and decodes the image data through interaction with the encoding side.

2. Description of the Related Art

A currently popular standard for compressing images is called the JPEG or "J-peg" standard. This standard was developed by a committee called The Joint Photographic Experts Group, and is popularly used to compress still images for storage or network transmission. Recent papers by Said and Pearlman discuss new image coding and decoding methods based upon set partitioning in hierarchical trees (SPIHT). See Said and Pearlman, Image Codec Based on Set Partitioning in Hierarchical Trees, IEEE Transactions on Circuits and Systems for Video Technology, vol. 6, no. 3, June 1996, and Said and Pearlman, Image Multi-Resolution Representation, IEEE Transactions on Image Processing, vol. 5, no. 9, September 1996. The contents of these papers are hereby incorporated by reference. These references disclose computer software which, when loaded and running on a general purpose computer, performs a method and creates an apparatus which utilizes integer wavelet transforms which provide lossy compression by bit accuracy and lossless compression within a same embedded bit stream, or an apparatus which utilizes non-integer wavelet transforms which provide lossy compression by bit accuracy within a single embedded bit stream. An image which is initially stored as a two dimensional array representing a plurality of individual pixels prioritizes bits according to a transform coefficient for progressive image transmission.

The most important information is selected by determining significant or insignificant elements with respect to a given threshold utilizing subset partitioning. The progressive transmission scheme disclosed by Said and Pearlman selects the most important information to be transmitted first based upon the magnitude of each transform coefficient; if the transform is unitary, the larger the magnitude, the more information the coefficient conveys in the mean squared error (MSE, $D_{mse}(\ )$) sense;

$$D_{mse}(p-\hat{p}) = \frac{\|p-\hat{p}\|^2}{N} = \frac{1}{N}\sum_i\sum_j(p_{i,j}-\hat{p}_{i,j})^2$$

where (i,j) is the pixel coordinate, with p, therefore representing a pixel value. Two dimensional array c is coded according to $c=\Omega(p)$, with $\Omega(.)$ being used to represent a unitary hierarchical subband transformation. Said and Pearlman make the assumption that each pixel coordinate and value is represented according to a fixed-point binary format with a relatively small number of bits which enables the element to be treated as an integer for the purposes of coding. The reconstructed image $\hat{p}$ is performed by setting a reconstruction vector $\hat{c}$ to 0, and calculating the image as:

$$\hat{p}=\Omega^{-1}(\hat{c})$$

N is the number of image pixels, and the above calculation for mean squared-error distortion can therefore be made. Using mathematical assumptions, it is known that the mean squared-error distortion measure decreases by $\|c_{i,j}\|^2/N$. This fact enables pixel values to be ranked according to their binary representation, with the most significant bits (MSBs) being transmitted first, and also enables pixel coefficients with larger magnitude to be transmitted first because of a larger content of information. An algorithm is utilized by the encoder to send a value representing the maximum pixel value for a particular pixel coordinate, a sorting pixel coordinates by wavelet transform coefficient values, then outputting a most significant bit of the various coefficients, using a number of sorting passes and refinement passes, to provide high quality reconstructed images utilizing a small fraction of the transmitted pixel coordinates. A user can set a desired rate or distortion by setting the number of bits to be spent in sorting passes and refinement passes.

SUMMARY OF THE INVENTION

The invention is a method and apparatus for encoding images for transmission or storage where a region of interest (ROI) or certain regions of the image are to be emphasized and for decoding the encoded image after transmission or retrieval from storage. The encoding method includes selecting a region or regions of interest in digital image data, and specifying a priority to each region. A wavelet transform of the pixel values of the entire image is performed in order to obtain the transform coefficients of the wavelet, and the transform coefficients corresponding to each region of interest are identified. The transform coefficients for each region of interest are emphasized by scaling up these transform coefficients in such a way that more bits are allocated to these transform coefficients or encoding ordering of these coefficients are advanced. After the scaling up the transform coefficients for each region of interest, quantization is performed on the transform coefficients for the entire image in order to obtain the quantization indices. In the alternative, the quantization indices of the quantized transform coefficients corresponding to each region of interest are scaled up according to the priority assigned to each region of interest. After the quantization for the entire image, scaling up is performed for each region of interest. The quantization indices of the transform coefficients are entropy encoded based upon the encoding strategy such as encoding ordering or bit allocation determined by the scaling up for each region of interest in order to form a data bit stream. A bit stream header is formed, and the data bit stream is appended to the bit stream header. The entropy coding is performed on each bit field of the binary representation of the quantization indices of the transform coefficients. Either bit plane coding is used, such as a binary arithmetic coding technique, or a zero-tree coding technique, such as SPIHT coding, is used. The decoding method includes separating the bit stream header from the data bit stream, decoding the description such as coordinates of the region or regions of interest, priority to each region, size of the image, and the number of wavelet decomposition levels from the bit stream header. The wavelet transform coefficients corresponding to a region or regions of interest specified by the description of the region or the regions of interest are identified, and the data stream is entropy decoded by following the decoding ordering determined by the identified result of the transform coefficients corresponding to each region of interest and the priority assigned to each region of interest. This forms a set of subbands containing the quantization indices of the transform coefficients. Either the de-quantized transform coefficients or the quantization indices of the transform coefficients corresponding to each region of interest are scaled down. If scaling up and quantization are performed in this order at the encoder, de-quantization of the transform coefficients for the entire image and scaling down the quantized transform coefficients for each region of interest is performed in this order; if quantization and scaling up are performed in this order at the encoder, scaling down the quantization indices for each region of interest and de-quantization of the quantization indices for the entire image is performed in this order. In either case, de-quantization is performed on the quantization indices in order to obtain the quantized transform coefficients. The inverse wavelet transform is performed on the de-quantized transform coefficients in order to form the pixel values on the entire image. The digital image in this invention can be not only two dimensional digital data but also one dimensional digital data such as voice data, electrocardiogram data, seismic wave data. When the data is one dimensional, steps and means based on wavelet transform, subband, ROI coefficient identification or inverse wavelet transform which are applied along each dimension of the two dimensional data are applied only along the single dimension of the data.

BRIEF DESCRIPTION OF THE DRAWINGS

For a clear understanding of the embodiments of the invention, reference should be made to the accompanying drawings, wherein:

FIGS. 3A–3F illustrate a method of ROI coefficient scaling;

FIGS. 4A and 4B illustrate an ROI coefficient scaling method wherein multiple regions of interest are to be emphasized with different priorities;

FIGS. 5A–5C illustrate an ROI coefficient scaling method that uses some of the bit elements in the quantization indices for a ROI in order to emphasize the ROI;

FIGS. 6A–6C illustrate an ROI coefficient scaling method where multiple regions of interest are emphasized from different stages of encoding with different priority is disclosed;

FIGS. 7A–7D illustrate entropy coding of the quantization indices with a bit plane based coder under the encoding strategy determined by the ROI coefficient scaling.

FIG. 9 illustrates an identification process performed only on the pixels on the boundaries of the region of interest and on the pixels which locate one pixel inside the boundaries of the region of interest;

FIGS. 10A and 10B illustrate a wavelet transform accomplished by a low pass filter whose filter coefficients are $g_A(k)$ and a high pass filter whose filter coefficients are $f_A(k)$ and a down sampler which discards every other pixel or transform coefficient;

FIG. 11 illustrates an encoding method for representing the input image with a set of subbands consisting of the transform coefficients;

FIG. 12 illustrates a method of decompressing an image which is encoded by the encoding method of FIG. 11 with an emphasis on a selected region of interest;

FIG. 13 illustrates ROI coding when encoding and decoding are done on a block by block basis;

DETAILED DESCRIPTION OF THE PREFERRED EMBODIMENTS

The present invention is directed to a method and apparatus of performing image compression wherein a region of interest specified by the user is emphasized so that it is encoded with higher fidelity than the rest of the image. The emphasis can occur either during the beginning or from the middle of the encoding process. If it occurs during the middle of encoding, the emphasis can be driven by the use at the receiving side which receives portions of the encoded bit stream while the encoding is underway. The emphasis to the region of interest is done in the transform coefficient domain in order not to cause artificial boundaries around the region of interest on the reconstructed image. In an embodiment where the emphasis is done on the transform coefficients after the quantization, information ordering of the quantization indices corresponding to the region of interest is modified so that the region of interest can be reconstructed at the earlier stages of progressive reconstruction; therefore, the region of interest is reconstructed with a higher fidelity at the low bit rate. Since the emphasis on the region of interest merely modifies the ordering with which the bit fields of the quantization indices are encoded, the emphasis does not cause any information loss. Also the modification of the information ordering is applicable not only by each coefficient level but also by each bit field level of the coefficient, which not only improves the quality of the specific parts of the image but also flexibly modifies the encoding ordering with which each part of the image is reconstructed. Another embodiment of this invention is to emphasize the transform coefficients before quantization. This embodiment does not provide such a flexible functionality as the other mode, but makes it possible to reconstruct the region of interest with higher fidelity than the rest of the image at any bit rate at a minimal increase of computational complexity.

Figure 1:
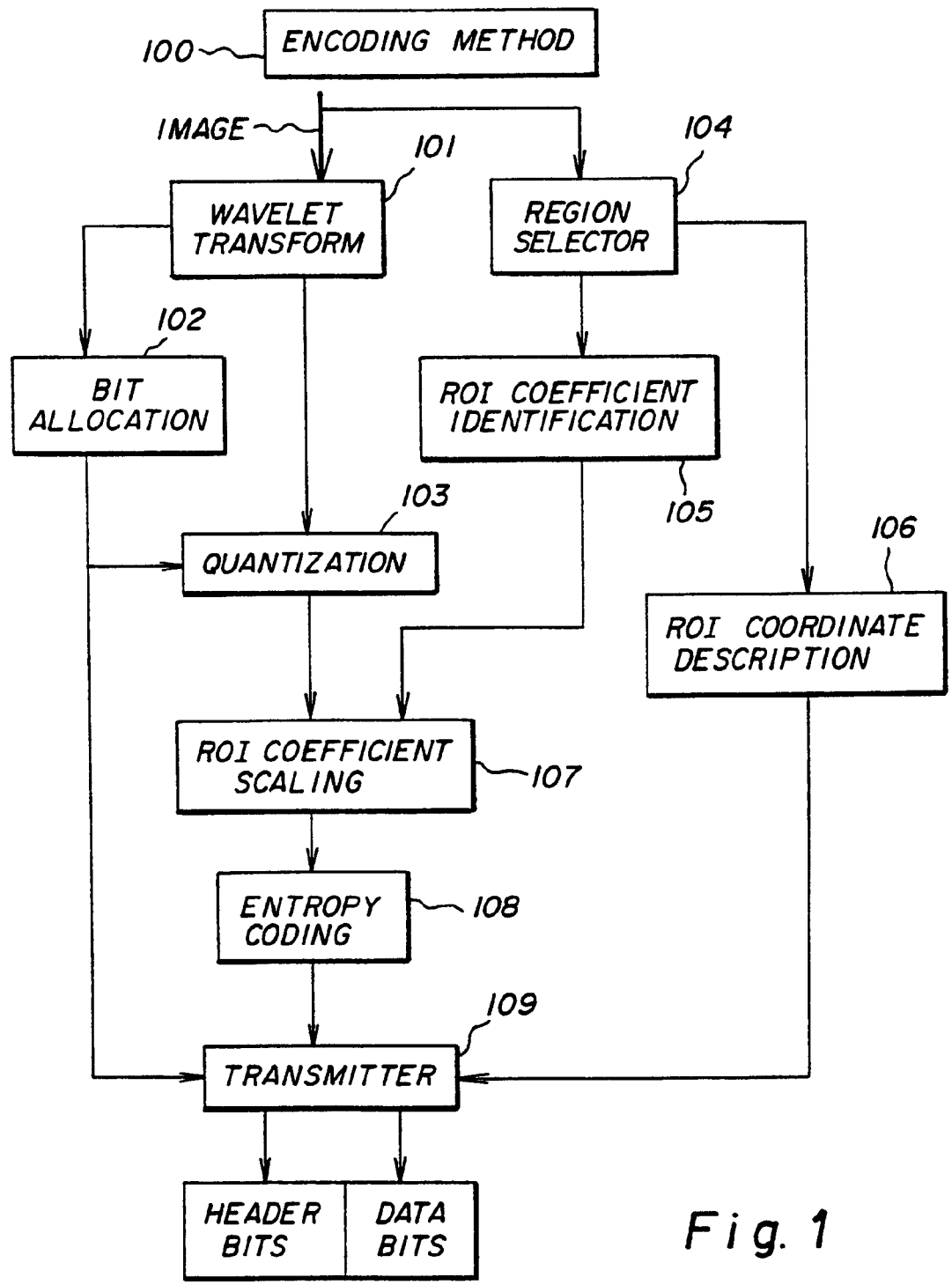
FIG. 1 illustrates a method for compressing an image with an emphasis on a selected region of interest in an image by allocating more bits to the region of interest.

FIG. 1 illustrates a method for compressing an image with an emphasis on a selected region of interest in an image by allocating more bits to the region of interest or encoding the region of interest at the earlier stages of the encoding process than to the regions outside of the region of interest. Encoding method 100 comprises step 101 for performing a wavelet transform on the pixel values of the input digital image in order to represent the input image by a set of subbands consisting of the transform coefficients. Step 101 is followed by bit allocation step 102 and a quantization step 103. At step 102, a bit per coefficient (i.e., representation accuracy of the coefficient) is assigned to the transform coefficients in each subband in order to represent the transform coefficients with digitized values is determined in such a way that the subband which has higher variance or higher energy of the transform coefficients will be allocated a larger number of bits per coefficient, which is equivalent to being allocated a smaller quantization step size. However, in the case where the bit per coefficient for each subband or for all the subbands is predetermined, step 102 is not performed. The allocated bits per coefficient are used in step 103. At step 103, quantization is performed on the transform coefficients in each subband in order to represent the transform coefficients of each subband with quantization indices whose representation accuracy is specified by the allocated bits per coefficient or by the quantization step size for each subband. Through step 103, quantization indices representing transform coefficients with a reduced or the same representation accuracy of the transform coefficient values is obtained. The obtained quantization indices are input to ROI coefficient scaling step 107.

Before, after, or together with steps 101, 102 and 103, region of interest selection step 104, ROI coefficient identification step 105, and ROI coordinate description step 106 are performed. At step 104, the region of interest is selected on the input image and the coordinates of the selected region of interest are input to steps 105 and 106. At step 105, wavelet transform coefficients corresponding to the selected region of interest, i.e., ROI coefficients, in each subband are identified in order to emphasize the selected region of interest in the image by emphasizing the ROI coefficients in each subband containing the wavelet transform coefficients. The identification result of the ROI coefficients (i.e., categories of the coefficients), which depicts whether the transform coefficients correspond to each region of interest or regions outside of the region of interest, is input to step 107.

At ROI coordinate description step 106, coordinates of the selected region of interest are encoded in order to effectively transmit or store the ROI coordinate information, from which decoder can tell what region of interest is selected to be emphasized in the reconstructed image.

The ROI description information is added to the header bits in the bit stream in transmission step 109.

At ROI coefficient scaling step 107, among the quantization indices input from 103, only the quantization indices for the transform coefficients corresponding to the region of interest are emphasized in such a way that the quantization indices for the ROI coefficients are scaled up by a left bit shift value (S) specified by a priority assigned to the region of interest so that the indices for the ROI coefficients are to be encoded as if the indices had larger values than their actual values. Therefore, they are encoded with a larger number of bits at a given bit rate or encoded at the earlier stages of the encoding process, at the following step 108 entropy encoding. The quantization indices, some of which are scaled up, are input to step 108 together with the category of the coefficients, the identification result of ROI coefficients, formed at step 105 and the priority (the left bit shift value, S) used for the scaling up.

At step 109 entropy coding, an entropy coding is performed on each bit element of the binary representation of the quantization indices in order to form an encoded data stream within which encoded bits generated from the bit fields at the higher bit significance level of the quantization indices are placed in the earlier portion of the bit stream than other encoding bits generated from the bit fields at the lower bit significance level. In other words, an entropy coding is performed on each bit field of the binary representation of the quantization indices in such an order that the bit field at the highest bit significance level (Most Significant Bit) is encoded first and bit fields at the decreasing order of bit significance levels are encoded in a decreasing order of bit significance levels. The entropy coding step can be terminated or suspended at any bit rate: when the bit budget for the encoded bit stream is used up, when the receiving side or storing side of the encoded bit stream does not need any further bits, when user or a system at the encoding side wants to terminate or suspend the step or when user or a system at the receiving side wants to terminate or suspend the step.

The encoder avoids encoding bit fields of the bottom S least bit significance levels in the quantization indices for the ROI coefficients, because these bit fields, which do not exist before the scaling up of the ROI coefficients by S left bit shift, do not convey any information. Alternatively, in order to reduce the computational cost to avoid encoding these bottom S bit fields, these fields whose values are uniformly filled with 0 may be encoded together with the bottom S bit fields of the quantization indices for the regions out of the region of interest at the expense of increasing encoded bit rate. Top S bit fields of the quantization indices for the ROI coefficients are exclusively encoded without encoding any bit fields of the quantization indices for the regions outside of the region of interest in the same subband. Alternatively, in order to reduce computational cost to selectively encode the top S bit fields for the region of interest, these bit fields may be encoded together with the bit fields for the regions outside of the region of interest whose values are filled uniformly with 0 at the expense of increasing encoded bit rate.

The preferable encoding technique in step 108 is either a bit plane coding such as a binary arithmetic coding technique or a zero tree coding such as the SPIHT coding technique. With a bit plane coding technique, all the bit fields at a certain bit significance level in each subband are encoded at the same encoding stage. After these bit fields are encoded, other bit fields in another bit significance level are encoded. In many cases, bit fields of the higher bit significance levels are encoded earlier than the bit fields of the lower bit significance levels in the same subband. In such cases, encoding results of the bit fields in the higher bit significance levels may be used for encoding the bit fields in the lower bit significance levels. With a zero tree coding technique, bit fields at the higher bit significance level in each quantization index are always encoded earlier than the bit fields at the lower bit significance level in each quantization index, but some of the bit fields at the lower bit significance level in the same quantization indices are encoded earlier than the bit fields at the higher bit significance level in other quantization indices. Encoded data formed at step 108 is sent to transmission step 109 where data bits and header bits are appended into a bit stream to be transmitted or stored.

In a subband where the allocated bits per coefficient is smaller than the representation accuracy of the transform coefficients, each transform coefficient is represented by a quantization index whose representation accuracy is smaller than the accuracy with which the value of the quantized transform coefficients are represented. In a subband where the allocated bits per coefficient is the same as the representation accuracy of the value of the transform coefficients, each transform coefficient may not be quantized and each coefficient value itself may be regarded as a quantization index to be given to ROI coefficient scaling step 107. This invention goes with any kind of quantization schemes where the larger transform coefficient is to be represented with the larger quantization index. Preferred quantization in this invention is either a scalar quantization or a trellis coded quantization. With a scalar quantization, transform coefficients are quantized into indices based on the magnitudes of the coefficients with respect to a set of threshold values. With a trellis coded quantization, transform coefficients are quantized into indices not only based on the magnitude of themselves but also the states of the quantizer.

In FIGS. 3A–3F, ROI coefficient scaling step 107 is illustrated. ROI coefficient scaling is performed on the quantization indices of the transform coefficients either in each subband, in all the subbands or in several groups of subbands at a time. In a situation where the scaling is performed in each subband, each subband can be assigned a different priority including no priority (left bit shift value, S) to the quantization indices for the region of interest. In a situation where a selected region of interest needs to be emphasized in an image reconstructed only from some of the subbands, the ROI coefficient scaling needs to be performed only in the selected subbands (e.g., when a lower spatial resolution version of the image is reconstructed, ROI coefficients in the subbands which are not necessary for reconstructing the target spatial resolution are not scaled up). Hereafter, ROI coefficient scaling in each subband is disclosed, which can be generalized to be an ROI coefficient scaling to be performed in all the subbands or in several groups of subbands at a time, e.g., by assigning the same priority value to the quantization indices for the region of interest in all the subbands or in several groups of subbands.

To illustrate this concept, let us denote transform coefficients in one subband (subband[k]) as $Y(j)$ where $j$ ($0 \le j < J$) represents a coordinate of the transform coefficients and corresponding quantization indices in the subband[k], quantization index of the $Y(j)$ as $Z(j)$, allocated bits per coefficient at the step 102 as $N$, bit fields of the binary representation of the quantization index $Z(j)$ are $b_{N-1}(j), b_{N-2}(j), \ldots$, and $b_o(j)$, ($b_k(j)$, $0 \le k < N$, is either 0 or 1; $b_{N-1}(j)$ is the bit field in the highest bit significance level of the $Z(j)$). Binary representation of the quantization index $Z(j)$ is the following:

$$Z(j) = 2^{N-1} \times b_{N-1}(j) + 2^{N-2} \times b_{N-2}(j) + \ldots + 2^1 \times b_1(j) + 2^1 \times b_0(j).$$

(Before the ROI coefficient scaling is performed, $b_n(j)$ represents a bit value in the bit significance of $2^n$.)

When the transform coefficients identified as corresponding to the region of interest (i.e., ROI coefficients), $Y(j)$ where $j = js, js+1, \ldots$ and $je$, quantization indices $Z(j)$ where $j = js, \ldots$, and $je$ are the ROI coefficients in the subband[k], which are to be scaled up in step 107. When a priority assigned to the selected region of interest is a left bit shift value, S, quantization indices $Z(js), \ldots$, and $Z(je)$ are scaled up to be $Z(js), \ldots$, and $Z(je)$:

$$Z(js) = 2^s \times Z(js) = 2^{N+S-1} \times b_{N-1}$$

$$(js) + \ldots + 2^{S+1} \times b_1$$

$$(js) + 2^s \times b_0(js), Zs$$

$$(js+1) = 2^S \times Z$$

$$(js+1) = 2^{N+S-1} \times b_{N-1}$$

$$(js+1) + \ldots + 2^{S+1} \times b_1$$

$$(js+1) + 2^S \times b_0(js+1),$$

$$Zs(je) = 2^S \times Z$$

$$(je) = 2^{N+S-1} \times b_{N-1}$$

$$(je) + \ldots + 2^{S+1} \times b_1$$

$$(je) + 2^S \times b_0(je)$$

As a result of the scaling by left bit shift of S, a1) magnitude of the corresponding indices has become 2S times bigger. In other words, a2) bit significance level (s_level) of each bit field has become bigger by S (s_level= N−1→s_level=N+S−1, s_level=N−2→s_level=N+S−2, ..., s_level=0→s_level=S). If each bit field is encoded in the order of decreasing order of bit significance level, each top S bit field of the scaled up indices are to be encoded earlier than any other bit fields in the same subband. In other words, larger number of bit fields in the scaled up indices are to be encoded at the earlier stages of the encoding process. a3) In a situation where bit plane coding is used, encoding is done on each bit plane consisting of the bit fields of the same bit significance level. In each subband, each bit plane is encoded preferably in the decreasing order of bit significance level or any other order. Encoding ordering of each bit plane across subbands can be arbitrarily specified by following the encoding ordering within each subband. The following is an example of encoding ordering of each bit plane in the same subband:

No 0. plane $\{b_{N-1}(js), b_{N-1}(js+1), \ldots, b_{N-1}(je)\}$,
No 1. plane $\{b_{N-2}(js), b_{N-2}(js+1), \ldots, b_{N-2}(je)\}$,
No S−1. plane $\{b_{N-S}(js), b_{N-S(js+1)}, \ldots, b_{N-1}(je)\}$,
No S. plane $\{b_{N-1}(0), \ldots, b_{N-1}(js-1), b_{N-S-1}(js), \ldots, b_{N-S-1}(je), b_{N-1}(je+1), \ldots, b_{N-1}(J-10)\}$,
No S+1. plane $\{b_{N-2}(0), \ldots, b_{N-2}(js-1), b_{N-S-2}(js), \ldots, b_{N-2}(je), b_{N-2}(je+1), \ldots, b_{N-2}(J-1)\}$,
No N−1. plane $\{b_S(0), \ldots, b_S(js-1), b_0(js), \ldots, b_{0(je),bs}(je+1), \ldots, b_S(J-1)\}$, No N. plane {$b_S(0)$, ... ,$b_{S-1}(js-1)$, $b_{S-1}(je+1)$, ... ,$b_{S-1}(J-1)$},
No N+S-1.plane {$N_0(0)$, ... ,$b_0(js-1)$, $b_0(je+1)$, ... ,$b_0(J-1)$}.

The maximum left bit shift value, $S_{max}$, is determined by the bit per coefficient assigned to the subband, by the maximum bit per coefficient among the ones assigned to all the subbands, by the maximum level of the significant bit in the subband, or by the maximum level of the significant bit in all the subbands. If a left bit shift value bigger than $S_{max}$ is specified, it can be adjusted to $S_{max}$. In this case, the left bit shift value, S, is always in the following range: $0<=S<=S_{max}$ ($S_{max}=N$, 0: no priority to the region of interest). Even if $S_{max}$ is not upper-bounded, the invention works at a small increase of the encoded bit rate or a small increase of computational cost.

If the maximum left bit shift or the value larger than the maximum left bit shift is chosen, all the bit fields of the quantization indices corresponding to the region of interest are to have a different bit significance level from all the bit fields of the quantization indices corresponding to the regions outside of the region of interest in the same subband. Thus, all the bit fields for the region of interest and all the bit fields for the regions outside of the region of interest are to be encoded separately. In other words, the quantization indices for the region of interest and the quantization indices for the regions outside of the region of interest are to be separately encoded at the entropy coder.

If the left bit shift value is less than the maximum value and larger than 0, the top S bit fields of the quantization indices corresponding to the region of interest are to be encoded separately from any bit fields of the quantization indices for the regions outside of the region of interest in the same subband, the rest of the N–S bit fields of the quantization indices corresponding to the region of interest are to be encoded at the same encoding stage with the top N–S bit fields of the rest of the indices in the same subband, and the rest of the S bit fields in the indices which correspond to the regions outside of the region of interest are to be encoded separately from any bit fields for the region of interest. In other words, the quantization indices for the region of interest and the quantization indices for the regions outside of the region of interest are partially separated to be encoded at the entropy coder, when the left bit shift is less than the maximum value and larger than 0.

Preferable methods of ROI coefficient scaling are e1) scaling up the value of the quantization indices corresponding to the region of interest, e2) scaling up the bit significance levels of the bit fields associated with the region of interest e3) reassigning encoding ordering. e1), e2) and e3) are corresponding to the previously discussed a1), a2) and a3), respectively. Either the result of the ROI coefficient scaling up with e1), e2) or e3) at the step 107 is used together with the priority to the selected region of interest and identification result of the coefficients corresponding to the region of interest at the step 108 in order to manage the entropy coding to be performed at the step 108 entropy coding.

In FIGS. 4A and 4B, ROI coefficients where multiple regions of interest are to be emphasized with different priorities are illustrated. When each selected region is emphasized with the same level of emphasis, quantization indices corresponding to every region of interest are to be scaled up with the same left bit shift value. In this case, the same ROI coefficient scaling is performed on the quantization indices corresponding to any regions of interest by the same way as illustrated in FIGS. 3A–3F. When each selected region is emphasized with its own priority, scaling up illustrated in FIGS. 3A–3F needs to be performed for each region of interest. In this case, transform coefficients corresponding to each region of interest selected at region selector step 104 have to be identified and categorized into a separate category in ROI coefficient identification step 105. In this categorization, transform coefficients corresponding to several regions of interest are looked upon the coefficients corresponding to a region of interest which is assigned the highest priority among all the selected regions of interest. Based on the category and priority assigned to each region of interest, ROI coefficient scaling is performed for each region of interest as is done in FIGS. 3A–3F.

Figure 5B:
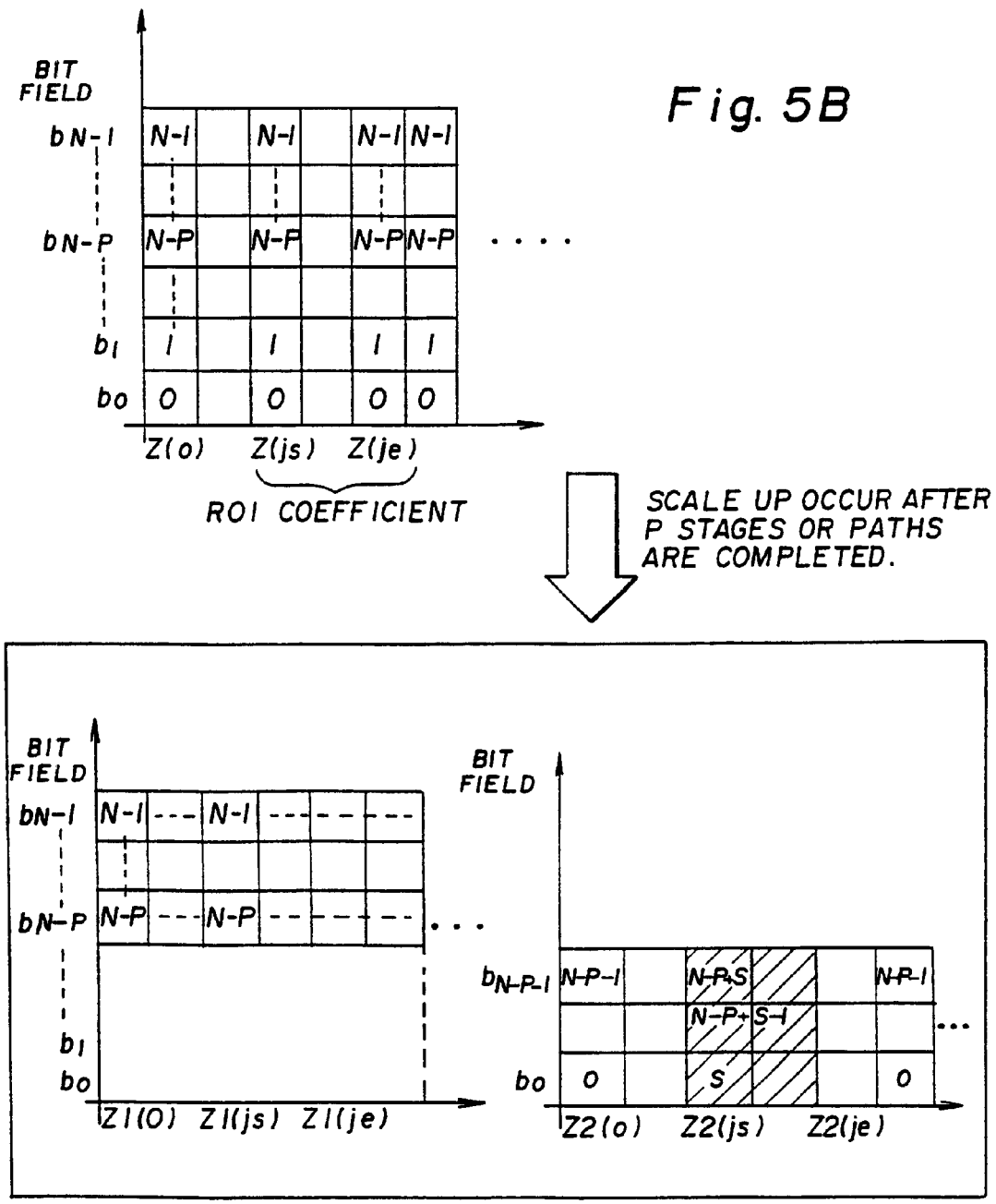

In FIGS. 5A–5C, ROI coefficient scaling from the middle of encoding is illustrated. While the embodiment of ROI coefficient scaling method illustrated in FIGS. 3A–3F, 4A and 4B either scales up the values of the quantization indices, scales up bit significance level of the every bit field of the quantization indices, or reassigns encoding ordering of every bit field of the quantization indices, the embodiment of the ROI scaling method disclosed in FIGS. 5A–5C either scales up part of the value of the quantization index for a region of interest (the value consisting of some of the bit fields in the quantization index), scales up the bit significance level of some of the bit fields in the quantization indices, or reassigns encoding ordering of some of the bit field of the quantization indices. In other words, while the ROI coefficient scaling method of FIGS. 3A–3F, 4A and 4B uses all the bit fields in the quantization indices of the transform coefficients for a region of interest in order to emphasize the region of interest, the ROI coefficient scaling method of FIGS. 5A–5C uses some of the bit fields in the quantization indices for a region of interest in order to emphasize the region of interest. Other than the aspect at which bit significance level or at which encoding stage the ROI coefficient scaling is used, the ROI coefficient scaling to be disclosed hereafter uses the same method as the ROI coefficient scaling in FIGS. 3A–3F, 4A and 4B.

In the ROI coefficient scaling method in FIGS. 5A–5C, some of the bit fields of all the quantization indices for the transform coefficients are not scaled up. These bit fields can be some of the top bit fields, some of the bottom bit fields, or some of the middle bit fields. In this case, the encoded bit stream generated from the bit fields where ROI coefficient scaling is not used can be decoded with a decoding method which does not deal with region of interest. When the some of the top bit fields in each subband are encoded without using the ROI scaling, selection of the region of interest and selection of its priority can be specified by the receiving side if the encoded bit stream is transmitted to the receiving side during the encoding process and the encoder receives a feedback signal from the receiver: a user at a receiving side specify the region of interest and a priority on a partially reconstructed image from an incoming encoded bit stream from the encoder and feedback the coordinate information and priority of the region of interest to the encoder; then, encoder start ROI scaling in the middle of the encoding process. To explain the subject matter of FIGS. 5A–5C, let us use the same terminology as used in disclosing the ROI coefficient scaling in FIGS. 3A–3F. Transform coefficients in one subband (subband[k]): Y(j) where j ($0<=j<J$) represents a coordinate of the transform coefficients in the subband[k]; quantization index of the Y(j): Z(j); allocated bits per coefficient at step 102 are represented as N. The bit fields of the binary representation of the quantization index Z(j) are $b_{N-1}(j)$, $b_{N-2}(j)$, ... , and $b_0(j)$, ($b_k(j)$ where $0<=k<N-1$ is either 0 or 1; the left bit shift scaling value is represented by S; the number of bit significance levels where ROI coefficient scaling is not used is represented by P. In a situation where the top P bit planes are to be encoded without using ROI coefficient scaling, binary representation of the Z(j) is described as the following:

$$Z(j)=2^{N-1} \times b_{N-1}(j)+2^{N-2} \times b_{N-2}(j)+ \ldots +2^1 \times b_1(j)+2^0 \times b_0(j).$$

Z(j) is represented by a combination of Z1(j) and Z2(j): Z1(j) is a portion of the Z(j) which is as it is; Z2(j) is a portion which is to be scaled up.

$$Z(j)=Z1(j)+Z2(j) \text{ or denoted as } Z(j)=\{Z1(j), Z2(j)\},$$

where $$Z1(j)=2^{N-1} \times b_{N-1}(j)+2^{N-2} \times b_{N-2}(j)+ \ldots +2^{N-P} \times b_{N-P}(j),$$

$$Z2(j)=2^{N-P-1} \times b_{N-P-1}(j)+2^{N-P-2} \times b_{N-P-2}(j)+ \ldots +2^0 \times b_0(j).$$

Suppose the transform coefficients identified as corresponding to the region of interest in step 105 are Y(j) where j=js, js+1, . . . , and je, and the corresponding quantization indices to be scaled up in the step 107 are Z(j) where j=js, . . . , and je, Z2( ), scalable portion of the quantization indices of Z(js), . . . , Z(je), are scaled up to be Z2s(js), . . . , Z2s(je):

$$Z2s(js)=2^S \times Z2(js)=2^{N+S-P-1} \times b_{N-P-1}(js)+2_{N+P-2} \times b_{N-P-2}(js)+ \ldots +2^S \times b_0(js),$$

$$Z2s(js+1)=2^S \times Z2(js+1)=2^{N+S-P-1} \times b_{N-P-1}(js+1)+2^{N+S-P-2} \times b_{N-P-2}(js+1)+ \ldots +2^S \times b_0(js+1),$$

$$Z2s(je)=2^S \times Z2(je)=2^{N+S-P-1} \times b_{N-P-1}(je)+2^{N+S-P-2} \times b_{N-P-2}(je)+ \ldots +2^S \times b_0(je).$$

With the ROI coefficient scaling from the middle of encoding, Z(js), . . . , and Z(je) are converted from Z(js)={Z1(js), Z2(js)}, . . . , and Z(je)={Z1(js), Z2(je)} to Zs(js)={Z1(js),Z2s(js)}, . . . , and Zs(je)={Z1(je), Z2s(je)}. In the ROI coefficient scaling method shown in FIGS. 5A–5C, Z2(j) instead of Z(j) is scaled up with the same scaling method as in FIGS. 3A–3F, 4A and 4B.

The maximum left bit shift scaling value, $S_{max}$, is determined by the bit per coefficient assigned to the subband, N, and by the number of bit fields in each quantization index which are to be encoded without using ROI coefficient scaling, P. In this case, the left bit shift value, S, is in the following range: 0<=S<=$S_{max}$ ($S_{max}$=N–P, 0: no priority to the region of interest).

If the maximum left bit shift, $S_{max}$=N–P, is chosen, bottom N–P bit fields of the quantization indices corresponding to the region of interest are separated from the bottom N–P bit fields of the quantization indices which correspond to the regions outside of the region of interest in the same subband. Thus, the bottom N–P bit fields for the region of interest and for the regions outside of the region of interest are to be separately encoded.

If the left bit shift value is less than the maximum value and larger than 0, S bit fields of the quantization indices for the region of interest at the $(P+1)^{st}$ highest significance level through the $(P+S)^{th}$ highest bit significance levels are separate from any bit fields for the regions outside of the region of interest (the $1^{th}$ highest significance level: MSB, the $N^{th}$ highest significance level: LSB in this example). The rest of the N–P–S bit fields of the quantization indices corresponding to the region of interest are to be encoded together with the N–P–S bit fields for the regions outside of the region of interest at each bit significance level. The rest of the S bit fields, S bottom bit fields in the quantization indices for the regions outside of the region of interest are separated from any bit fields for the region of interest.

Figure 6B:
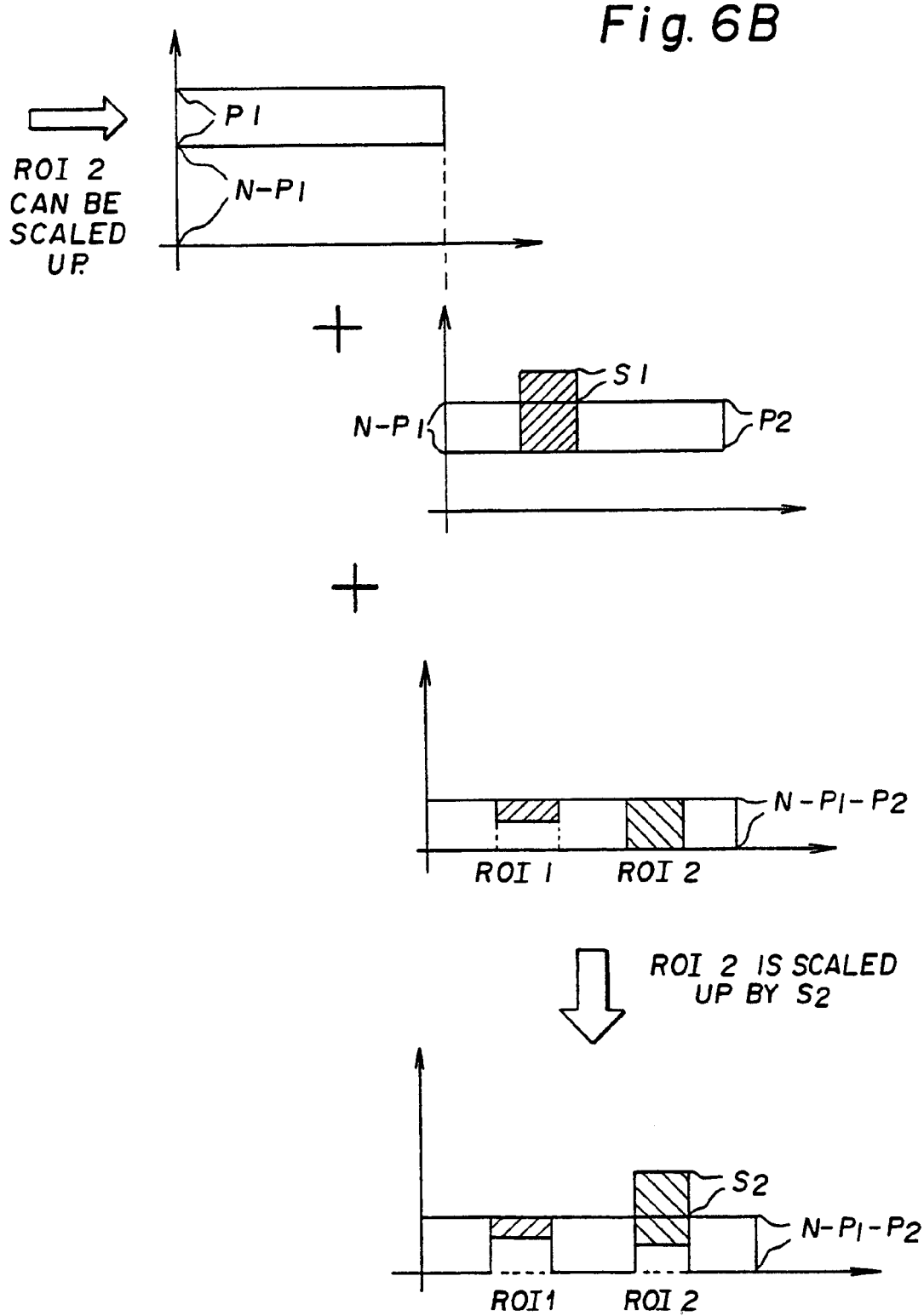
Figure 7C:
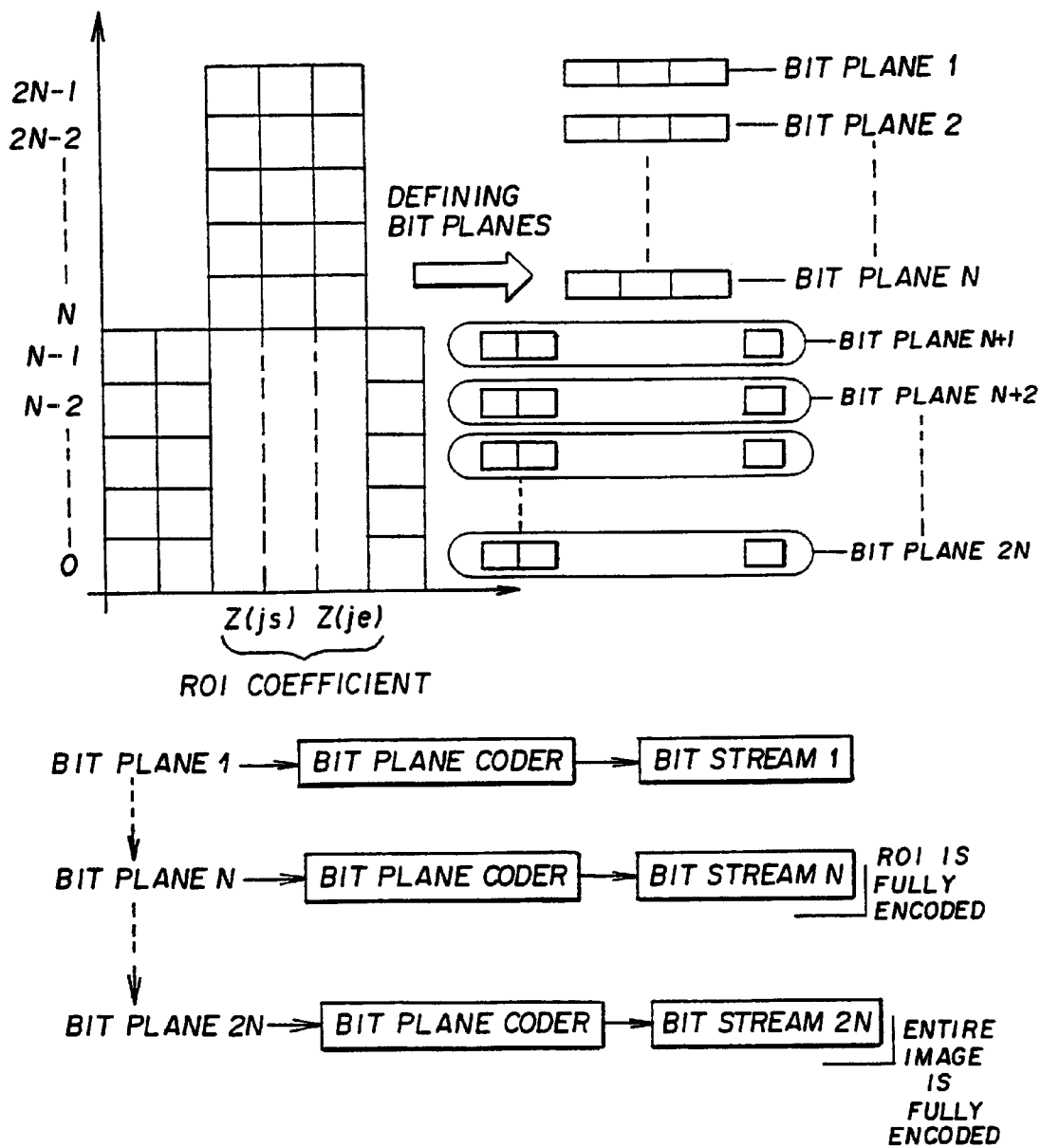

In FIGS. 6A–6C illustrate a ROI coefficient scaling method where multiple regions of interest are emphasized from different stages of encoding with different priority. This technology is equivalent to repeatedly applying the ROI coefficient scaling method from the middle of the encoding discussed in FIGS. 5A–5C in order to emphasize another region of interest in the middle of the encoding process where some of the quantization indices are already scaled up from the beginning or at some stage of the encoding process by the methods illustrated in FIGS. 3A–3F, 4A–4F, or 5A–5C. This method makes it possible to add different regions of interest or expand the region of the already selected region of interest in the middle of the encoding process, or reconstruct the selected region of interest part by part from different stages of the encoding process by dividing the region into several parts and assigning different priorities to each part. Also in this case, selection of another region of interest and selection of its priority can be done by the receiving side if the encoding process and decoding process at the receiving side are done interactively.

In FIGS. 7A–7D, entropy coding step 108 of the quantization indices through ROI coefficient scaling step 107 is illustrated when a bit plane based coder is used. A characteristic of the present invention is to modify a set of the quantization indices which is an input to a bit plane coder at each bit significance level or modifying an encoding ordering of the bit fields in each quantization index by using the result of the ROI coefficient scaling in step 107. The result of the ROI coefficient scaling defines each bit plane to be encoded with a bit plane coder and encoding ordering of each bit plane. Determining encoding ordering based on the bit significance level of each bit plane is the simplest approach. Determining separate encoding ordering for each bit plane corresponding to each category of coefficients is another approach. For example, encoding ordering for the bit planes consisting of the coefficients corresponding to the region of interest can be determined separately from the encoding ordering for the bit planes consisting of the coefficients corresponding to the regions outside the region of interest. If separate encoding ordering is used for each category of coefficients, encoding ordering across each category can be arbitrarily selected and encoding ordering for the entire image can be more flexibly specified. When bit plane coder which encodes each bit plane without using any encoding result or information of the other bit planes, encoding ordering of each bit plane can be arbitrary. The bit plane coder used in this embodiment can be any binary entropy coder such as a binary arithmetic coder. Bit plane coding can be performed on each bit plane defined in each subband or on each bit plane defined in each group of subbands, possibly on each bit plane defined in all the subbands.

FIGS. 7A–7D illustrate a case where bit plane coding is performed in each subband where ROI coefficient scaling is used on every bit field as shown in FIGS. 3A–3F, 4A and 4B. ROI coding starts from the beginning of the encoding. In the entropy coding in FIGS. 7A–7D, each bit field of the quantization indices for the transform coefficients which has the same bit significance level determined by the ROI coefficient scaling in step 107 is grouped together and forms a bit plane. Alternatively, each bit field which is assigned the same encoding or information ordering in step 107 is grouped into the same bit plane. When the bit per coefficient (i.e. representation accuracy of the indices) is N and the priority to the selected region or regions of interest is S (0<=S<=N), the number of the bit planes becomes N+S. S bit planes consisting of the bit fields at the S highest bit significance levels are related to the coefficients for the region of interest. The next N–S bit planes consisting of the bit fields in the next N–S bit significance levels are related to the coefficients for the entire image. The last S bit planes consisting of the bit elements in the lowest S bit significance levels are related to the coefficients for the regions outside of the region of interest. Each bit plane is encoded by the bit plane coder bit plane by bit plane. Bit planes in the higher significance level are encoded at the earlier stages of the encoding process than the bit planes in the lower significance levels. An encoded bit stream of each bit plane is appended to an encoding tag which is used to identify which bit significance level the generated portion of the encoded bit stream represents. Together with the priority, i.e., left bit shift value to the selected region of interest, the tag shows whether the bit portion represents only the region of interest, the entire image, or the regions outside of the region of interest. When the priority to the region of interest is the maximum, N, each bit portion generated from each bit plane consists either of the region of interest or the regions outside of the region of interest. When the priority is the maximum, bit planes for the region of interest and those for the rest of the region are independently encoded. Also, encoding ordering and the ordering of the bit portions of the encoded bit stream between the region of interest and the rest of the regions can be arbitrary.

By counting the number of the bits spent in the encoding of each bit plane and by terminating the encoding process when the bit budgets for the region of interest, the regions outside of the region of interest, or both is exceeded, the number of the bits allocated to the region of interest and to the regions outside of the region of interest is more precisely controlled. If the priority to the region of interest is the maximum, the number of allocated bits for the region of interest and for the rest of the region can be controlled independently.

When encoding a bit plane consisting only of the bit fields corresponding to the region of interest or a bit plane consisting only of the bit fields corresponding to the regions outside of the region of interest, bit fields in each bit plane are either ordered into a one dimensional signal to be entropy encoded by using context modeling for a one dimensional signal or kept as they are as a two dimensional signal to be encoded by using context modeling for a two dimensional signal. When each bit field is to be encoded as two dimensional signal, bit fields on the coordinates out of the region of interest or bit fields on the coordinates within the region of interest do no exist in some bit planes in some bit significance levels. In order not to increase the encoded bit rate, these coordinates are skipped to be encoded in the encoding process. Alternatively, in order to reduce computational complexity of skipping such coordinates, these coordinates are not skipped encoding but encoded as if they had bit fields whose values are 0. These 0 values are discarded during the decoding process. Instead of 0, 1 can be used as the assumed value.

Priority to the region of interest can be modified during the entropy coding step. One example is to reduce the priority to the region of interest during the entropy encoding step: if number of bits or bit rate spent for the region of interest reaches a pre-determined value, priority value is reduced in order not to emphasize the region of interest for the rest of the encoding process. Alternatively, if the estimated MSE or peak signal-to noise ratio (PSNR) value of the region of interest in the wavelet domain reaches a predetermined value, priority value can be reduced. If the priority is controlled according to feedback from the decoding side, not only the estimated MSE or PSNR, but also the MSE or PSNR calculated on the partially reconstructed image can be used. Priority control of the region of interest, based upon the bit-rate, MSE, or PSNR, or any other measurement associated with compression performance (e.g. bit-rate versus MSE) of the region of interest, makes it possible for the encoding or decoding system to determine the most appropriate ROI coding strategy. Furthermore, the user at the encoding or the decoding side may decide on the strategy. The ROI coding strategy determines when and how much the ROI coefficient scaling is performed, how much of the bit rate is allocated for the region of interest and for the rest of the image to be encoded with entropy encoder, when the encoding process of the region of interest is terminated, and any other information used for encoding or decoding the region of interest.

Figure 8A:
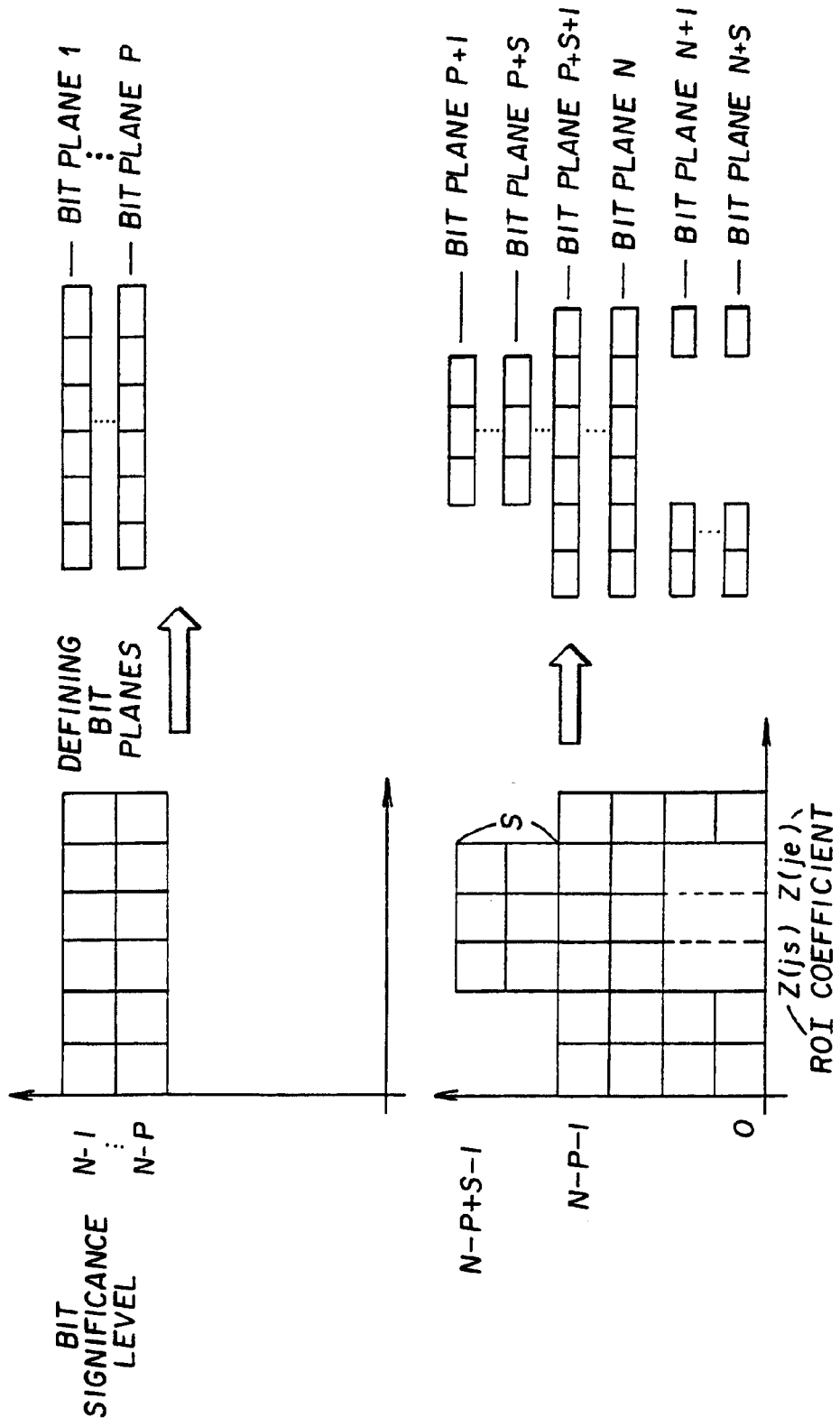
FIGS. 8A–8C illustrate the case where bit plane coding is performed in each subband where ROI coefficient scaling is used only on the bit fields at some bit significance levels.
Figure 8B:
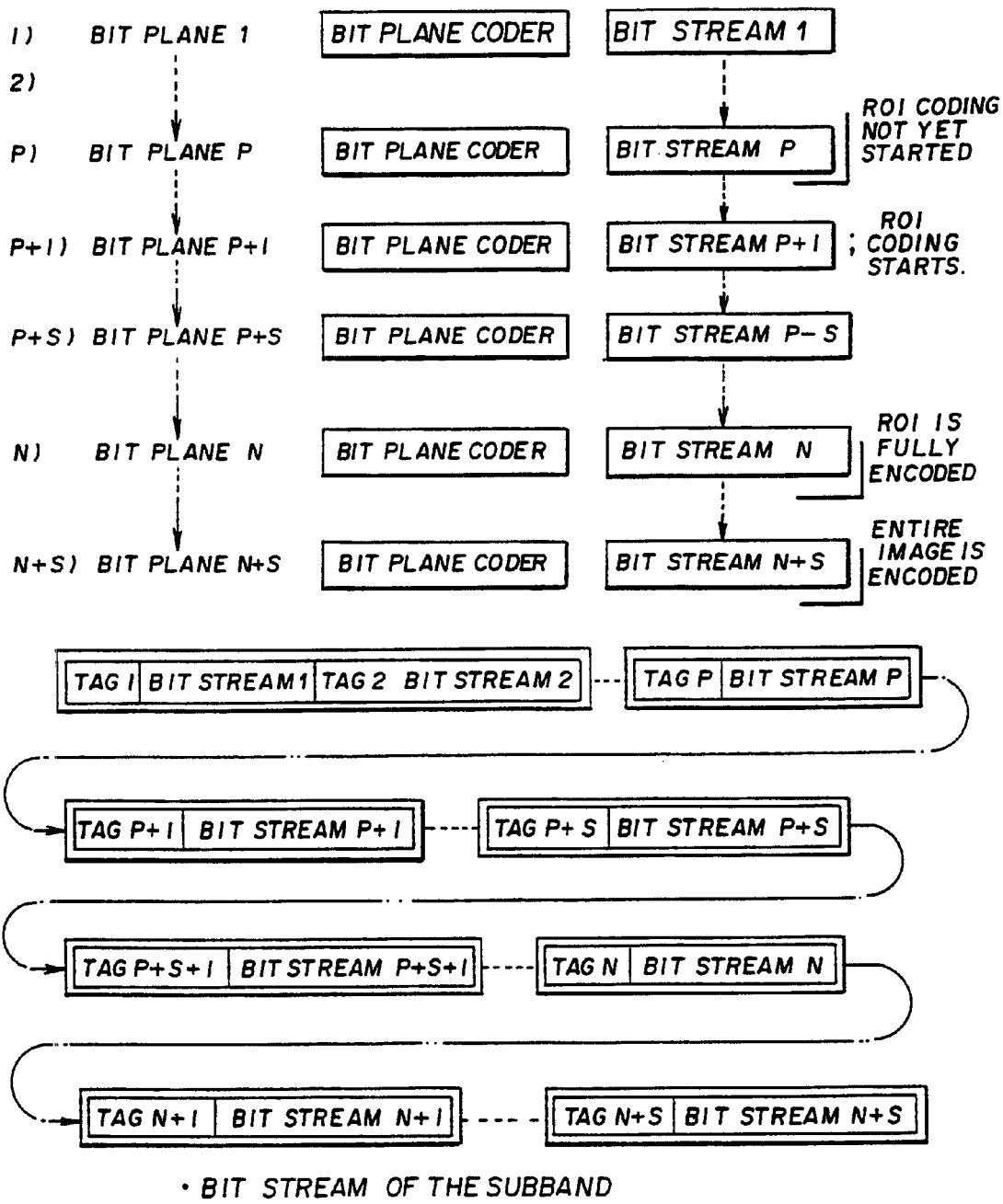
Figure 8C:
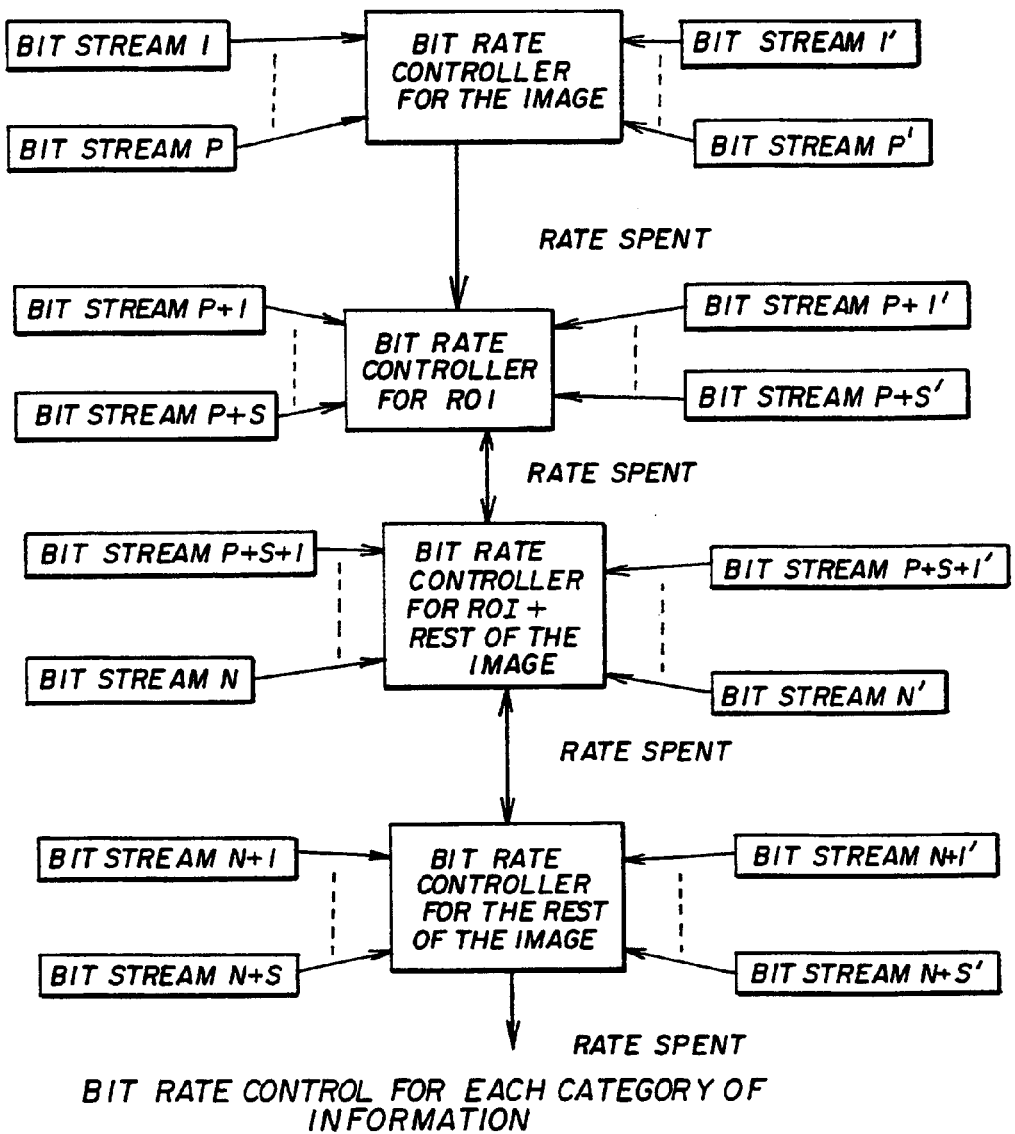

In FIGS. 8A–8C, the case where bit plane coding is performed in each subband where ROI coefficient scaling is used only on the bit fields at some bottom bit significance levels as shown in FIGS. 5A–5C and 6A–6C (ROI coding starts from the middle of the encoding) is disclosed. In a situation where the bits per coefficient assigned to a subband (i.e. representation accuracy of the indices) is N, ROI coefficient scaling is used after the top P bit planes of the quantization indices, and the priority to the selected region or regions of interest is S ($0<S<=N-P$), the number of the bit planes in the subband is P+N–P+S=N+S. The top P bit planes consist of the; top P bit elements in each quantization index. Therefore, the top P bit planes represent the entire image. From the bottom N–P bit fields in each quantization index, N–P+S bit planes are formed by the same method as in FIGS. 6A–6C (grouping the bit elements in the same bit significance level after scaled up in step 107): top S bit planes among N–P+S bit planes represent the selected region or regions of interest, next N–P–S bit planes represent the entire image, and the last S bit planes represent the regions outside of the region of interest. P bit planes where ROI coefficient scaling is not used do not have to be the top P bit planes in each subband. They can be bottom P bit planes or middle P bit planes. When they are bottom P bit planes, ROI coefficient scaling as in FIGS. 3A–7F and entropy coding as in FIGS. 7A–7D are performed on the top N–P bit planes in each quantization index.

As in FIGS. 7A–7D, an encoded bit stream for each bit plane or an encoded bit portion of each bit plane is appended to a tag and concatenated to form an encoded bit stream of the subband. Also, by counting the number of bits spent in each bit plane, or by counting the number of bits spent in the top P bit planes representing the entire image, the next top S bit planes representing the region of interest, the next N–P–S bit planes representing the entire image and the rest of the S bit planes representing the regions out of the region of interest, the number of the bits which will be spent for the region of interest and the rest of the regions can be more precisely controlled.

The bit significance level at which the ROI coefficient occurs can be specified during the entropy encoding process by the bit-rate, estimated MSE or PSNR in the wavelet domain as well as the priority to the region of interest. If the bit-rate spent for encoding some of the bit planes without using the ROI coefficient scaling technique reaches a certain value, the scaling technique starts to be used with higher priority from the bit plane to be encoded immediately after the bit plane currently under encoding. If the bit rate spent for encoding the bit planes representing the region of interest reaches another certain value, priority to the region of interest is reduced in order not to emphasize the region of interest for the rest of the encoding process. Instead of the bit rate, the MSE value estimated in the wavelet domain for the entire image or for the region of interest can be used to determine from which bit plane ROI coefficient scaling is used and from which bit plane priority to the region of interest is reduced.

At bit allocation step 102, bits per coefficient assigned to each subband are determined in order to reduce the distortion of the entire reconstructed image as much as possible at a given bit rate for the entire image. Bits per coefficient or bit rate for each coefficient in each subband is determined in such a way that the subband which has higher variance or higher energy of the transform coefficients will be allocated the larger number of bits per coefficient. The bit allocation result given to quantization step 103 can either be a number of bits per coefficient in each subband, quantization step size, or a parameter to choose a quantization scheme at step 103. When bits per coefficient, a quantization step size or a quantization scheme is predetermined in each subband, for example, when lossless coding is realized, bit allocation is not performed.

At region selector step 104, a region or regions of interest are selected by the user on the image displayed on a display. The displayed image is either a full spatial resolution image to be encoded or one of the lower resolution versions of the image. If the region selection occurs on a lower resolution version of the image, coordinates of a corresponding region or regions of interest in the full resolution image to be encoded are calculated to be used for identifying the transform coefficients corresponding to the region of interest in the full resolution image. The region selection can also be performed by a method wherein an automatic target recognition system defines a region or regions of interest based on a set of criteria. The automatic target recognition system may utilize a variety of approaches to identify the region of interest. For example, pattern recognition software may be used to identify objects of interest in the image.

At ROI coordinate description step 106, coordinates to describe each region of interest are encoded to be efficiently transmitted or stored as overhead information of the encoded bit stream of the image. When the selected region of interest is of rectangular shape, two coordinates at both edges of a diagonal line of the rectangle will describe the region. When the selected region of interest is of a circular shape, the center coordinate of the circle and the length of the radius will describe the region. When the selected region or regions are a union of several rectangles or circles, each of the rectangles or circles are described in the method discussed above. If the selected region of interest is of arbitrary shape, the boundaries of the region are encoded by any shape encoding method such as a chain coding method or an object coding method.

At transmitter step 109, portions of the encoded bit stream generated at entropy coding step 108 can be ordered into any order. If the encoded data is to be transmitted to a display environment at which a lower resolution version of the image is most frequently reconstructed, portions of the encoded bit stream associated with the spatial resolution are ordered in the earlier portions of the whole encoded bit stream than the portions of the encoded bit stream associated with the higher spatial resolutions. This ordering of the portions of the bit stream re-orders the bit portions if the encoding ordering with which the bit portions are generated at the entropy coding step and transmission ordering of the bit portions are different.

At ROI coefficient identification step 105, transform coefficients corresponding to the region of interest selected in the image domain are identified either through tracing the inverse wavelet transform from the image domain to the transform domain or tracing the inverse wavelet transform means to identify from which transform coefficients each pixel value is reconstructed through filtering and up sampling performed on the transform coefficients. In this identification process, filter coefficients do not play any role. Instead, filter length or filter support area plays a role. The larger the filter support, the larger the number of transform coefficients that will correspond to a pixel in the image. This identification process is done through each level of an inverse wavelet transform. Also, this identification is performed along each dimension (vertical direction or horizontal direction) of the image or the subbands. Alternatively, the identification can be performed by tracing the forward wavelet transform from the image domain to the transform domain through each level of wavelet transform comprising filtering and down sampling.

Let us denote the image as $X(k_0)$ where $0<=k_0<K$, a 1st level decomposed lowpass subband as $L_1(kL_1)$ and a highpass subband $H_1(kH_1)$ where $0<=kL_1$, $kH_1<K/2$, a 2nd level decomposed lowpass subband as $L_2(kL_2)$ and a highpass subband as $H_2(kH_2)$ where $0<=kL_2$, $kH_2<K/2^2$, . . . , Nth level decomposed lowpass subband as $L_N(kL_N)$ and a highpass subband as $H_N(kH_N)$ where $0<=kL_N$, $kH_N<K/2^N$. Therefore, a wavelet transform, mallet type wavelet decomposition or dyadic wavelet decomposition is: X is reconstructed from $L_2$ and $H_1$ through 1 level inverse wavelet transform; $L_1$ is reconstructed from $L_2$ and $H_2$; . . . ; Thus, X is reconstructed from $H_1, H_2, \ldots, H_N, L_N; L_1 L_2, \ldots$ and $L_{N-1}$ are subbands by way of which each level of wavelet transforms and inverse wavelet transforms are performed.

When $k_0=k_0\_R(k_0\_Rs<=k_0\_R<=k_0\_Re)$ is a pixel in the selected region of interest ($k_0\_R$: pixel coordinate in the region of interest; $k_0\_Rs$ and $k_0\_Re$: coordinates for the pixels on the boundaries of the region of interest; $k_0\_R$ can be a single pixel in the region of interest (i.e., $k_0\_R=k_0\_Rs=k_0\_Re$); in the following explanation, the image and region of interest are assumed to be a one dimensional signal, thus, $k_0\_Rs$ is the smallest coordinate and $k_0\_Re$ is the largest coordinate in the region of interest), transform coefficients corresponding to $X(k_0\_R)$ are identified in the $L_1()$ and $H_1()$ such that ROI coefficients in $L_1(\ )$: $kL_1\_Rs<=kL_1<=kL_1\_Re$, ROI coefficients in $H_1(\ )$: $kH_1\_Rs<=kH_{12}<=kH_1\_Re$.

Then, by assuming that the 1st level decomposed low pass signal, $L_1(kL_1)$, is an image and $kL_1\_Rs<=kL_1<=kL_1\_Re$ are the region of interest, transform coefficients corresponding to $L_1(kL_1)$ where $kL_1\_Rs<=kL_1<=kL_1\_Re$ are identified in the $L_2(\ )$ and $H_2(\ )$.

ROI coefficients in $L_2(\ )$: $kL_2\_Rs<=kL_2<=kL_2\_Re$,

ROI coefficients in $H_2(\ )$: $kH_2\_Rs<=kH_2<=kH_2\_Re$.

This process is repeated until the subbands $L_N$ and $H_N$ to complete the ROI coefficient identification for the pixel $k_0\_R$ in the image $X(\ )$.

As shown in the above, ROI coefficient identification can be performed separately for each pixel in the selected region of interest. Thus, the ROI coefficient identification is independent of the shape of the region of interest. However, this identification process does not have to be performed for every pixel in the region of interest. Instead, this identification process is performed only on the pixels on the boundaries of the region of interest and on the pixels which are located one pixel inside the boundaries of the region of interest as shown in the FIG. 9. Since the number of the transform coefficients corresponding to each pixel may change based on the location of the pixel because of up sampling (inserting 0 between each coefficient before performing filtering in every 1st level inverse wavelet transform) or down sampling (every other coefficient is discarded after filtering is performed in every 1st level wavelet transform), transform coefficients corresponding to the pixels on the boundaries may not be on the boundaries of the corresponding region consisting of the ROI coefficients in each subband. Instead, transform coefficients corresponding to the pixels which are located one pixel inside the boundaries of the region of interest may be on the boundaries of the corresponding region in each subband. Pixels on the boundaries and the pixels one pixel inside the boundaries are necessary and sufficient to identify the transform coefficients which form boundaries of the corresponding region in each subband. Alternatively, if both low-pass filter and high-pass filter have even numbered filter length, only the pixels on the boundaries are used to identify the coefficients which form the boundaries of the corresponding region in each subband.

Based on the identified results for the boundaries and one pixel inside the boundaries, the rest of the transform coefficients are identified by choosing every coefficient within the boundaries of the corresponding region in each subband.

Suppose $X(k_0)$ ($k_0\_Rs <= k_0 <= k_0\_Re$) are pixels in the selected region of interest ($k_0\_Rs$ and $k_0\_Re$: coordinates for pixels on the boundaries of the region of interest; i.e., the smallest coordinate in the region of interest; $k_0\_Re$: coordinate for a pixel on the other boundaries of the region of interest; in the following explanation, the image and region of interest are assumed to be a one dimensional signal, thus, $k_0\_Rs$ is the smallest coordinate and $k_0\_Re$ is the largest coordinate in the region of interest).

Left boundaries of the corresponding region are identified as the following: transform coefficients corresponding to $X(k_0\_Rs)$ are identified in the $L_1(\ )$ and $H_1(\ )$ such that ROI coefficients in $L_1(\ )$: $ksL_1\_Rs <= kL_1 <= ksL_1\_Re$, ROI coefficients in $H_1(\ )$: $ksH_1\_Rs <= kH_1 <= ksH_1\_Re$.

Also, transform coefficients corresponding to $X(k_0\_R-1)$ are identified such that ROI coefficients in $L_1(\ )$: $ksL_1\_R's <= kL_1 <= ksL_1\_R'e$, ROI coefficients in $H_1(\ )$: $ksH_2\_R's <= kH_1 <= ksH_1\_R'e$.

The smaller one of the $ksL_1\_Rs$ and $ksL_1\_R's$ is on the left boundaries of the corresponding region in $L(\ )$, and the smaller one of the $ksH_1\_Rs$ and $ksH_1\_R's$ is on the left boundaries of the corresponding region in $H(\ )$.

Right boundaries of the corresponding region are identified as the following: transform coefficients corresponding to $X(k_0\_Re)$ are identified in the $L_1(\ )$ and $H_1(\ )$ such that ROI coefficients in $L_1(\ )$: $keL_1\_Rs <= kL_1 <= keL_1\_Re$, ROI coefficients in $H_1(\ )$: $keH_1\_Rs <= kH_1 <= keH_1\_Re$.

Also, transform coefficients corresponding to $X(k_0\_Re-1)$ are identified such that ROI coefficients in $L_1(\ )$: $keL_1\_R's <= kL_1 <= keL_1\_R'e$, ROI coefficients in $H_1(\ )$: $keH_1\_R's <= kH_1 <= keH_1\_R'e$.

The larger one of the $keL_1\_Re$ and $keL_1\_R'e$ is on the right boundaries of the corresponding region in $L(\ )$, and the larger one of the $keH_1\_Re$ and $keH_1\_R'e$ is on the right boundaries of the corresponding region in $H(\ )$.

Alternatively, ROI coefficient identification is performed on each pixel in the region of interest. A set of transform coefficients corresponding to each pixel in the region of interest is identified by tracing either a set of wavelet transforms which are performed on the pixel or a set of inverse wavelet transforms which reconstruct the pixel value. The identified set of coefficients in each subband corresponding to each pixel in the region of interest are categorized into a sub-category which belongs to the category of coefficients corresponding to the region of interest so that the identification result can be used to scale up and down or reconstruct the whole region of interest as well as to scale up and down or reconstruct an arbitrary part of the region of interest. Some identified coefficients belong to plural sub-categories because of the overlap of the low pass filter or high pass filter used in the wavelet or inverse wavelet transform. Based on the number of pixels to which each identified coefficient corresponds, each sub-category can be divided into sub-sub-categories. Ultimately, each identified coefficient can have an attribute depicting which pixels and how many pixels within the region of interest the coefficient corresponds to. The attribute can also depict how many pixels outside of the region of interest the coefficient corresponds to in addition to pixels within the region of interest.

As shown in FIGS. 10A–10B, a wavelet transform is accomplished by a low pass filter whose filter coefficients are $g_A(k)$ and a high pass filter whose filter coefficients are $f_A(k)$ and down a sampler which discards every other pixel or transform coefficient. A one level wavelet decomposition for one dimensional signal is to decompose a signal X into a low pass subband L and a high pass subband H. The low pass subband L is obtained by applying low pass filtering to the signal X and down sampling the low pass filtered signal. The high pass subband H is obtained by applying high pass filtering to the signal X and down sampling the high pass filtered signal.

If the signal is a two dimensional signal such as an image, one level decomposition is to perform the one level decomposition for a one dimensional signal on X in either horizontal or vertical direction in order to obtain L and H. Then the same decomposition for a one dimensional signal is performed on the L and H in another direction in order to obtain LL1 and LH1, and HL1 and HH1, respectively. If the same decomposition is performed on LL1, LL2, LH2, HL2, HH2 are obtained and X is decomposed into LL2, LH2, HL2, HH2, LH1, HL1 and HH1.

A subband decomposition where all the decomposition is done by performing a one level decomposition only on the LL subband is called a mallet wavelet decomposition, or just a wavelet decomposition. Subband decomposition where a one level decomposition is repeated equally on each subband is called spacl wavelet decomposition. Subband decomposition where a one level decomposition is repeated arbitrarily on each subband is called wavelet packet decomposition.

An inverse wavelet transform is accomplished by an up sampler which inserts 0 between each pixel or coefficient and a low pass filter whose filter coefficients are $g_S(k)$ and a high pass filter whose filter coefficients are $f_S(k)$. A one level wavelet composition for a one dimensional signal is to compose L and H into X. In this one level composition, L is up-sampled by 2 and low pass filtered, H is up-sampled by 2 and low pass filtered and then both of the up-sampled and filtered L and H are added to compose X. This one level composition is performed on every decomposed subband to perform any level and any type of inverse wavelet transform.

Figure 2:
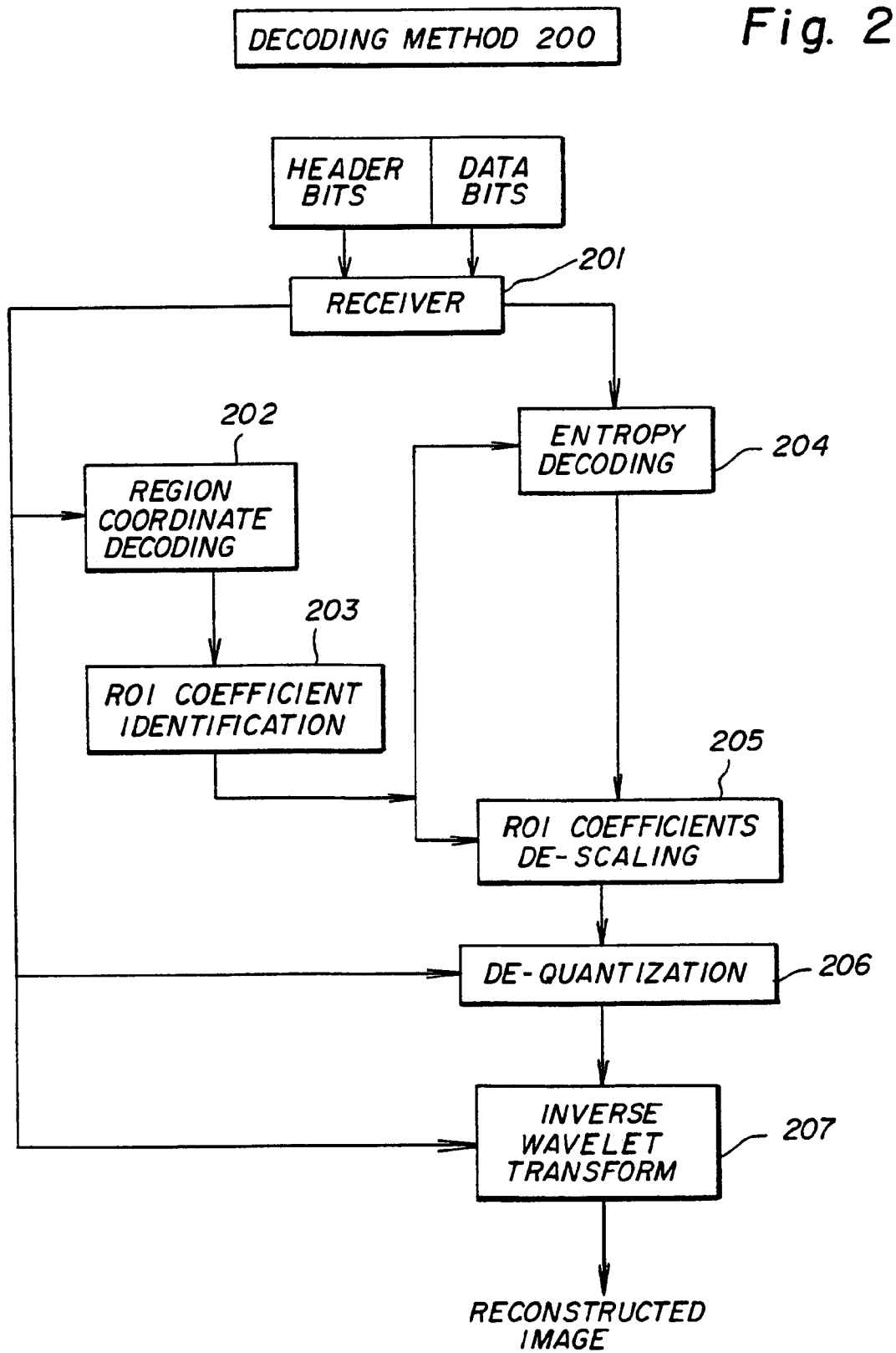
FIG. 2 illustrates a method of decompressing an image which is encoded with an emphasis on a selected ROI.
Figure 3B:
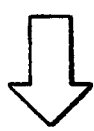
Figure 3D:
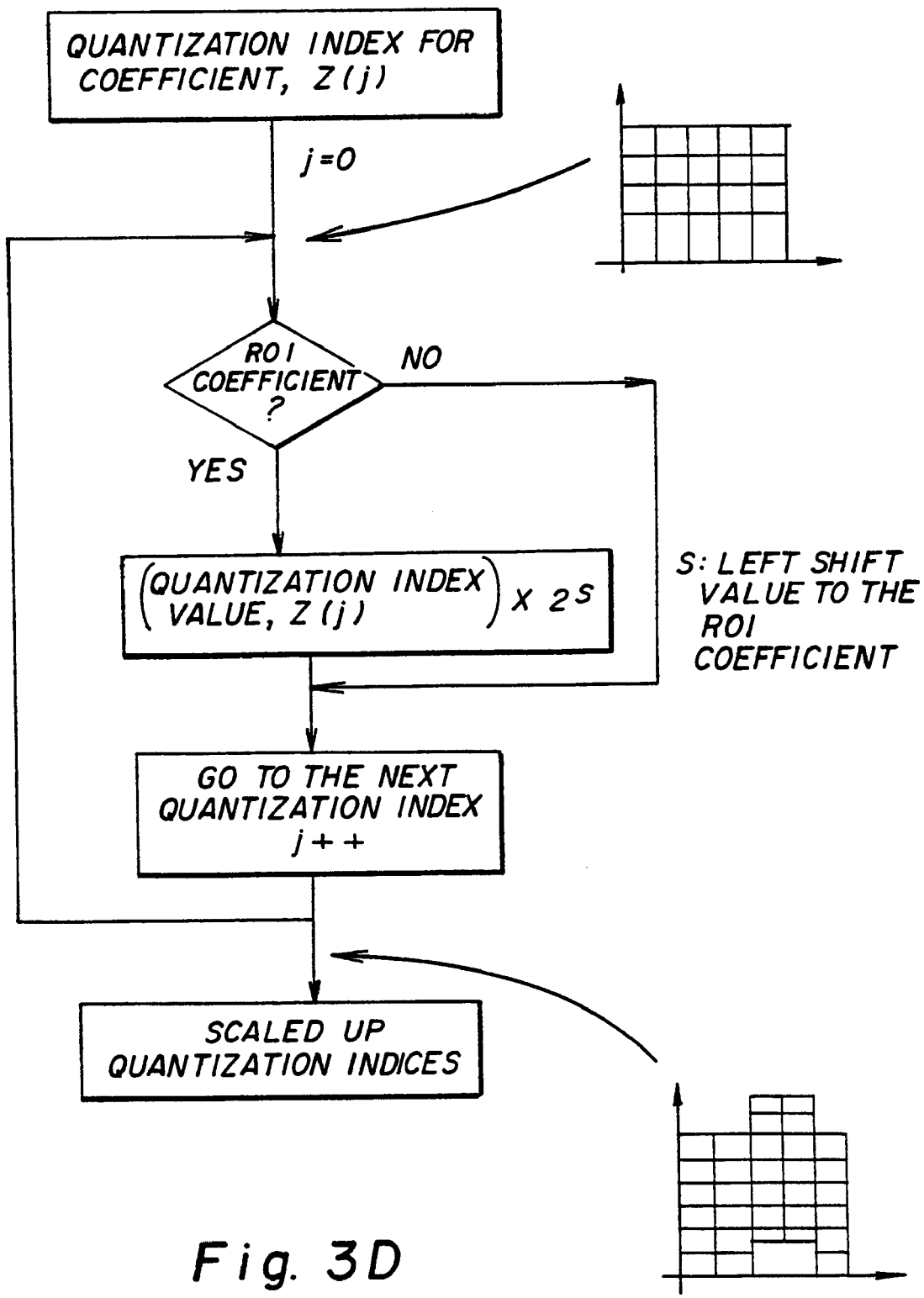
Figure 3F:
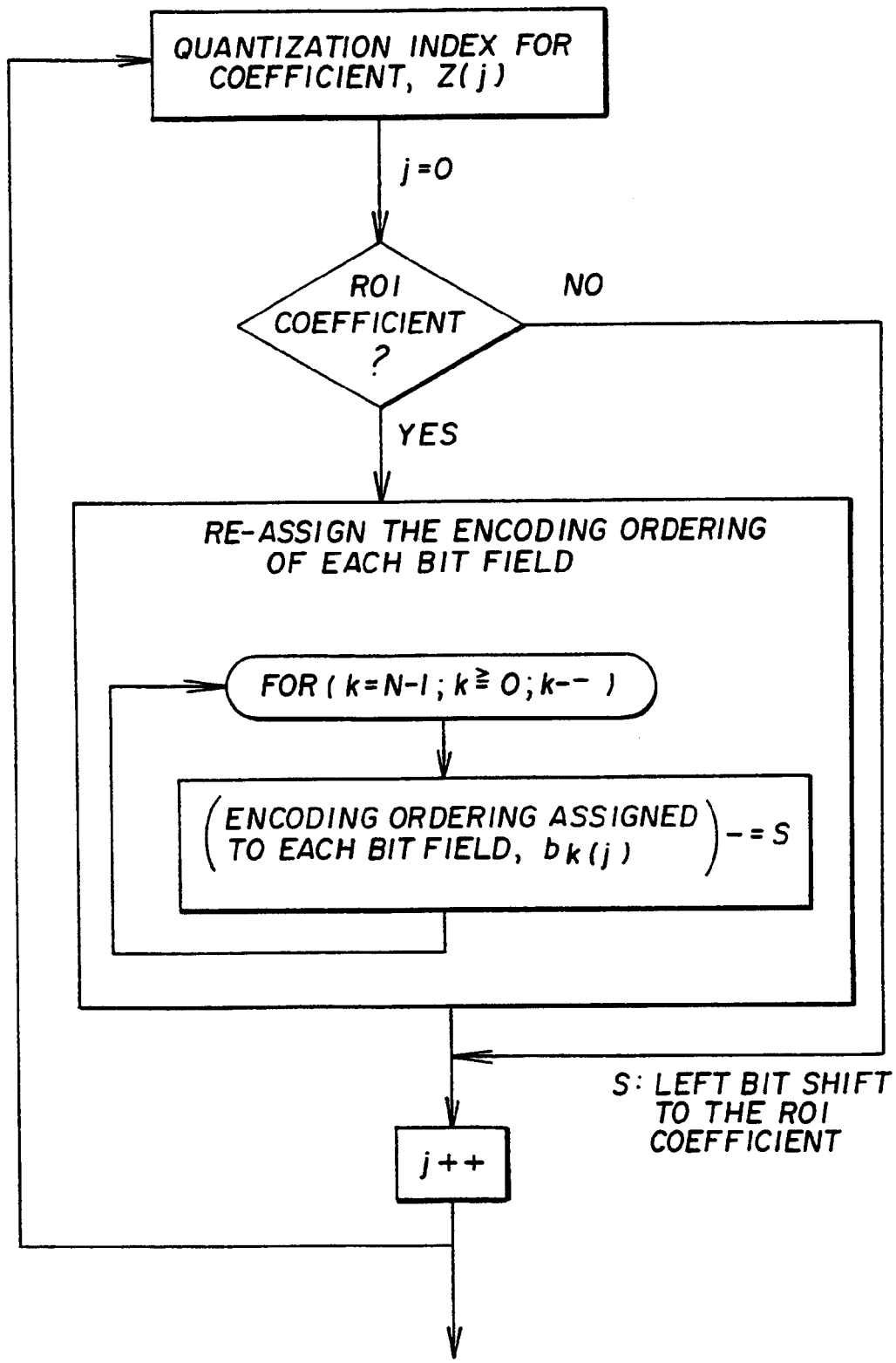

In FIG. 2, a method of decompressing an image which is encoded with an emphasis on the selected region of interest in FIG. 1 is illustrated. In FIG. 2, the decoding method 200 comprises a receiver step 201 for receiving an encoded bit stream consisting of header bits and data bits. Step 201 is followed by region coordinate decoding step 202 and entropy decoding step 204. At step 202, encoded data of the region coordinates are decoded in order to obtain the coordinates of the region of interest (ROI) which is to be reconstructed with an emphasis in the reconstructed image. The decoded ROI coordinates are given to ROI coefficient identification step 203 where wavelet transform coefficients corresponding to the region of interest are identified. The ROI coefficient identification result is used at entropy decoding step 204 and ROI coefficients de-scaling step 205.

At entropy decoding step 204, entropy decoding is performed on the incoming bit stream with the data bits which are received at receiver step 201. The decoded bits are obtained for each bit field of the binary representation of the quantization indices of each transform coefficient. Within each quantization index, the bit field of the higher bit significance level is decoded earlier than the bit field of the lower bit significance level. In other words, entropy decoding is performed to obtain each bit field within a quantization index in a decreasing order of bit significance. In order to know which quantization indices are scaled up as the coefficients corresponding to the region of interest, and also how much they are scaled up, the entropy decoding process refers the ROI coefficient identification result at step 203 and takes out the priority value assigned to the region of interest from the header bits received at receiver step 201. The entropy decoder used in step 204 is either bit plane decoding technique or SPIHT decoding technique: if entropy encoding is done with a bit plane coding technique, decoding has to be done with a corresponding bit plane decoding technique; if entropy encoding is done with a SPIHT coding technique, decoding has to be done with a SPIHT decoding technique. Entropy decoded bits are organized as the bit field values of the binary representation of the quantization indices and are given to ROI coefficient de-scaling step 205 as the quantization indices.

At step 205, the quantization indices corresponding to the region of interest are scaled down in order to perform de-quantization on the quantization indices at step 206. Since the quantization indices scaled up in the encoding process are to be scaled down by the same amount of bit shift value as the value used in the encoding process, no information is lost due to the scaling down. Which quantization indices are to be scaled down is given by the ROI coefficient identification result at step 203, and how many bit shifts the indices are scaled down is taken out from the header bits received at step 201.

At de-quantization step 206, de-quantization is performed on the quantization indices in order to obtain de-quantized transform coefficients in each subband. The de-quantization scheme is specified by the quantization step size, bits per coefficient, or quantization table, either of which is taken out from the header bits.

At inverse wavelet transform step 207, an inverse wavelet transform is performed on the de-quantized transform coefficients in each subband in order to obtain a reconstructed image. The number of wavelet decomposition levels and the type of wavelet decomposition are provided by the header bits taken out from the encoded bit stream at step 201. The number and the type have to be the same ones as used in the encoder.

At region coordinate decoding step 202, encoded data regarding the coordinates of the region of interest formed at ROI coordinate description step 106 in encoding method 100 is decoded and ROI coordinates are obtained. The step is performed by performing the step 106 ROI coordinate description in a reverse order. In other words, step 202 is to perform step 106 in such a way that the output of step 106 is to be the input to step 202 and the input to step 106 is to be the output of step 202. In case multiple regions of interest are emphasized in the encoded bit stream, step 202 decodes coordinates for each region of interest.

At ROI coefficient identification step 203, the same process as step 105 in the encoding method 100 is performed. The reason why the same process is repeated at the decoding side is that the information specifying the selected region of interest within the encoded bit stream can be transmitted or saved more efficiently in the form of a description in the image domain, which is provided as the input to step 202, than in the form of a description in the wavelet domain which is obtained through step 203. In case multiple regions of interest exist in the encoded bit stream, ROI coefficients corresponding to each region of interest are identified and categorized in each category.

At entropy decoding step 204, the encoded bit stream generated at the step 108 entropy encoding in the encoding method 100 is decoded. When a bit plane encoder is used at step 108, a corresponding bit plane decoder is used in step 204. Step 204 is to perform entropy decoding in the reverse order of step 108 entropy coding in encoding method 100. This decoder can deal with multiple regions of interest starting from different stages of encoding with different priority, ROI coding starting from the beginning of the encoding, and ROI coding starting from the middle of encoding.

At step 204, the encoded data bit stream is separated into a set of bit streams for each subband by seeking an encoding tag for each subband. Then, each bit stream for each subband is separated into a set of bit streams for each bit plane by seeking an encoding tag for each bit plane. Each bit stream for each bit plane is entropy decoded by a bit plane decoder. The bit plane decoding is done in the order of decreasing bit significance level. The number of bit planes in each subband is given by a summation of the bits per coefficient for each subband and the priority (left bit shift value) assigned to the region of interest. To which bit field each decoded bit is assigned is determined by the ROI coefficient identification result obtained at step 203 together with the number of bit planes and priority to the region of interest.

The bit rate for each subband can be controlled at step 204. The simplest way is to truncate the bit stream for each subband at a desired bit rate or at a desired number of bits. Thanks to the priority control to the region of interest and specifying the starting stage of emphasizing the region of interest at the encoding side, bit allocation for the region of interest and for the rest of the image at a given bit rate can be roughly controlled together with the truncation of the stream for each subband. However, if the bit rate for the stream of a set of bit planes representing the region of interest is controlled with a one rate controller (1), the bit rate for the stream of a set of bit planes representing both the region of interest and the rest of the image is controlled with a one rate controller (2), and the bit rate for the stream of a set of bit planes representing the regions out of the region of interest is controlled with another rate controller (3), the bit rate allocated to the region of interest and the rest of the image is more precisely controlled at a given bit rate for the entire image. If the priority to the region of interest is the maximum, all the bit planes represent either the region of interest or the rest of the image. Thus, providing the rate controller for (1) and (3) makes it possible to control the bit rate for the region of interest and also the rate for the rest of the image by bit accuracy.

At the ROI coefficient de-scaling step 205, the values of the quantization indices corresponding to the region of interest or the bit significance levels of the quantization indices corresponding to the region of interest are scaled down.

The details of this step are exactly the same as the details of ROI coefficient scaling step 107 in the encoding method 100 except that the input to step 107 is the output of step 205, output of step 107 is the input to step 205, scaled up in step 107 corresponds to scaled down in step 205. Also, the encoding ordering in step 107 corresponds to the decoding ordering in step 205.

At de-quantization step 206, the de-quantization scheme which restores the transform coefficients quantized by the quantization scheme utilized in step 103 in encoding method 100 is used. If the quantization is done by a scalar quantization at the encoder, the de-quantization has to be done with a scalar de-quantization. If the quantization is done with a trellis coded quantization, the de-quantization has to be done with a trellis coded de-quantization. Representation levels of the de-quantizer can be mid-points of the decision levels in the quantizer or can be centroids of the decision levels which are calculated by assuming the distribution of the quantization index values for each subband. Even if quantization is not performed at the encoder, de-quantization is performed at the decoder except when an integer wavelet transform is used and both encoding and decoding is done losslessly. When encoding is done losslessly and decoding is done with some loss, quantization is not done in the encoding process but de-quantization is done in the decoding process.

At inverse wavelet transform step 207, an inverse wavelet transform which reconstructs the image decomposed by the wavelet transform utilized in step 101 in the encoding method 100 is used.

In FIG. 11, a method for compressing an image with an emphasis on a selected region of interest in an image by allocating more bits to the region of interest than to the regions out of the region of interest is illustrated. The major difference between this encoding method and the method in FIG. 1 is that the ROI coefficient scaling is performed before quantization is performed on the transform coefficients in this method. The steps different from those in FIG. 1 are the step for ROI coefficient scaling and the step for entropy coding. The rest of the steps are the same.

In FIG. 11, encoding method 1100 comprises wavelet transform step 1101 for performing a wavelet transform on the pixel values of the input digital image in order to represent the input image by a set of subbands consisting of the transform coefficients. Step 1011 is followed by bit allocation step 1102 and ROI coefficient scaling step 1003. At step 1102, the bits per coefficient (i.e., representation accuracy of the coefficient) assigned to the transform coefficients in each subband are determined. Equivalently, quantization step size for each subband may be determined. In case the allocated bits per coefficient or the quantization step size for each subband is predetermined, step 1102 is not performed. The allocated bits per coefficient is used at quantization step 1107. An alternative to performing the bit allocation in step 1102 based on the transform coefficients provided by step 1101 is to perform the bit allocation based on the transform coefficients scaled up through step 1103.

Before, after or together with steps 1101 and 1102, region of interest selection step 1104, ROI coefficient identification step 1105, and ROI coordinate description step 1106 are performed. At step 1104, a region of interest is selected on the input image and the coordinates of the selected region of interest are input to steps 1105 and 1106. At step 1105, wavelet transform coefficients corresponding to the selected region of interest, i.e., ROI coefficients, in each subband are identified in order to emphasize the selected region of interest in the image by emphasizing the ROI coefficients in each subband containing the wavelet transform coefficients. The identification result of the ROI coefficients (i.e., categories of the coefficients), which depicts whether the transform coefficients correspond to each region of interest or regions outside of the region of interest, is input to step 1103. At ROI coordinate description step 1106, coordinates of the selected region of interest are encoded in order to effectively transmit or store the ROI coordinate information.

At ROI coefficient scaling step 1103, the transform coefficients provided from step 1103, only the transform coefficients corresponding to the region of interest, are emphasized by multiplying the coefficient values with a scaling value which is assigned to the selected region of interest. According to the scaling, the transform coefficients corresponding to the region of interest are to be quantized with a larger number of bits at quantization step 1107 and be represented more precisely than other transform coefficients. When a left bit shift value is used as a scaling value, the corresponding transform coefficients are emphasized by a left bit shift of the coefficient values. The identification result of ROI coefficients formed at the step 1105 is used to select which coefficients are to be scaled up. All the transform coefficients including the ones scaled up in step 1103 are given to quantization step 1107 to be quantized. The following steps are independent of which coefficients are scaled up. If a uniform quantizer is used and the scaling value to the region of interest is the quantization step size or the step size multiplied by integer value, ROI coefficient scaling can be done after the quantization step. In this situation, encoding method 1100 is the same as the one in FIG. 1.

At step 1107, quantization is performed on the transform coefficients in each subband in order to represent the transform coefficients of each subband with quantization indices whose representation accuracy is specified by the allocated bit per coefficient or by the quantization step size for each subband. Through step 1107, quantization indices representing transform coefficients with a reduced or the same representation accuracy of the transform coefficient values are obtained. The obtained quantization indices are given to step 1108 entropy coding.

At entropy coding step 1108, an entropy coding is performed on each bit element of the binary representation of the quantization indices in order to form an encoded data stream within which encoded bits generated from bit fields at a higher bit significance level of the quantization indices are placed in the earlier portion of the bit stream than other encoded bits generated from bit fields at a lower bit significance level. The encoding ordering of each bit field of transform coefficients in each subband is up to the encoding technique. The preferred encoding technique in step 1108 is either a bit plane coding such as binary arithmetic coding technique or a zero tree coding such as the SPIHT coding technique.

At transmitter step 1109, header bits such as size of the image, number of wavelet decomposition level, bit per coefficient or quantization step size for each subband, ROI description information, and priority or left bit shift value assigned to the region of interest are appended to the data bits formed by the entropy coder. The appended data is transmitted or stored as an encoding bit stream.

When multiple regions of interest are to be emphasized, multiple regions of interest are identified at step 1104, ROI coefficients corresponding to each region of interest are identified and categorized into different categories at step 1105, coordinates for each region of interest or for all the regions of interest are encoded at step 1106. Steps 1104, 1105, and 1106 for multiple regions of interest are the same as steps 104, 105, and 106 of the encoding method 100 (FIG. 1) for multiple regions of interest. At step 1103, the values of the transform coefficients in each category can be scaled up by their own scaling value (multiplied by a scaling value assigned to each region of interest). As a result, each region of interest can be encoded with a different emphasis and the image quality of each region of interest can be separately controlled.

In FIG. 12 a method of decompressing an image which is encoded by the encoding method in FIG. 11 with an emphasis on a selected region of interest is illustrated. An important difference between the decoding method in FIG. 12 and the decoding method in FIG. 2 is that the de-quantization is performed before the ROI coefficient de-scaling is performed in FIG. 12 while the de-quantization is performed after the ROI coefficient de-scaling in FIG. 2. The steps different from those in FIG. 2 are a step for entropy decoding and a step for ROI coefficient de-scaling. The rest of the steps are the same.

In FIG. 12, the decoding method 1200 comprises a receiver step 1201 for receiving an encoded bit stream consisting of header bits and data bits. Step 1201 is followed by region coordinate decoding step 1202 and entropy decoding step 1204. At step 1202, encoded data of the region coordinates is decoded in order to obtain the coordinates of the region of interest (ROI) which is to be reconstructed with an emphasis in the reconstructed image. The decoded ROI coordinates are given to ROI coefficient identification step 1203 where wavelet transform coefficients corresponding to the region of interest are identified. The ROI coefficient identification result is used at ROI coefficients de-scaling step 1206.

At entropy decoding step 1204, entropy decoding is performed on the incoming bit stream with the data bits which are received at receiver step 1201. The decoded bits are obtained for each bit field of the binary representation of the quantization indices of each transform coefficient. Within each quantization index, the bit field of the higher bit significance level is decoded earlier than the bit field of the lower bit significance level. An entropy decoder used in step 1204 is either a bit plane decoding technique or SPIHT decoding technique: if entropy encoding is done with a bit plane coding technique, decoding has to be done with a corresponding bit plane decoding technique; if entropy encoding is done with a SPIHT coding technique, decoding has to be done with a SPIHT decoding technique. Entropy decoded bits are organized as the bit field values of the binary representation of the quantization indices and are given to de-quantization step 1205.

At de-quantization step 1205, de-quantization is performed on the quantization indices in order to obtain de-quantized values of the transform coefficients in each subband. The de-quantization scheme is specified by the quantization step size, bits per coefficient, or quantization table, either of which is taken out from the header bits.

At step 1206, the values of the transform coefficients corresponding to a region of interest which is to be emphasized on the reconstructed image are scaled down. Scaling down is performed by dividing the values of the corresponding transform coefficients by a scaling value which is taken out from the header bits received at receiver step 1201. When the scaling value is specified by a left bit shift value, the scaling down is done by performing a right bit shift on the coefficient values by the scaling value.

At inverse wavelet transform step 1207, an inverse wavelet transform is performed on the transform coefficients in each subband in order to obtain a reconstructed image. The number of wavelet decomposition levels and the type of wavelet decomposition are provided by the header bits taken out from the encoded bit stream at step 1201. The number and the type have to be the same ones as used in the encoder.

When multiple regions of interest are to be emphasized, based on header bits received from receiver step 1201, ROI coefficients corresponding to each region of interest are identified at the step 1203. Based on the ROI coefficient identification result and a priority or scaling value assigned to each region of interest provided by header bits, transform coefficients corresponding to each region of interest are scaled down according to a priority to each region of interest.

FIG. 13 illustrates region of interest coding where encoding and decoding are done on a block by block basis. In this encoding and decoding scheme, an image is divided into a set of blocks (i.e., small parts of the image) whose shapes are rectangle, square, line, or combinations of some or all of the rectangle, square and line, and each block is treated as a separate input to the encoder or a separate output for the decoder. Each block which is outside the region of interest is encoded by an encoding method as in FIG. 1 or FIG. 11, without using ROI functionality, (without identifying ROI coefficients, without performing scaling up). An encoding tag which identifies a block as outside of the region of interest is added to the encoded bit stream for a block which is outside the region of interest. Each block which is inside the region of interest is also encoded without using ROI functionality, or alternatively the blocks inside the region of interest can be encoded by using ROI functionality such as ROI coefficient scaling. An encoding tag which identifies a block as inside the region of interest is added to the encoded bit stream for a block which is inside the region of interest. Each block which overlaps the boundaries of the region of interest is encoded by an, encoding method in FIG. 1 or FIG. 11 with ROI functionality. An encoding tag which identifies the region of interest boundaries is added to the encoded bit stream for a block which overlaps the boundaries of the region of interest. A bit rate for each block is allocated in such a way that the blocks within the region of interest are allocated the highest bit rate, the blocks overlapping the region of interest are allocated the next highest bit rate, and the blocks outside the region of interest are allocated the lowest bit rate. Alternatively, for the purpose of reducing the computational complexity at the encoding side and the decoding side, blocks which overlap the boundaries of the region of interest are regarded either as blocks which are inside the region of interest or the blocks which are outside the region of interest according to the number of pixels within the region of interest, percentage of pixels within the region of interest, or any other criteria.

Each bit stream for each block can be aligned into an encoded bit stream for the entire image in the order that each block is encoded, or the bit streams for the blocks which are inside the region of interest can be aligned first, the bit streams for the blocks which overlap the boundaries of the region of interest can be aligned second, and the bit streams for the blocks which are outside the region of interest can be aligned last. In the latter case, the encoding tag for each block has to have location information specifying a location within the image.

Based on an encoding tag assigned to bit portions for each block, decoding is done by a decoding method in FIG. 2 (if the encoding method in FIG. 1 is used), or by a decoding method in FIG. 12 (if encoding method in FIG. 11 is used). For bit portions preceded by a tag showing a block within or outside the region of interest, decoding is performed without using ROI functionality. If the encoding of the blocks within the region of interest is done by using ROI functionality such as ROI coefficient scaling, decoding of the blocks within the region of interest needs to be done with ROI functionality. For bit portions preceded by a tag showing a block which overlaps the region of interest, decoding is performed with ROI functionality.

By default, blocks within the region of interest are allocated the highest bit rate, blocks overlapping the region of interest are allocated the second highest bit rate, and blocks outside the region of interest are allocated the lowest bit rate at a given bit rate. However, the bit rate for each block can be controlled independently. If the decoding side wants to reconstruct regions which are not specified as the region of interest with higher fidelity, the blocks within the newly defined region are assigned a higher bit rate.

When subband classification is used in the encoder as in FIG. 1 or in FIG. 11, each subband is classified into several sequences containing transform coefficients. Instead of performing ROI coefficient scaling in each subband, ROI coefficient scaling is performed on the quantization indices or on the transform coefficients in each sequence. Entropy coding is also performed on the scaled up result of each sequence. The encoding method can be the one in FIG. 1, or the one in FIG. 11 if each sequence is assumed to be each subband in the encoding method of FIGS. 1 or 11. Sequence based technique works with encoding method of FIGS. 1 and 11 with every kinds of ROI coefficient scaling technique by treating each sequence as if it were each subband after each sequence is generated from subbands.

When the encoded bit stream of the image is generated by en encoding method which uses a subband classification technique, entropy decoding and ROI coefficient de-scaling are done in order to obtain each sequence containing coefficients. Then several sequences originating from the same subband are de-classified into each subband so that the inverse wavelet transform can be performed. If each bit portion for each sequence is assumed to be a bit portion for each subband, the decoding is done with a decoding method according to FIGS. 2 or 12. As well as the encoding method, decoding method described in FIGS. 2 or 12 works with subband classification technique by treating each sequence as if it were each subband in every step until the sequences are formed to subbands in order to perform inverse wavelet transform.

When entropy coding is done on each block of coefficients in each subband or in each sequence in an encoding method as in FIGS. 1 or 11, ROI coefficient scaling method according to the FIGS. 3A–6C and entropy coding method according to the FIGS. 7A–8C are performed on each block of coefficients. To perform entropy coding on each block of coefficients, each subband or each sequence of coefficients is divided into blocks of coefficients. Each subband or sequence can be divided into blocks of the same shape or different shapes. The blocks can be of rectangular shape, square shape or line, or combinations of some or all of the rectangle, square, and line. In order to reduce the computational complexity for handling each block, all the subbands can have equal number of blocks of the same shape or alternatively equal size of blocks of the same shape. Each block is encoded separately. Blocks which are not corresponding to the region of interest are encoded without using the ROI coefficient scaling method. Encoding tag which shows the block is out of the region of interest is appended to the encoded bit stream of the block. Blocks which are corresponding to the region of interest are encoded by using the ROI coefficient scaling method. Encoding tag which shows the block is corresponding to the region of interest is added to the encoded bit stream of the block. The encoding tag may show that the all the coefficients in the block are corresponding to the region of interest or some of the coefficients in the block are corresponding to the region of interest. When all the coefficients in the block are corresponding to the region of interest, the encoding may be done without using the ROI coefficient scaling method.

Alternatively, the blocks which have coefficients corresponding to the region of interest and coefficients corresponding to the regions out of the region of interest can be classified either as the blocks whose coefficients are belonging solely to the region of interest or the blocks whose coefficients are belonging solely to the regions out of the region of interest. The classification is based on the number of coefficients corresponding to the region of interest, the ratio of the number of coefficients corresponding to the region of interest versus the number of the coefficients in each block, or any other criteria. Encoding for all the blocks is done without using the ROI coefficient scaling method. Instead, encoding tag which differentiates the encoded bit stream of each block either as a stream for the region of interest or a stream for the regions outside the region of interest is added to the encoded bit stream of each block so that the decoder can specify which bit portion is corresponding to the region of interest.

When the entropy encoding is done on each block of coefficients within each subband or sequence, entropy decoding and ROI coefficient de-scaling method, which corresponds to the entropy encoding method and ROI coefficient scaling method used in the encoding side, as used in FIGS. 2 or 12, is done on each block. In this decoding situation, region of interest which is not specified at the encoding side or region of interest specified solely by the decoding side can be reconstructed with higher fidelity than the rest of the image or can be selectively reconstructed. Based on the newly specified region of interest, transform coefficients corresponding to the region of interest are specified according to the method in FIGS. 9. Blocks of coefficients which contain coefficients corresponding to the newly defined region of interest are reconstructed with higher bit rate than the other blocks in the subbands. Blocks of coefficients which contain only the coefficients corresponding to the region of interest will be allocated the highest bit rate. Blocks of coefficients which contain coefficients corresponding to the region of interest and those corresponding to the regions outside the region of interest will be allocated the same bit rate, the lower bit rate, or the lowest bit rate. Blocks of coefficients which does not contain coefficients corresponding to the region of interest will be allocated the lowest bit rate. If 0 bit is allocated to a block, the block is not used to reconstruct the image.

Bit allocation to each block can be more accurately performed based on the number of coefficients corresponding to the region of interest in each block. The larger the number of coefficients corresponding to the region of interest in a block, the block will be allocated the larger number of bit rate to reconstruct the image. The bit allocation can be done according to any criteria which reflects the degree of importance of each coefficient in reconstructing the region of interest or the entire image. For example, the degree of importance of each coefficient can be defined based on whether the coefficient is corresponding to the region of interest or not, how many pixels in the region of interest is represented by the coefficient, how may percentage of the pixels represented by the coefficient belongs to the region of interest. All or some of these criteria is used together with the number of coefficients corresponding to the region of interest within each block to determine the number of rate of bits to be allocated to the block of coefficients.

Instead of allocating bit or bit-rate by using the criteria for each block, encoding or decoding ordering of the block of coefficients can be determined in such a way that the block which is to be allocated higher bit rate is given an earlier encoding or decoding ordering. Any other ordering can be defined based upon the criteria for each block.

Figure 14:
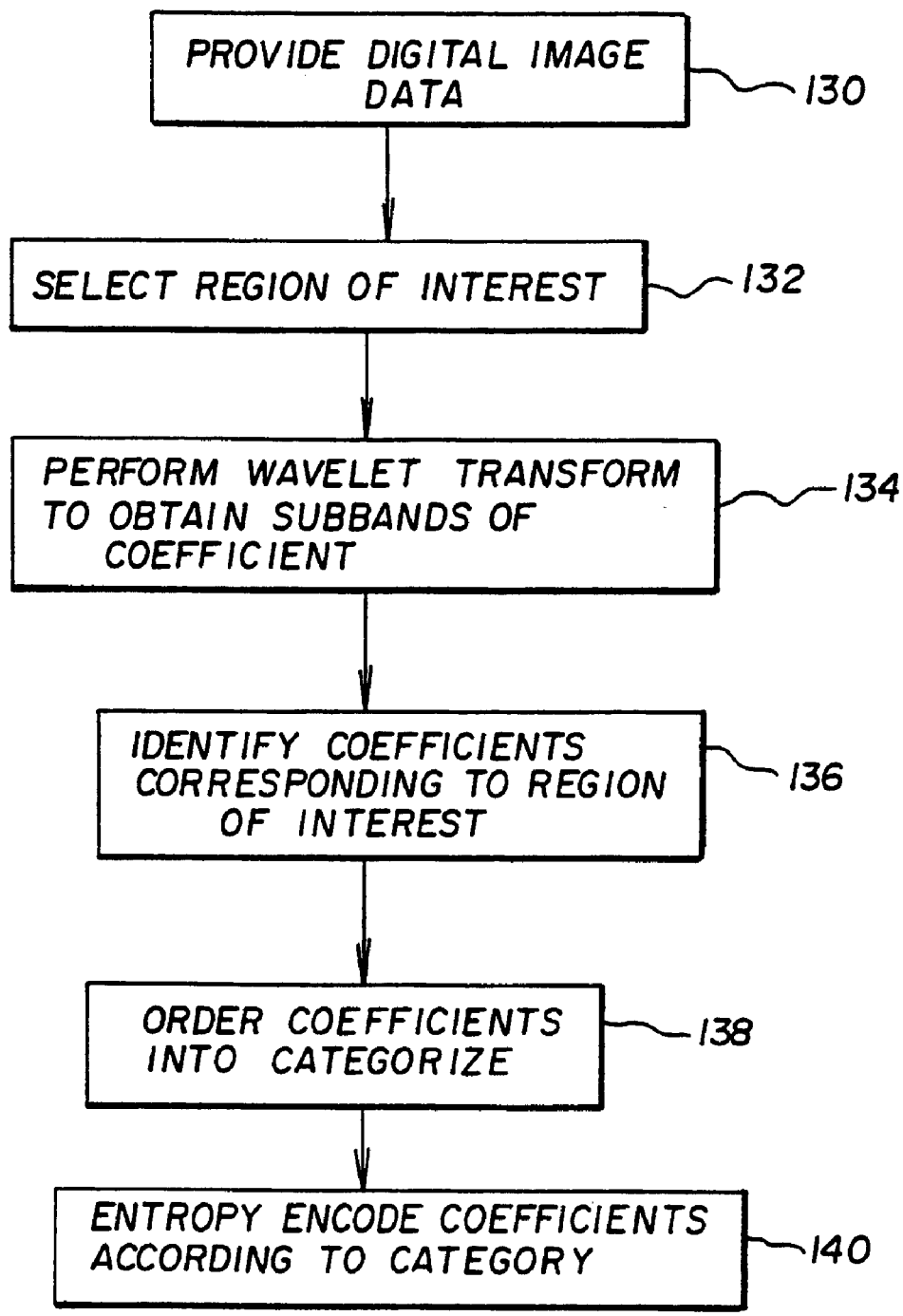
FIG. 14 is a flow chart of another method of encoding data in accordance with the present invention.

FIG. 14 is a flow chart of another method of encoding data in accordance with the present invention. The method begins with providing step 130 providing digital data corresponding to an image. A region of interest in the image is then selected by a user in step 132. However, the present invention also includes a method wherein an automatic target recognition system defines a region of interest based on a set of criteria. The automatic target recognition system may utilize a variety of approaches to identify the region of interest. For example, pattern recognition software may be used to identify objects of interest in the image. After a region of interest has been selected in the image, a wavelet transform is then performed on the digital image data to obtain a set of subbands containing coefficients 134. As discussed above, a number of different types of wavelet transforms, such as mallet type transforms, spacl type transforms, packet type transforms, etc., may be used to obtain the coefficients. The coefficients corresponding to the selected region of interest are identified 136. The coefficients are then ordered so that at least one category of coefficients corresponds to digital image data representing the region of interest 138. The coefficients are then entropy encoded according to the category into which they were ordered 140. By ordering the coefficients into categories corresponding to the region of interest, it becomes possible to separately process and compress the different regions of the image. This is extremely valuable in situations where a large portion of the image consists of a relatively featureless background.

Figure 15:
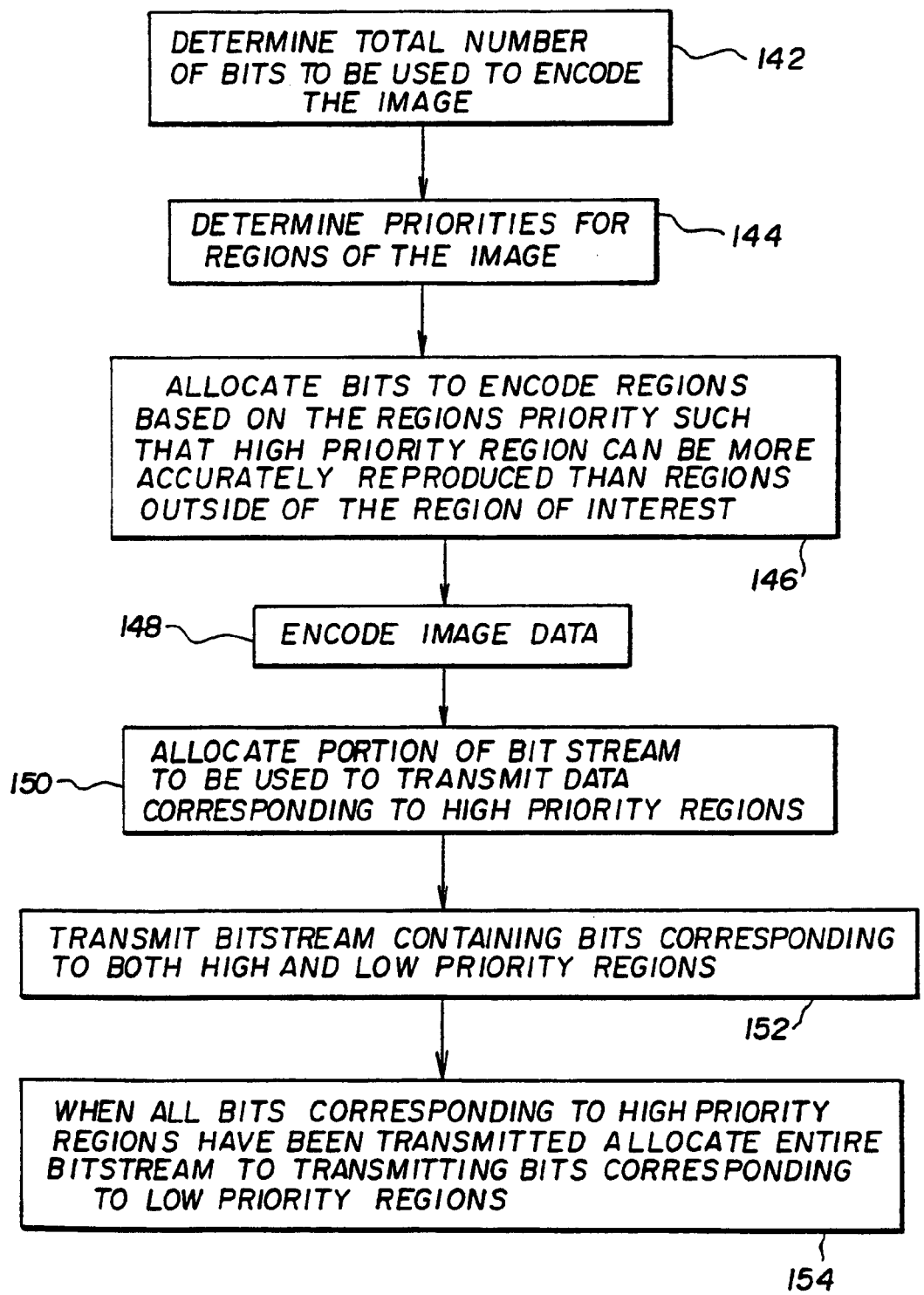
FIG. 15 illustrates an approach whereby a total number of bits to be used to encode the digital data representing the image is determined.

There are several different approaches to determining the degree to which the region of interest will be compressed. One such approach is to let a user select the degree of compression. Another approach, shown in FIG. 15, is to determine at step 142 a total number of bits to be used to encode the digital data representing the image. Priorities are determined at step 144 for different regions of the image. Bits from the total number of bits are then allocated at steps 146 and 148 for encoding the various regions of the image according to the priority of the region such that high priority regions can be more accurately reconstructed than low priority regions. Typically, transmitting devices have a set bit rate at which they transmit a bit stream. In accordance with the invention, a portion of the bit stream to be transmitted is allocated at step 150 for transmitting the high priority regions of the image. For example, if the bit stream is transmitted at a rate of 1000 bits per second, 800 bits per second may be allocated to transmitting the encoded data representing the high priority regions of the image and 200 bits per second may be allocated to transmitting the encoded data representing the low priority regions. Once a portion of the bit stream has been allocated at step 150 for transmitting the high priority encoded data, the bit stream is transmitted at step 152 to a remote location. Once all of the encoded data corresponding to the high priority regions of the image has been transmitted, the entire bit stream is allocated at step 154 to transmitting encoded data representing the lower priority regions of the image.

Figure 16:
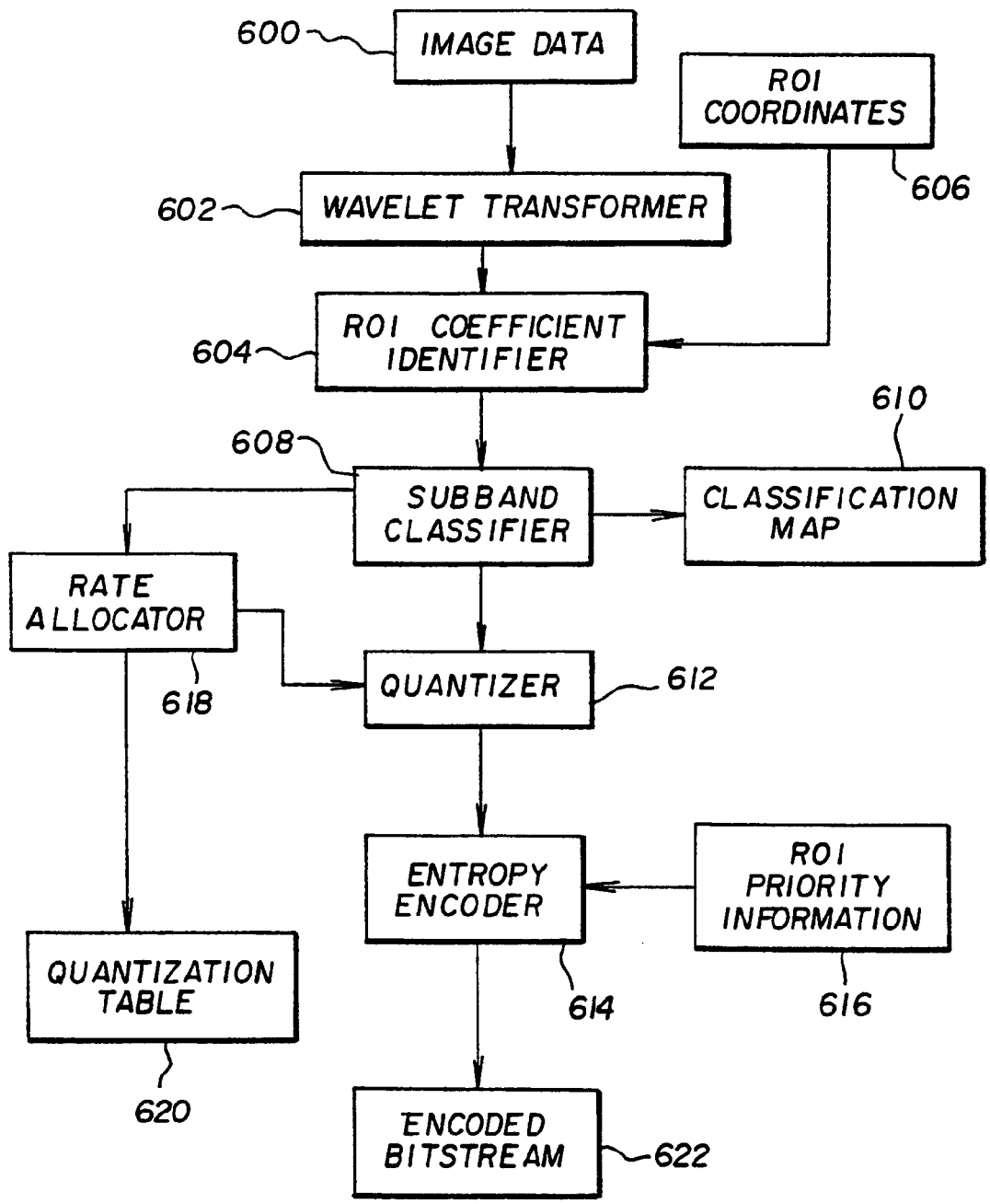
FIG. 16 shows a block diagram of an embodiment of an encoding device of the present invention.

FIG. 16 shows a block diagram of an embodiment of an encoding device of the present invention. Image data 600 is provided to a wavelet transformer 602. The wavelet transformer 602 performs a wavelet transform of the image data 600 to obtain subbands containing coefficients. A region of interest coefficient identifier 604 receives the region of interest coordinates and the subbands containing coefficients from the wavelet transformer 602 and identifies the coefficients corresponding to the region of interest.

As discussed above, identification of the coefficients obtained from the wavelet transform that correspond to the region of interest is accomplished by tracing back the inverse wavelet transforms from the image domain to the wavelet domain. In this manner a set of wavelet transform coefficients that are used to reconstruct each pixel can separately be identified. Thus, the identification of the region of interest coefficients is independent of the shape of the region of interest and the region of interest can consist of disconnected regions. A subband classifier 608 classifies the coefficients and produces a classification map 610. The classified coefficients are sent to a quantizer 612 and a rate allocation device 618. The rate allocation device 618 allocates a quantization step size to each class of coefficients and provides this rate to the quantizer 612. The rate allocation device 618 also produces a quantization table which includes information concerning the quantization step size allocated to each subband class. The quantizer 612 quantizes the coefficients and provides the quantized coefficients to an entropy encoder 614. The entropy encoder 614 encodes the quantized coefficients according to received priority information concerning the region of interest 616 provided to the entropy encoder 614. The output of the entropy encoder 614 is an encoded bit stream 622.

Figure 17:
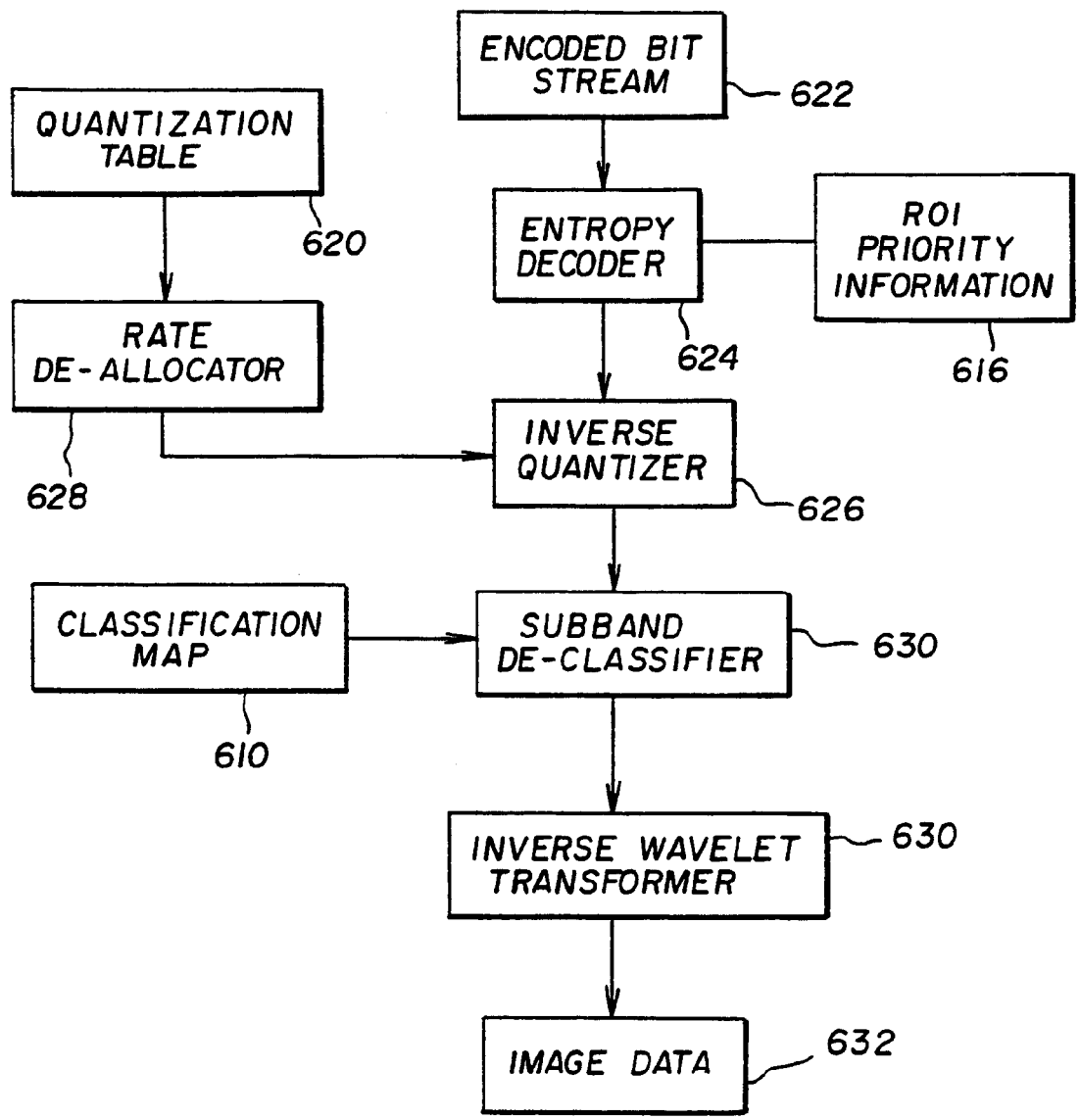
FIG. 17 depicts a block diagram of an embodiment of a decoding device of the present invention.
Figure 18:
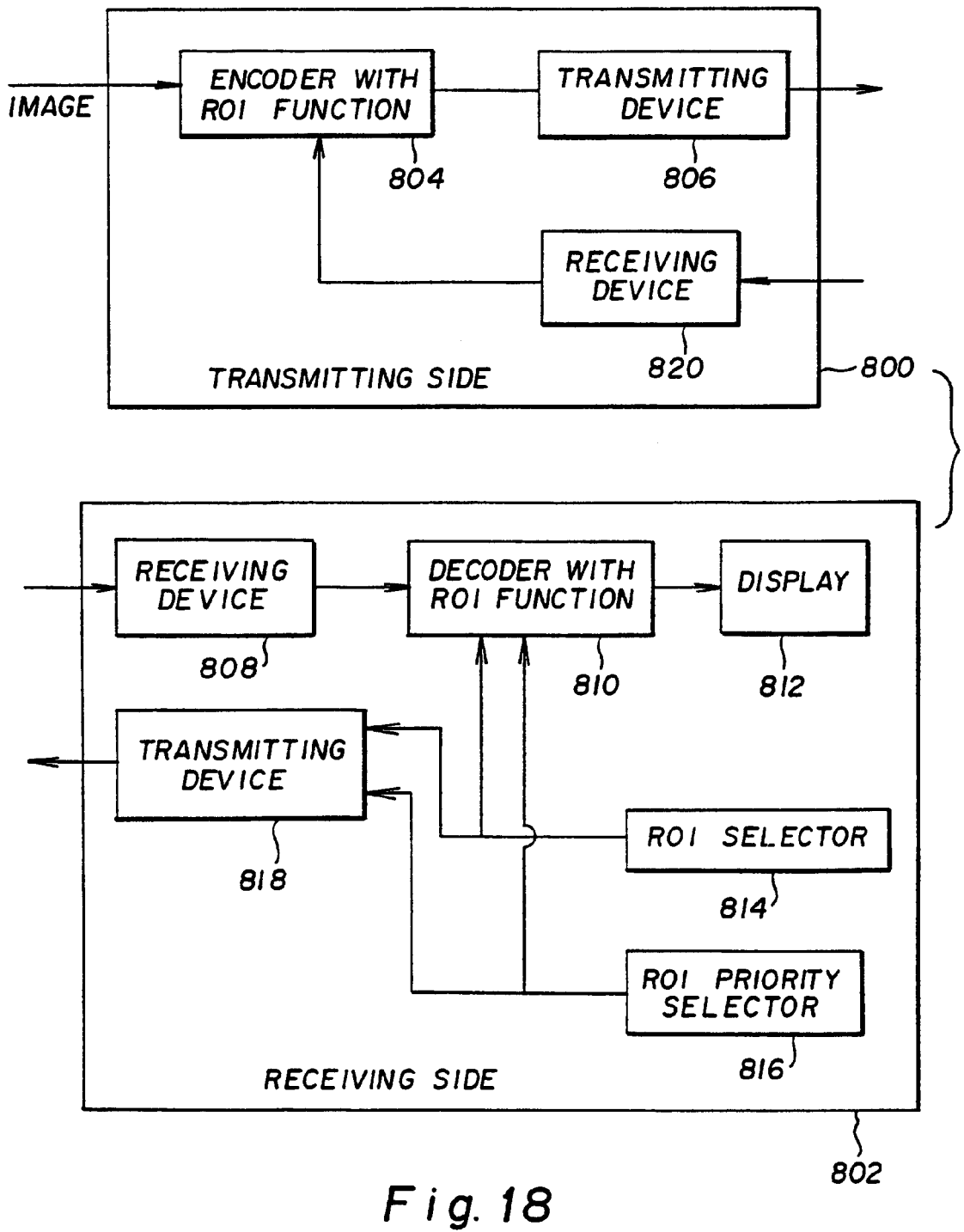
FIG. 18 depicts an embodiment wherein the device includes a transmitting side that encodes the image and transmits the encoded data to a receiving side which receives and displays the image.

FIG. 17 depicts a block diagram of an embodiment of a decoding device of the present invention. An encoded bit stream 622 and region of interest priority information 616 are received by an entropy decoder 624. The entropy decoder 624 produces a quantized output which is provided to an inverse quantizer 626. The inverse quantizer 626 also receives quantization information from a rate de-allocator 628 based on a quantization table 620. The inverse quantizer 626 produces coefficients that are sent to a subband declassifier 630. The subband declassifier 630 declassifies the coefficients according to a received classification map to produce a set of subbands which are provided to an inverse wavelet transformer 630. The inverse wavelet transformer 630 performs an inverse wavelet transform on the subbands to obtain image data 632 which can be used to reconstruct an image. FIG. 18 depicts an embodiment of the invention wherein the device includes a transmitting side 800 that encodes the image and transmits the encoded data to a receiving side 802 which displays the image. The transmitting side 800 has an encoder 804 with region of interest functionality. Initially, the encoder 804 encodes a low resolution, low fidelity or low bit rate version of the image and sends the encoded version to a transmitting device 806. The transmitting device 806 transmits the encoded signal to a receiving device 808 located on the receiving side 802. The transmission may be accomplished across a wired transmission channel or wirelessly. The receiving device 808 on the receiving side 802 receives the encoded signal and provides it to a decoder 810 with region of interest functionality. The decoder 810 decodes the image and sends it to a display 812 where it is displayed to a user. The receiving side 802 has a region of interest selector 814 which allows a user to select a region of interest in the displayed image. The receiving side 802 also has a region of interest priority selector 816 which allows the user to select the priority with which the region of interest will be encoded. For example, the priority may be selected so that the region of interest will be reconstructed losslessly. Once a region of interest and a priority have been selected, the region of interest 814 and priority 816 selector provide information concerning the selections to the decoder 810 and to a transmitting device 818. The transmitting device feeds back this information to a receiving device 820 on the transmitting side 800. The receiving device 820 receives the information and provides it to the encoder 804. The encoder 804 then priority encodes the selected region of interest according to the information and then transmits the encoded region of interest information back to the receiving side 802 as previously discussed. The process can be repeated so that the user can redefine the region of interest based on an examination of the previous region of interest. Thus, the above discussed embodiment allows a user on the receiving side to determine the region of interest encoding interactively.

Yet another application of the present invention involves integrating the region of interest concepts discussed above into a digital camera. In such an application, a region of interest and criteria for encoding the region is selected by a user of the digital camera on a view finder or display of the camera. The camera then records the information in the region of interest according to the criteria. By only recording a selected region of interest with a high resolution or fidelity, the amount of storage space required to store the digital image may be reduced. As the storage space in most digital cameras is very limited such an application is very beneficial.

It is also appreciated that the above discussed encoding methods and apparatus can also be adapted to digitally reproduced motion pictures. For example, a selected portion of a bit stream being transmitting to allow for real time reproduction of an image could be dedicated to transmitting a region of interest in the resulting motion picture. Furthermore, the dimensions and location of the region of interest could be constantly changing as the motion picture progresses.

The above description of the invention is for illustrative purposes only. It should be understood that the selection and reconstruction of a region of interest according to the present invention can be utilized with other types of compression methods, and that the various means which are disclosed above have numerous equivalents which would be within the scope of knowledge of a person of skill in the art. The metes and bounds of the invention are defined in the appended claims.

What is claimed is:

1. A method of image compression, said method comprising the steps of:

providing digital image data including data on values and coordinates for a plurality of pixels;

selecting a region of interest of an image represented by said digital image data;

sorting and prioritizing said digital image data according to at least two priority categories, with digital image data corresponding to the region of interest having a higher priority than digital image data corresponding to areas outside of the region of interest; and transmitting said sorted and prioritized digital image data to a remote location, with the digital information data corresponding to the region of interest being transmitted with higher priority than the areas outside of the region of interest wherein said sorting and prioritizing of said digital image data further comprises the steps of:

performing a wavelet transform of all the pixel values in the digital image data to obtain transform coefficients;

identifying the transform coefficients corresponding to the region of interest; emphasizing the transform coefficients corresponding to the region of interest by scaling up the transform coefficients corresponding to the region of interest;

ordering the transform coefficients including the scaled up transform coefficients; and entropy encoding the transform coefficients to form a bit stream.

2. A method of image compression, said method comprising the steps of:

providing digital image data including data on values and coordinates for a plurality of pixels;

selecting a region of interest of an image represented by said digital image data;

sorting and prioritizing said digital image data according to at least two priority categories, with digital image data corresponding to the region of interest having a higher priority than digital image data corresponding to areas outside of the region of interest; and transmitting said sorted and prioritized digital image data to a remote location, with the digital information data corresponding to the region of interest being transmitted with higher priority than the areas outside of the region of interest, wherein said step of transmitting said sorted and prioritized digital image data to the remote location includes performing a wavelet transform of all the pixels values in the digital image data to obtain transform coefficients, transmitting the sorted and prioritized digital image data corresponding to the region of interest at a higher rate such image data corresponding to the region of interest at a higher rate such that the region of interest can be reconstructed at a higher fidelity than areas outside of the region of interest, said higher fidelity being provided by said sorting and prioritizing of said digital image data corresponding to the region of interest.

3. A method for encoding and decoding an image, said method comprising the steps of:

providing digital image data in a computer-readable format, said digital image data including data on values and coordinates for a plurality of pixels;

sorting said digital image data according to a sorting protocol for the entire image, said digital image data being sorted and prioritized according to a predetermined prioritization formula;

transmitting said sorted data to a receiver, and repeating said sorting and transmitting until a partial reconstructed image appears on a display at the receiver;

selecting a region of interest based upon said partial reconstructed image;

transmitting data from said receiver to a computer transmitting data identifying the selected region of interest;

modifying the sorting of the digital image data based upon the selected region of interest, wherein digital image data corresponding to the region of interest is sorted and prioritized to have a higher priority than digital image data corresponding to areas outside of the region of interest; and transmitting said modified sorted and prioritized data to the receiver, with said region of interest being transmitted with higher priority than the areas outside of the region of interest, wherein said step of transmitting said sorted data includes transmitting said sorted data onto a network, wherein said receiver is a receiving computer on said network, and wherein said step of selecting the region of interest is performed at said receiving computer.

4. A method of encoding digital data representing an image, the method comprising the steps of:
providing digital image data in a computer-readable format, the digital image data including data on values and coordinates for at least one image;
selecting at least one region of interest of an image represented by the digital image data;
performing a wavelet transform selected from the group consisting of a mallet type wavelet transform, a spacl type wavelet transform, and a packet type wavelet transform on the digital image data to obtain subbands containing transform coefficients;
identifying transform coefficients corresponding to the at least one selected region of interest;
specifying a priority to each region of interest;
classifying the transform coefficients in each subband into at least one sequence;
allocating a bit-rate to each sequence of transform coefficients;
quantizing the transform coefficients in each sequence by a quantization scheme selected based upon the allocated rate;
scaling up bit significance levels of bit planes consisting of the quantized transform coefficients corresponding to each region of interest based upon the priority specified for each region of interest;
modifying an encoding ordering of the bit planes consisting of quantized transform coefficients based upon the scaled up bit significance levels of the transform coefficients; and
entropy encoding the bit planes of the quantized transform coefficients according to the modified encoding ordering to generate an encoded bit stream of digital image data.

5. The method of claim 4 further comprising the step of identifying the coefficients necessary and sufficient to encode the region of interest to be reconstructed up to a highest fidelity in a target spatial resolution image.

6. The method of claim 4 wherein the step of identifying the coefficients corresponding to the region of interest further comprises the steps of:
identifying pixels on boundaries of the region of interest;
identifying pixels one pixel inside the region of interest along one of a vertical and horizontal direction of the image if at least one of a low pass and a high pass filter which perform the wavelet transform and an inverse wavelet transform has an odd filter length;
tracing an input-output relationship of one of the wavelet transform and the inverse wavelet transform from an image domain to each subband domain to identify the transform coefficients which correspond to the pixels identified in the previous steps;
forming boundaries of a corresponding region of interest in each subband domain based upon the identified coefficients in the previous step; and
identifying coefficients surrounded by the boundaries in each subband as coefficients corresponding to the region of interest.

7. The method of claim 4 wherein the step of identifying the coefficients corresponding to the region of interest further comprises the steps of:

identifying a set of transform coefficients which correspond to each pixel in the region of interest by tracing an input-output relationship of one of a set of wavelet transforms performed on the pixel and a set of inverse wavelet transforms which reconstruct a pixel value; and
forming a coefficient identification result such that a set of transform coefficients corresponding to each pixel can be identified.

8. The method of claim 4 wherein the step of entropy encoding the bit planes produces encoded information that is in the form of a number of bits, and the method further comprises the steps of:
allocating the number of bits separately for use in representing the bit planes consisting only of the transform coefficients corresponding to the regions of interest in each sequence of transform coefficients, for use in representing the bit planes consisting of all the transform coefficients in the same sequence, and for use in representing the bit planes consisting of the transform coefficients corresponding to the regions outside of the region of interest in the same sequence such that the number of bits to reconstruct the region of interest and the number of bits to reconstruct the regions outside of the region of interest will be separately controlled; and
aligning encoded bit portions of the bit planes such that a certain series of bit portions representing the region of interest will be transmitted at the earlier stage of transmission than bit portions representing regions outside of the region of interest.

9. The method according to claim 4 wherein the step of selecting a region of interest further comprises selecting a plurality of regions of interest in the image and assigning each region a priority and wherein the step of classifying the transform coefficients in each subband into at least one sequence further comprises the step of classifying the transform coefficients such that at least one sequence corresponds to each of the plurality of regions of interest.

10. The method of claim 4 wherein the step of performing a wavelet transform on a digital image further comprises dividing the image into rectangular blocks of pixels such that some blocks only contain pixels which are inside the region of interest, some block only contain pixels which are outside of the region of interest, and some blocks contain some pixels which are inside the region of interest and some pixels which are outside of the region of interest and performing a wavelet transform on each rectangular block of pixels, and the method further comprises the steps of
defining the region of interest by selecting entire rectangular blocks of pixels to be included in the region of interest and by individually selecting pixels within rectangular blocks in which there exist boundaries between the region of interest and regions outside of the region of interest to be included in the region of interest;
scaling up the bit significance level of all the transform coefficients corresponding to the rectangular blocks of pixels entirely within the region of interest and scaling up the bit significance level of the transform coefficients corresponding to pixels belonging to the region of interest in blocks that overlap the boundaries of the region of interest based upon the priority assigned to the region of interest;
modifying a predetermined encoding ordering of the bit planes of the quantized transform coefficients in the blocks overlapping the boundaries of the region of interest based upon scaling up the bit significance level of the transform coefficients inside the region of interest;

entropy encoding the bit planes of the quantized transform coefficients in the blocks which do not overlap the boundaries of the region of interest according to the predetermined encoding ordering, and encoding the bit plane of the quantized transform coefficients in the blocks which overlap the boundaries of the region of interest according to the modified encoding ordering; and adjusting the ordering of the encoded bit sequences of the bit planes of all the blocks such that the ordering of bit sequences of bit planes in the blocks inside the region of interest are given higher priority by a priority value assigned to the region of interest and the ordering of the bit sequences of the bit planes in the blocks outside of the region of interest and in the blocks overlapping the region of interest are the same as the encoding ordering of the corresponding blocks in order to generate the encoded bit stream of digital data.

11. The method of claim 4 wherein the step of entropy encoding further comprises performing data compression on the coefficients such that more information concerning regions outside of the region of interest is lost than is information concerning the region of interest.

12. A method of decoding information representing an image, the method comprising the steps of:

receiving the information in a computer-readable format, the received information including digital data representing an image and digital data concerning at least one region of interest in the image;

locating at least one region of interest in the image to be reconstructed from the encoded bit stream according to the information concerning the at least one region of interest;

identifying digital data corresponding to specified regions of interest;

modifying a decoding ordering of the encoded bit stream based upon a priority assigned to each region of interest;

entropy decoding the encoded bit stream according to the modified decoding ordering in order to obtain bit planes corresponding to quantized transform coefficients having a same bit significance level;

scaling down the bit significance level of the bit planes including quantized transform coefficients corresponding to each region of interest in order to obtain original bit significance levels of the quantized transform coefficients;

de-quantizing the quantized transform coefficients according to a de-quantization scheme to obtain sequences of transform coefficients;

declassifying the sequences of transform coefficients into a set of subbands; and performing an inverse wavelet transform selected from a mallet type transform, a spacl type transform, and a packet type transform on the subbands in order to reconstruct the digital image data.

13. The method of claim 12, further comprising the steps of:

identifying a number of bits separately for use in entropy decoding a portion of the encoded bit stream in order to obtain bit planes consisting only of transform coefficients corresponding to the region of interest, for use in obtaining bit planes consisting of all transform coefficients in the same sequence, and for use in obtaining the rest of the bit planes consisting of transform coefficients outside the region of interest in the same sequence such that the number of bits used to reconstruct the region of interest and the number of bits to reconstruct the regions outside of the region of interest will be separately controlled; and aligning the portions of received encoded bit stream such that a certain series of the bit portions representing the region of interest will be decoded at an earlier stage in reconstruction of the region of interest.

14. The method of claim 12 wherein the step of receiving the information further comprises receiving the information such that information corresponding to the region of interest is received at a higher rate than information corresponding to regions of the image outside of the region of interest is received.

15. The method according to claim 12 wherein the step of identifying digital data corresponding to a region of interest further comprises the steps of:

identifying digital data corresponding to a plurality of regions of interest in the image represented by the information;

determining a priority corresponding to each of the plurality of regions of interest; and reconstructing the image by reconstructing the plurality of regions of interest in a manner that is dependent upon each of the region's determined priority.

16. The method of claim 12 wherein the encoded bit stream of the digital image data consists of sets of encoded bit planes representing rectangular blocks of pixels in the image, the method further comprising the steps of:

modifying a decoding ordering of encoded bit planes for rectangular blocks overlapping the boundaries of the region of interest based upon the priority value assigned to the region of interest;

entropy decoding encoded bit planes for the rectangular blocks which do not overlap boundaries of the region of interest according to one decoding ordering, and entropy decoding encoded bit planes for rectangular blocks which overlap the boundaries of the region of interest according to the modified decoding ordering in order to obtain bit planes consisting of a same bit significance level of the quantized transform coefficients in each sequence;

scaling down the bit significance level of the bit planes consisting only of the quantized transform coefficients corresponding to the region of interest within the blocks overlapping the boundaries of the region of interest according to the priority value assigned to the region of interest in order to obtain an original bit significance level of the bit planes; and performing an inverse wavelet transform on each set of subbands containing quantized transform coefficients in order to reconstruct each rectangular block in the digital image.

17. An encoding device for encoding information representing an image, the device comprising:

receiving means for receiving information including data on values and coordinates for a plurality of pixels;

selecting means for selecting at least one region of interest in the image represented by the information;

wavelet based bit plane coder means for performing a wavelet transform selected from the group consisting of a mallet type wavelet transform, a spacl type wavelet transforms and a packet type wavelet transform on the information to obtain subbands containing coefficients;

identification means for identifying coefficients corresponding to the at least one region of interest;

ordering means for ordering the coefficients according to a plurality of categories wherein at least one category corresponds to coefficients representing the region of interest and at least one category corresponds to coefficients representing regions outside of the region of interest;

entropy encoding means for encoding the coefficients according to the category into which the coefficients were placed to obtain a number of bits representing the encoded coefficients;

transmitting means for transmitting the bits in a bit stream to a remote location, such that the manner in which the bits are transmitted depends upon the category of coefficients to which the bits correspond; and bit allocation means for allocating a predetermined number of bits for use in representing each category of coefficients wherein the number of bits allocated to represent the categories of coefficients corresponding to the region of interest of the image is such that the region of interest of the image can be reconstructed with a higher fidelity than the regions of the image outside of the region of interest; and bit stream allocation means for allocating a fixed portion of bits of the bit stream transmitted per unit time for transmitting bits corresponding to categories of coefficients corresponding to the region of interest.

18. An encoding device for encoding information representing an image the device comprising:

receiving means for receiving information including data on values and coordinates for a plurality of pixels;

selecting means for selecting at least one region of interest in the image represented by the information;

wavelet based bit plane coder means for performing a wavelet transform selected from the group consisting of a mallet type wavelet transform a spacl type wavelet transform, and a packet type wavelet transform on the information to obtain subbands containing coefficients;

identification means for identifying coefficients corresponding to the at least one region of interest;

ordering means for ordering the coefficients according to a plurality of categories wherein at least one category corresponds to coefficients representing the region of interest and at least one category corresponds to coefficients representing regions outside of the region of interest;

entropy encoding means for encoding the coefficients according to the category into which the coefficients were placed to obtain a number of bits representing the encoded coefficients; and transmitting means for transmitting the bits in a bit stream to a remote location, such that the manner in which the bits are transmitted depends upon the category of coefficients to which the bits correspond, wherein the ordering means further comprise block ordering means for ordering the coefficients according to categories such that some categories of coefficients contain information that corresponds to rectangular blocks of pixels in the image wherein all the pixels in the corresponding block are either inside the region of interest or outside of the region of interest, and some categories of coefficients contain information that corresponds to rectangular blocks of pixels in the image wherein some of the pixels in the corresponding block are inside the region of interest and some of the pixels are outside of the region of interests.

19. A decoding device for receiving and decoding information representing an image, the device comprising:

receiving means for receiving the information including data on values and coordinates for a plurality of pixels;

identification means for receiving the information from the receiving means and identifying at least two categories of information corresponding to regions of the image such that at least one category corresponds to information representing a region of interest in the image and at least one category corresponds to information representing a region in the image outside of the region of interest;

entropy decoding means for entropy decoding the information according to the information's category; and reconstructing means for reconstructing the image from the entropy decoded information such that the manner in which regions of the image are reconstructed depends upon the category of the information representing the region, wherein the received information is in the form of a bit stream and a fixed portion of bits in the bit stream received per unit time corresponds to the region of interest, and wherein the reconstructing means reconstruct the region of interest more quickly than regions of the image outside of the region of interest and with a higher fidelity than regions outside of the region of interest.

20. A decoding device for receiving and decoding information representing an image, the device comprising:

receiving means for receiving the information including data on values and coordinates for a plurality of pixels;

identification means for receiving the information from the receiving means and identifying at least two categories of information corresponding to regions of the image such that at least one category corresponds to information representing a region of interest in the image and at least one category corresponds to information representing a region in the image outside of the region of interest;

entropy decoding means for entropy decoding the information according to the information's category; and reconstructing means for reconstructing the image from the entropy decoded information such that the manner in which regions of the image are reconstructed depends upon the category of the information representing the region, wherein the identification means further comprise:

multiple region of interest identification means for identifying a plurality of categories corresponding to a plurality of regions of interest in the image represented by the information; and priority determining means for determining a priority corresponding to each of the plurality of regions of interest; and wherein the reconstructing means reconstruct the plurality of regions of interest in a manner that is dependent upon each of the region's priority.

21. A decoding device for receiving and decoding information representing an image the device comprising:

receiving means for receiving the information including data on values and coordinates for a plurality of pixels;

identification means for receiving the information from the receiving means and identifying at least two categories of information corresponding to regions of the image such that at least one category corresponds to information representing a region of interest in the image and at least one category corresponds to information representing a region in the image outside of the region of interest, entropy decoding means for entropy decoding the information according to the information's category; and reconstructing means for reconstructing the image from the entropy decoded information such that the manner in which regions of the image are reconstructed depends upon the category of the information representing the region, wherein the identification means further comprise rectangular block identification means for identifying categories of information containing information that corresponds to rectangular blocks of pixels in the image wherein all the pixels in each corresponding block are either inside the region of interest or outside of the region of interest and categories of information containing information that corresponds to rectangular blocks of pixels in the image wherein some of the pixels in each corresponding block are inside the region of interest and some of the pixels are outside of the region of interests.

22. A method of encoding digital image data representing an image, said method comprising the steps of:

selecting at least one region of interest in an image represented by said digital image data;

performing a wavelet transform on the digital image data to obtain transform coefficients;

identifying the transform coefficients corresponding to the region of interest;

assigning a priority to the at least one region of interest;

emphasizing the transform coefficients corresponding to the region of interest by scaling up the transform coefficients corresponding to the region of interest;

ordering the transform coefficients including the scaled up transform coefficients;

quantizing the transform coefficients including the scaled up transform coefficients; and entropy encoding the transform coefficients to form a bit stream.

23. A method of encoding digital image data representing an image, said method comprising the steps of:

selecting at least one region of interest in an image represented by said digital image data;

performing a wavelet transform on the digital image data to obtain transform coefficients;

identifying the transform coefficients corresponding to the region of interest; and assigning a priority to the at least one region of interest, quantizing the transform coefficients to obtain quantization indices;

emphasizing quantization indices corresponding to the region of interest by scaling up the quantization indices corresponding to the region of interest;

ordering the quantization indices including the scaled up quantization indices; and entropy encoding the quantization indices to form a bit stream.

* * * * *